(12) United States Patent (10) Patent No.: US 8,370,616 B2
Niizato (45) Date of Patent: Feb. 5, 2013

(54) IMAGING APPARATUS AND START-UP METHOD OF IMAGING APPARATUS

(75) Inventor: Manabu Niizato, Tokyo (JP)

(73) Assignee: Sony Corporation, Tokyo (JP)

( * ) Notice: Subject to any disclaimer, the term of this patent is extended or adjusted under 35 U.S.C. 154(b) by 372 days.

(21) Appl. No.: 12/750,975

(22) Filed: Mar. 31, 2010

(65) Prior Publication Data

US 2010/0275002 A1 Oct. 28, 2010

(30) Foreign Application Priority Data

Apr. 22, 2009 (JP) ................................ 2009-104358

(51) Int. Cl.
*G06F 15/177* (2006.01)

(52) U.S. Cl. .............................................. 713/2; 713/1

(58) Field of Classification Search ........................ None
See application file for complete search history.

(56) References Cited

U.S. PATENT DOCUMENTS

| | | | |
|---|---|---|---|
| 5,212,797 A | 5/1993 | Miyake et al. | |
| 5,648,816 A | 7/1997 | Wakui | |
| 5,761,547 A | 6/1998 | Hirano et al. | |
| 6,158,000 A | 12/2000 | Collins | |
| 6,243,137 B1 | 6/2001 | Aihara | |
| 2005/0268081 A1 | 12/2005 | Han et al. | |
| 2005/0268127 A1 | 12/2005 | Shiba et al. | |
| 2006/0284053 A1 | 12/2006 | Doi | |
| 2008/0180561 A1* | 7/2008 | Maeno et al. | 348/335 |
| 2009/0019194 A1 | 1/2009 | Toyama et al. | |

FOREIGN PATENT DOCUMENTS

JP 2007-282265 10/2007

OTHER PUBLICATIONS

European Search Report issued Sep. 23, 2010 in EP 10 15 7547.
Office Action issued Oct. 6, 2010, in Europe Patent Application No. 10 157 547.0.
U.S. Appl. No. 12/730,329, filed Mar. 24, 2010, Niizato.

* cited by examiner

*Primary Examiner* — Dennis M Butler
(74) *Attorney, Agent, or Firm* — Oblon, Spivak, McClelland, Maier & Neustadt, L.L.P.

(57) ABSTRACT

An imaging apparatus includes: an imaging processing unit configured to image a subject and output imaging data; a temporary storage medium configured to temporarily store the imaging data output from the imaging processing unit; an imaging control unit configured to control the imaging processing unit; a storage control unit configured to store, in a storage medium detachably mounted to a device main unit, the imaging data temporarily stored in the temporary storage medium; and a request unit configured to request the device main unit for execution of start-up processing; wherein, upon the start-up processing being requested from the request unit, start-up processing of the imaging control unit and the storage control unit are executed in parallel.

6 Claims, 17 Drawing Sheets

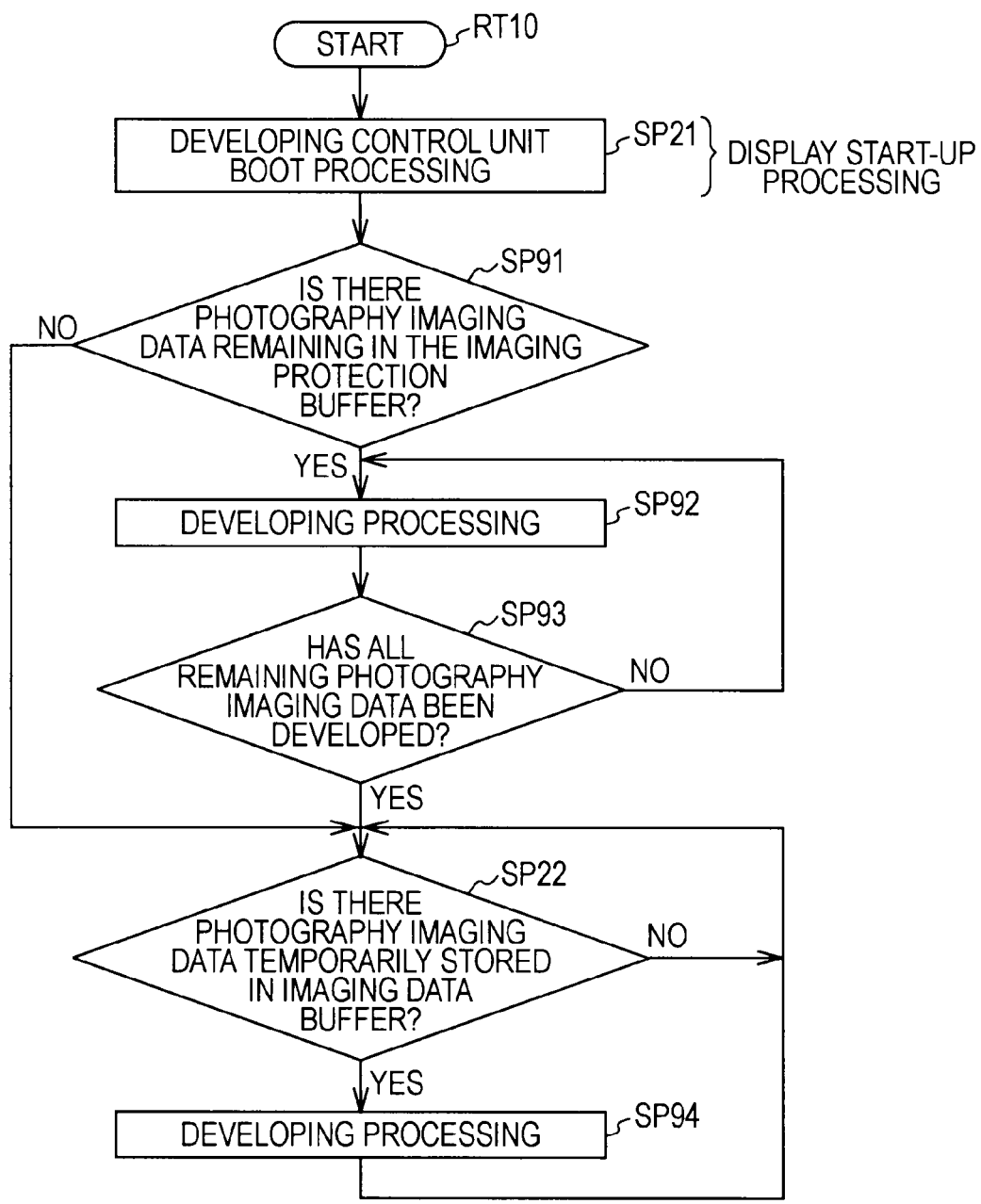

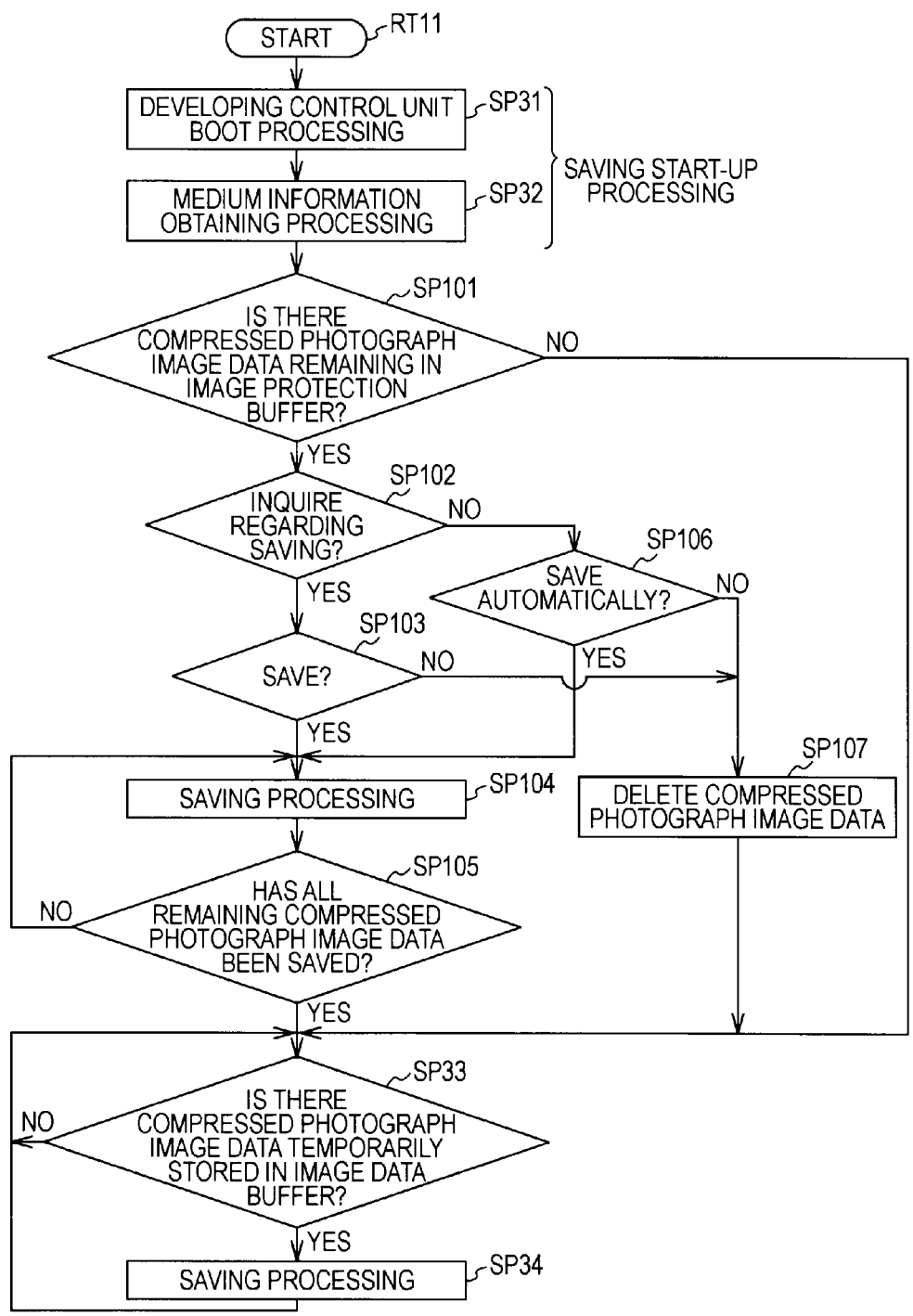

IMAGING APPARATUS AND START-UP METHOD OF IMAGING APPARATUS

BACKGROUND OF THE INVENTION

1. Field of the Invention

The present invention relates to an imaging apparatus and a start-up method of an imaging apparatus, which is suitably applied to, for example, digital still cameras.

2. Description of the Related Art

With digital cameras according to the related art, upon a power on command being input, a part of a boot program is read out from ROM (Read Only Memory) and loaded to RAM (Random Access Memory). The digital camera this executes start-up processing of the imaging system, and upon the imaging system start-up processing ending, the digital camera is capable of imaging subjects.

Once the imaging system start-up processing has ended, each time a release key is pressed, imaging processing executed to image a subject, and image data obtained as a result thereof is temporarily stored in buffer memory.

Thus, with the digital camera, upon imaging processing of one time or multiple times ending, the remainder of the boot program is read out from the ROM and loaded to the RAM. Thus, the digital camera sequentially executes medium information obtaining processing to obtain, from a memory card detachably mounted to the digital camera, medium information relating to format information, remaining capacity, and so forth, and monitor start-up processing.

Upon the medium information obtaining processing and monitor start-up processing ending, data storage processing is executed. Thus, the digital camera sequentially reads out the image data which had been temporarily stored in the buffer memory therefrom, subjects to processing such as compression, and transfers this to the memory card for storage. In this way, digital cameras have been arranged to enable subjects to be imaged in the shortest possible time from input of the power on command (e.g., see Japan Unexamined Patent Application Publication No. 2007-282265 (pp. 5-6, FIGS. 2 and 4).

SUMMARY OF THE INVENTION

However, with the digital camera having this configuration, one control unit sequentially executes imaging system start-up processing, imaging processing, medium information obtaining processing, monitor start-up processing, and data storage processing, in a sequential manner. Accordingly, while imaging processing can be executed for a while from the point of the imaging system start-up processing ending, imaging processing is not available from the point of starting the subsequent medium information obtaining processing to the point of ending the data storage processing. This has been troublesome with the digital camera having this configuration, in that imaging of the subject has to be forcibly suspended from the point of starting medium information obtaining processing to the point of ending data storage processing.

It has been desirable to propose an imaging apparatus, and a start-up method of the imaging apparatus, whereby ease-of-use can be improved.

According to an embodiment of the present invention, an imaging apparatus includes: an imaging processing unit configured to image a subject and output imaging data; a temporary storage medium configured to temporarily stored the imaging data output from the imaging processing unit; an imaging control unit configured to control the imaging processing unit; a storage control unit configured to store, in a storage medium detachably mounted to a device main unit, the imaging data temporarily stored in the temporary storage medium; and a request unit configured to request the device main unit for execution of start-up processing; wherein, upon the start-up processing being requested from the request unit, start-up processing of the imaging control unit and the storage control unit are executed in parallel.

Accordingly, with the above configuration, upon start-up processing performed by the imaging control unit ending, the imaging control unit can control the imaging processing unit to continuously perform imaging of the subject, without being obstructed by the storage control unit.

According to the above configuration, an imaging apparatus includes: an imaging processing unit configured to image a subject and output imaging data; a temporary storage medium configured to temporarily stored the imaging data output from the imaging processing unit; an imaging control unit configured to control the imaging processing unit; a storage control unit configured to store, in a storage medium detachably mounted to a device main unit, the imaging data temporarily stored in the temporary storage medium; and a request unit configured to request the device main unit for execution of start-up processing; wherein, upon the start-up processing being requested from the request unit, start-up processing of the imaging control unit and the storage control unit are executed in parallel; whereby upon start-up processing performed by the imaging control unit ending, the imaging control unit can control the imaging processing unit to continuously perform imaging of the subject, without being obstructed by the storage control unit, thereby realizing an imaging apparatus, and a start-up method of the imaging apparatus, whereby ease-of-use can be improved.

BRIEF DESCRIPTION OF THE DRAWINGS

FIG. 17 is a flowchart illustrating start-up developing processing procedures performed by a developing control unit according to the third embodiment; and FIG. 18 is a flowchart illustrating start-up saving processing procedures performed by a saving control unit according to the third embodiment.

DESCRIPTION OF THE PREFERRED EMBODIMENTS

Best modes for carrying out the present invention (hereinafter referred to as "embodiments") will be described with reference to the drawings. Note that description will proceed as follows:
1. First Embodiment,
2. Second Embodiment,
3. Third Embodiment, and
4. Modifications.

1. First Embodiment 1-1. Circuit Configuration of Digital Still Camera

Figure 1:
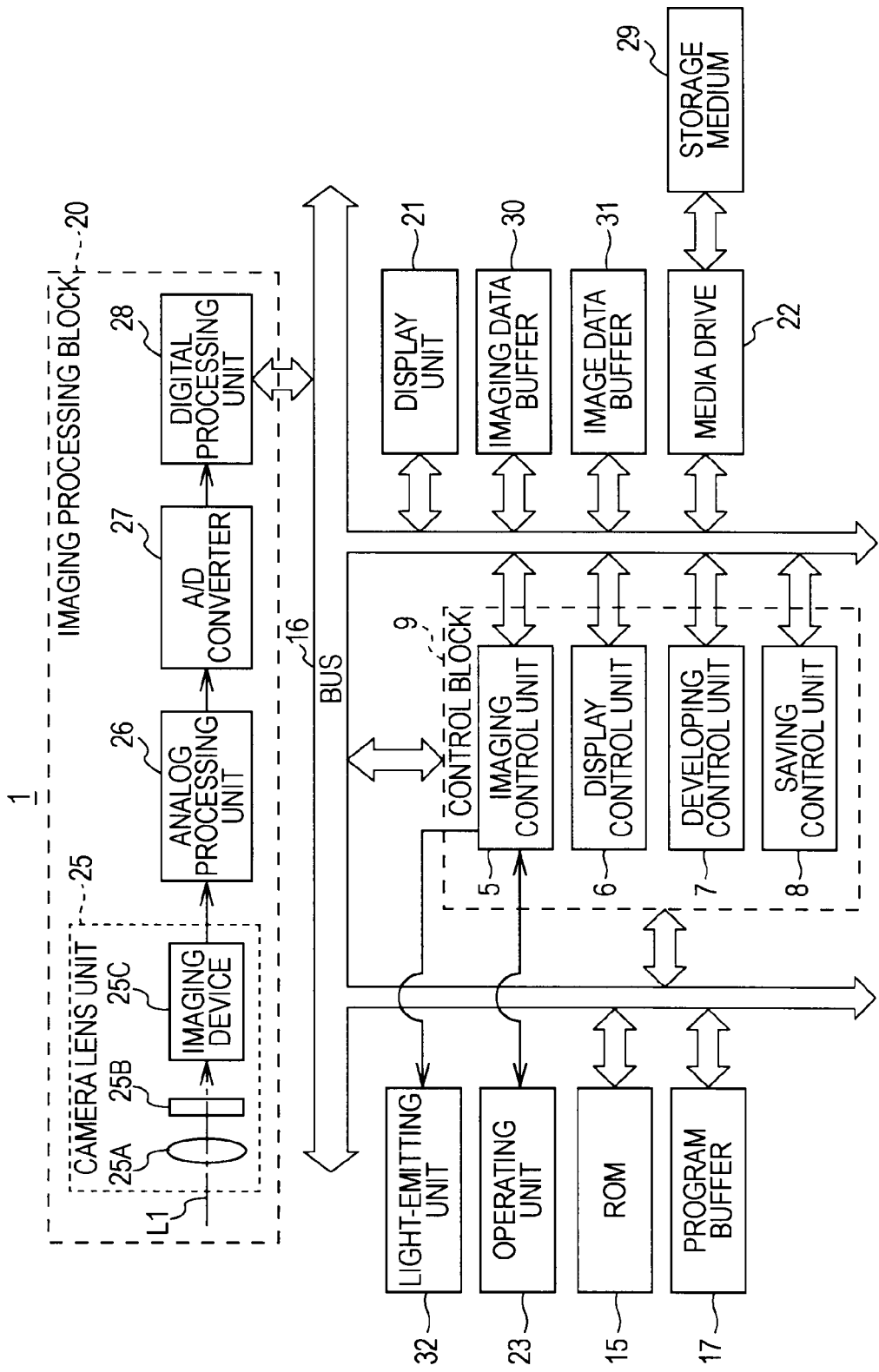
FIG. 1 is a block diagram illustrating an embodiment of a first embodiment of the circuit configuration of a digital still camera.

In FIG. 1, reference numeral 1 denotes the entirety of a digital still camera according to a first embodiment of the present invention. The digital still camera 1 includes a control block 9 further including four control units, which are an imaging control unit 5, display control unit 6, developing control unit 7, and saving control unit 8, each made up of a CPU (Central Processing Unit).

ROM (Read Only Memory) 15 is also provided to the digital still camera 1. The ROM 15 stores beforehand boot programs, such as four types of OS (Operating System) for enabling each of the imaging control unit 5, display control unit 6, developing control unit 7, and saving control unit 8, to be in a state capable of executing various types of operations. The ROM 15 also stores various types of application programs and the like, enabling each of the imaging control unit 5, display control unit 6, developing control unit 7, and saving control unit 8, to be in a state capable of executing various types of operations.

The digital still camera 1 also includes various types of circuit blocks, such as a power source block (not shown) having a battery. The imaging control unit 5, display control unit 6, developing control unit 7, and saving control unit 8 operate on power supplied from the power source block, and power is also supplied from the power source block to the circuit blocks, so that these circuit blocks operate appropriately.

The imaging control unit 5, display control unit 6, developing control unit 7, and saving control unit 8 also read out various types of programs, such as the boot programs and various types of applications programs from the ROM 15, to volatile memory 17 via a bus 16. Note that this volatile memory 17 is made up of SRAM (Static Random Access Memory), DRAM (Dynamic Random Access Memory), or the like. Further note that in the following description, the volatile memory 17 to which the imaging control unit 5, display control unit 6, developing control unit 7, and saving control unit 8 read out the various types of program from the ROM 15 may also be referred to as "program buffer 17".

The imaging control unit 5, display control unit 6, developing control unit 7, and saving control unit 8 then control the circuit blocks to be controlled, such as an imaging processing block 20, display unit 21, media drive 22, and so forth, following various types of programs loaded to the program buffer 17. The imaging control unit 5, display control unit 6, developing control unit 7, and saving control unit 8 also executes various types of processing in accordance with various types of commands input corresponding to user operations from an operating unit 23 which has various types of operating keys, following various types of programs loaded to the program buffer 17.

Now, the imaging processing block 20 includes a camera lens unit 25, analog processing unit 26, analog/digital converter 27, and digital processing unit 28.

The camera lens unit 25 is formed with optical elements such as an imaging lens 25A and diaphragm (not shown) for adjusting exposure, a shutter 25B, and an imaging device 25C, disposed along an optical axis in that order. This imaging device 25C is a CCD (Charge Coupled Device) image sensor, CMOS (Complementary Metal Oxide Semiconductor) image sensor, or the like. The display unit 21 is formed of a liquid crystal display, organic EL (Electro Luminescence) display, or the like. Further, the operating unit 23 has a power source key by which a power on command for requesting start-up processing of the digital still camera 1 and a power off command for requesting stopping of operations can be toggled between, a release key for inputting a shooting command, and so forth, as various types of operating keys.

The digital still camera 1 also has an external media slot formed with a storage medium 29 formed of non-volatile memory stored within a case having a predetermined shape, for example. External media can be detachably mounted to the digital still camera 1 by way of the slot.

In an actual arrangement, the imaging control unit 5 performs driving control of the camera lens unit 25 of the imaging processing block 20 when in an imaging mode, so as to automatically adjust focus and exposure regarding a subject. In this state, the imaging device 25C receives, at the light-receiving face thereof, imaging light L1 from the subject which has transmitted through the imaging lens 25A, and passed through the diaphragm and shutter 25B. The imaging device 25C performs sequential photoelectric conversion of the imaging light L1 received at the light-receiving face thereof at a predetermined cycle for shooting moving images of the subject, to generate analog moving image photoelectric conversion signals corresponding to the imaging light L1, and also sends the generated moving image photoelectric conversion signals to the analog processing unit 26.

Each time moving image photoelectric conversion signals are relieved from the imaging device 25C, the analog processing unit 26 subjects the moving image photoelectric conversion signals to predetermined analog processing such as noise reduction processing, so as to generate moving image imaging signals.

Also, each time that moving image imaging signals are generated, the analog processing unit 26 converts the generated moving image imaging signals into digital moving image imaging data by way of the analog/digital converter 27 and sends these to the digital processing unit 28.

Each time that moving image imaging data is provided from the analog/digital converter 27, the digital processing unit 28 subjects the moving image imaging data to predetermined digital processing such as shading correction processing and the like. The digital processing unit 28 sends the moving image imaging data subjected to the predetermined digital processing to volatile memory 30 such as SRAM or DRAM via the bus 16, for temporary storage. Note that hereinafter, the volatile memory 30 for temporarily storing the moving image imaging data may also be referred to as "imaging data buffer 30".

At this time, the display control unit 6 executes moving image display processing, so that each time moving image imaging data is temporarily stored in the imaging data buffer 30, the moving image imaging data is read out from the imaging data buffer 30 via the bus 16. Also, the display control unit 6 subjects the moving image imaging data read out from the imaging data buffer 30 to predetermined image generating processing, such as trimming processing corresponding to the aspect ratio of the display screen of the display unit 21, image reduction processing wherein pixels are thinned out in accordance with the resolution of the display screen, and so forth.

Thus, the display control unit 6 sequentially generates multiple temporally-consecutive sets of unit image data which make up the moving image data, based on the moving image imaging data sequentially generated by the digital processing unit 28. The display control unit 6 then sends the sequentially generated unit image data to the display unit 21 via the bus 16. Thus, the display control unit 6 causes display on the display unit 21 of multiple unit images based on multiple temporally-consecutive sets of unit image data, in a consecutive manner as a moving image. In this way, the display control unit 6 displays, on the display unit 21, a moving image obtained by consecutively imaging a subject (i.e., shooting a moving image thereof), so that the user can confirm the imaging state of the subject by viewing the moving image.

In the event that the user operates the release key to input a shooting command from the operating unit 23, the imaging control unit 5 drives the shutter 25B of the camera lens unit 25. Thus, the imaging control unit 5 exposes the light-receiving face of the imaging device 25C with imaging light L1, at a predetermined shutter speed for photograph shooting.

At this time, the imaging device 25C performs photoelectric conversion of the imaging light L1 whereby the light-receiving face has been exposed, and generates photography photoelectric conversion signals corresponding to the imaging light L1 whereby exposure has been performed. The imaging device 25C then sends the photography photoelectric conversion signals to the analog processing unit 26.

The analog processing unit 26 subjects the photography photoelectric conversion signals provided from the imaging device 25C to analog processing such as described above, so as to generate photography imaging signals. The analog processing unit 26 then converts the photography imaging signals into photography imaging data by way of the analog/digital converter 27, and sends to the digital processing unit 28.

The digital processing unit 28 subjects the photography imaging data provided from the analog/digital converter 27 to digital processing such as described above, then sends the photography imaging data to the imaging data buffer 30 via the bus 16, so as to temporarily store the photography imaging data in the imaging data buffer 30.

At this time, the developing control unit 7 performs developing processing, wherein the photography imaging data temporarily stored in the imaging data buffer 30 is read out from the imaging data buffer 30 via the bus 16. The developing control unit 7 then subjects the photography imaging data read out from the imaging data buffer 30 to predetermined image generating processing, such as trimming processing corresponding to a predetermined aspect ratio selected beforehand for photography images, image reduction processing wherein pixels are thinned out in accordance with an image size selected beforehand for photography images, and so forth. Thus, the developing control unit 7 generates photography image data based on the photography imaging data (hereinafter also referred to as "photograph image data").

Moreover, the developing control unit 7 subjects the photograph image data to compression encoding processing with a predetermined compression encoding method such as JPEG (Joint Photographic Experts Group). Thus, the developing control unit 7 ultimately obtains compression-encoded photograph image data (hereinafter also referred to as "compressed photograph image data"). The developing control unit 7 then sends the compressed photograph image data to volatile memory 31 such as SRAM or DRAM via the bus 16 so as to be temporarily stored. Note that in the following description, the volatile memory 31 for temporarily storing the compressed photograph image data may also be referred to as "image data buffer 31".

The saving control unit 8 executes saving processing at this time, thereby reading out the temporarily stored compressed photograph image data from the image data buffer 31, via the bus 16. The saving control unit 8 also adds header data, storing various types of information in accordance with Exif (Exchangeable image file format), to the header portion of the compressed photograph image data, thereby generating compressed photograph image data for saving (hereinafter may be referred to as "saving photograph image data").

The saving control unit 8 sequentially transfers the saving photograph image data to an external medium via the bus 16 and media drive 22 in that order, whereby the saving control unit 8 stores the saving photograph image data in the storage medium 29 within the external media. Thus, the saving control unit 8 can save saving photograph image data generated by imaging a subject for photograph shooting in accordance with operation of a release key, in external media.

On the other hand, when in a reproducing mode, upon saving photograph image data being selected by the user by way of the operating unit 23, the saving control unit 8 reads out the selected saving photograph image data from a storage medium 29 within the external media, via the bus 16 and media drive 22 in that order.

The display control unit 6 separates the saving photograph image data provided form the saving control unit 8 into compressed photograph image data and header data. The display control unit 6 then performs decoding processing of the compressed photograph image data in accordance with various types of information in the header data, thereby generating the original photograph image data, and also subjects the photograph image data to correction processing and the like as appropriate. The display control unit 6 also subjects the photography image data to trimming processing corresponding to the aspect ratio of the display screen of the display unit 21, image reduction processing wherein pixels are thinned out in accordance with the display screen, and so forth, thereby generating display photograph image data.

The display control unit 6 then sends the display photograph image data to the display unit 21 via the bus 16. Thus, the display control unit 6 displays the photograph image based on the display photograph image data on the display unit 21. Accordingly, the display control unit 6 allows the user to view the photograph image obtained by imaging a subject for photograph shooting, by way of the display unit 21.

1-2. Digital Still Camera Start-Up Processing

Next, description will be made regarding the start-up processing in the imaging mode executed by each of the imaging control unit 5, display control unit 6, developing control unit 7, and saving control unit 8, in accordance with input of a power on command to the digital still camera 1.

Even when the power source of the digital still camera 1 is in an off state, the imaging control unit 5, display control unit 6, developing control unit 7, and saving control unit 8, each receive a minute power supply from the power source block that is smaller than the stipulated operation power, and a part of each is continually operating so as to be able to detect input of a power on command.

Accordingly, in the event that the user has operated the power source key in a state of the digital still camera 1 being off, so as to input a power on command from the operating unit 23, each of the imaging control unit 5, display control unit 6, developing control unit 7, and saving control unit 8 acquire a power on command. Upon acquiring the power on command, the imaging control unit 5, display control unit 6, developing control unit 7, and saving control unit 8 each input stipulated operating power from the power source block, and start their intended operations for realizing their respective functions.

Accordingly, the imaging control unit 5 reads an initial program such as an IPL (Initial Program Loading) from the ROM 15 stored there beforehand, to the program buffer 17 via the bus 16. In accordance with the initial program loaded to the program buffer 17, the imaging control unit 5 then reads out, from the ROM 15 via the bus 16 to the program buffer 17, a boot program used for start-up processing so that the imaging control unit 5 itself can be in a state for executing various types of processing. Note that in the following description, start-up processing whereby the imaging control unit 5 is in a state for executing various types of processing may also be referred to as "imaging start-up processing".

The display control unit 6 also reads an initial program from the ROM 15 to the program buffer 17 via the bus 16. In accordance with the initial program loaded to the program buffer 17, the display control unit 6 then reads out, from the ROM 15 via the bus 16 to the program buffer 17, a boot program used for start-up processing so that the display control unit 6 itself can be in a state for executing various types of processing. Note that in the following description, start-up processing whereby the display control unit 6 is in a state for executing various types of processing may also be referred to as "display start-up processing".

Further, the developing control unit 7 also reads an initial program from the ROM 15 to the program buffer 17 via the bus 16. In accordance with the initial program loaded to the program buffer 17, the developing control unit 7 then reads out, from the ROM 15 via the bus 16 to the program buffer 17, a boot program used for start-up processing so that the developing control unit 7 itself can be in a state for executing various types of processing. Note that in the following description, start-up processing whereby the developing control unit 7 is in a state for executing various types of processing may also be referred to as "developing start-up processing".

Moreover, the saving control unit 8 also reads an initial program from the ROM 15 to the program buffer 17 via the bus 16. In accordance with the initial program loaded to the bus 16, the saving control unit 8 then reads out, from the ROM 15 via the bus 16 to the program buffer 17, a boot program used for start-up processing so that the saving control unit 8 itself can be in a state for executing various types of processing. Note that in the following description, start-up processing whereby the saving control unit 8 is in a state for executing various types of processing may also be referred to as "saving start-up processing".

Thus, the imaging control unit 5, display control unit 6, developing control unit 7, and saving control unit 8, each start their respective imaging start-up processing, display start-up processing, developing start-up processing, and saving start-up processing, following the corresponding boot programs loaded to the program buffer 17, at nearly the same time.

More specifically, at the time of imaging start-up, the imaging control unit 5 first executes imaging control unit boot processing for booting itself, following the corresponding boot program loaded to the program buffer 17. Accordingly, the imaging control unit 5 performs initialization of work area, setting of variables used for various types of processing which it performs, and so on.

Upon such imaging control unit boot processing being completed, the imaging control unit 5 then performs imaging system initialization processing for initializing the imaging processing block 20 in accordance with the corresponding boot program loaded to the program buffer 17. Accordingly, the imaging control unit 5 sets focal length, exposure values, and shutter speed, to predetermined values at the camera lens unit 25 of the imaging processing block 20, and also performs initialization processing of the analog processing unit 26, analog/digital converter 27, and digital processing unit 28.

Upon such imaging system initialization processing ending, the imaging control unit 5 then executes operating system initialization processing in accordance with the corresponding boot program loaded to the program buffer 17. Accordingly, the imaging control unit 5 performs initialization and the like of an analog/digital converter for inputting various types of commands input from the operating unit 23 and converting these to digital commands (i.e., the analog/digital converter provided to the imaging control unit 5). Thus, the imaging control unit 5 executes a series of imaging control unit boot processing, imaging system initialization processing, and operating system initialization processing as developing start-up processing, in that order.

Also, at the time of display start-up, the display control unit 6 first executes display control unit boot processing for booting itself, following the corresponding boot program loaded to the program buffer 17. Accordingly, the display control unit 6 performs initialization of work area, setting of variables used for various types of processing which it performs, and so on.

Upon such display control unit boot processing being completed, the display control unit 6 then performs display system initialization processing for initializing the display unit 21 in accordance with the corresponding boot program loaded to the program buffer 17. Accordingly, the display control unit 6 initializes the display unit 21, and also turns on the backlight of the display unit 21. Thus, the display control unit 6 executes a series of display control unit boot processing and display system initialization processing, in that order, as display start-up processing.

Further, at the time of developing start-up, the developing control unit 7 first executes developing control unit boot processing for booting itself, following the corresponding boot program loaded to the program buffer 17. Accordingly, the developing control unit 7 performs initialization of work area, setting of variables used for various types of processing which it performs, and so on. Thus, the developing control unit 7 executes developing control unit boot processing as developing start-up processing.

Moreover, at the time of saving start-up, the saving control unit 8 first executes saving control unit boot processing for booting itself, following the corresponding boot program loaded to the program buffer 17. Accordingly, the saving control unit 8 performs initialization of work area, setting of variables used for various types of processing which it performs, and so on.

Upon such saving control unit boot processing being completed, the saving control unit 8 then performs media information obtaining processing in accordance with the corresponding boot program loaded to the program buffer 17. Accordingly, the saving control unit 8 obtains media information from the storage unit 29 within the external media, via the bus 16 and media drive 22, in that order. Note that media information is information indicating the state of formatting of the storage medium 29 (whether formatted or not), the number of saving photograph image data which can still be stored in the storage medium 29 at that point (i.e., empty space in the storage medium 29), and so on. Thus, the saving control unit 8 executes a series of saving control unit boot processing and media information obtaining processing, in that order, as saving start-up processing.

Note that the imaging control unit 5 executes imaging start-up processing using a boot program called a real-time OS, dedicated for imaging start-up processing, with a markedly small data amount and a simple structure. Also, the display control unit 6 executes display start-up processing using a start-up program dedicated for display start-up processing (i.e., real-time OS), with a markedly small data amount and a simple structure. Further, the developing control unit 7 executes developing start-up processing using a boot program dedicated for developing start-up processing (i.e., real-time OS), with a markedly small data amount and a simple structure.

Accordingly, the imaging control unit 5, display control unit 6, and developing control unit 7 can execute the respective imaging start-up processing, display start-up processing, and developing start-up processing, in a much shorter time as compared to a case of using general-purpose boot programs. That is to say, with the digital still camera 1 the amount of time for the imaging start-up processing, display start-up processing, and developing start-up processing, executed by the imaging control unit 5, display control unit 6, and developing control unit 7, is reduced as much as possible.

On the other hand, the saving control unit 8 performs saving start-up processing using a boot program called a multimedia OS, with a relatively great amount of data and a somewhat complicated structure, such as Linux. This means that the saving control unit 8 takes a little longer processing time for the saving start-up processing as compared to a case of using a dedicated boot program. Accordingly, with the digital still camera 1, the processing time which the saving control unit 8 uses for the saving start-up processing is a little longer.

Actually, the imaging control unit 5, display control unit 6, and developing control unit 7 can execute the respective imaging control unit boot processing, display control unit boot processing, and developing control unit boot processing, as the imaging start-up processing, display start-up processing, and developing start-up processing, at nearly the same processing time. The digital still camera 1 is arranged so that, of these, the developing control unit boot processing which the developing control unit 7 executes as developing start-up processing alone, so that of the imaging start-up processing, display start-up processing, and developing start-up processing, the developing start-up processing can be executed in the shortest time of all. Also, with the digital still camera 1, the display start-up processing which the display control unit 6 performs takes a slightly longer amount of processing time than the processing time necessary to develop start-up processing, and the imaging start-up processing which the imaging control unit 5 performs takes a slightly longer amount of processing time than the processing time necessary to display start-up processing.

Conversely, the saving control unit 8 executes the saving control unit boot processing serving as saving start-up processing using a general-purpose boot program. Accordingly, with the digital still camera 1, the saving control unit boot processing takes slightly longer processing time as compared to the imaging control unit boot processing, display control unit boot processing, and developing control unit boot processing.

Also, the saving control unit 8 executes the saving control unit boot processing serving as saving start-up processing while communicating with the storage medium 29 of the external media via the bus 16 and media drive 22 in that order, following the general-purpose boot program. Accordingly, with the digital still camera 1, the media information obtaining processing also takes a little longer processing time. Thus, with the digital still camera 1, of the imaging start-up processing, display start-up processing, developing start-up processing, and saving start-up processing, executed by the imaging control unit 5, display control unit 6, developing control unit 7, and saving control unit 8, the processing time of the saving start-up processing which the saving control unit 8 executes is the longest.

However, as described above, with the digital still camera 1, the imaging control unit 5, display control unit 6, developing control unit 7, and saving control unit 8 start and are performing the imaging start-up processing, display start-up processing, developing start-up processing, and saving start-up processing at almost the same time, in parallel. Accordingly, with the digital still camera 1, the imaging start-up processing, display start-up processing, and developing start-up processing, executed by the imaging control unit 5, display control unit 6, and developing control unit 7, have all ended within the processing time of the saving start-up processing executed by the saving control unit 8. That is to say, with the digital still camera 1 the amount of time from input of the power on command till ending of the imaging start-up processing, display start-up processing, developing start-up processing, and saving start-up processing, executed by the imaging control unit 5, display control unit 6, developing control unit 7, and saving control unit 8, is reduced as much as possible.

Now, upon the imaging system initialization processing executed by the imaging control unit 5 as imaging start-up processing as described above ends, the imaging processing block 20 starts periodic imaging for moving image shooting of the subject, under control of the imaging control unit 5. Accordingly, the imaging processing block 20 generates moving image imaging data by periodically imaging the subject for moving image shooting as described above, and also temporarily stores the generated moving image imaging date in the data buffer 30.

Also, upon the display start-up processing ending, the display control unit 6 reads out a display processing program from the ROM 15 via the bus 16 to the program buffer 17. The display control unit 6 then awaits, for example, the completion of the imaging system initialization processing which is completed at a later point than the ending point of the display start-up processing, in accordance with the display processing program loaded to the program buffer 17. When the imaging system initialization processing is completed, the display control unit 6 executes moving image imaging processing following the display processing program loaded to the program buffer 17. Accordingly, the display control unit 6 reads out a first moving image imaging data from the imaging data buffer 30 where it has been temporarily stored, and generates unit image data, and also sends the generated unit image data to the display unit 21 via the bus 16.

Also, upon sending of the first unit image data to the display unit 21 being completed, the display control unit 6 then executes moving image display processing. Accordingly, the display control unit 6 reads out the second moving image imaging data from the imaging data buffer 30 where it has been temporarily stored, generates unit image data thereof, and sends the generated unit image data to the display unit 21 via the bus 16. Thus, the display control unit 6 sequentially executes moving image display processing from the point of completion of the imaging system initialization processing. Accordingly, the display control unit 6 starts display of moving images (i.e., moving images obtained by imaging the subject for moving image shooting) on the display unit 21, slightly later than the point of completion of the operating system initialization processing, for example.

Figure 2:
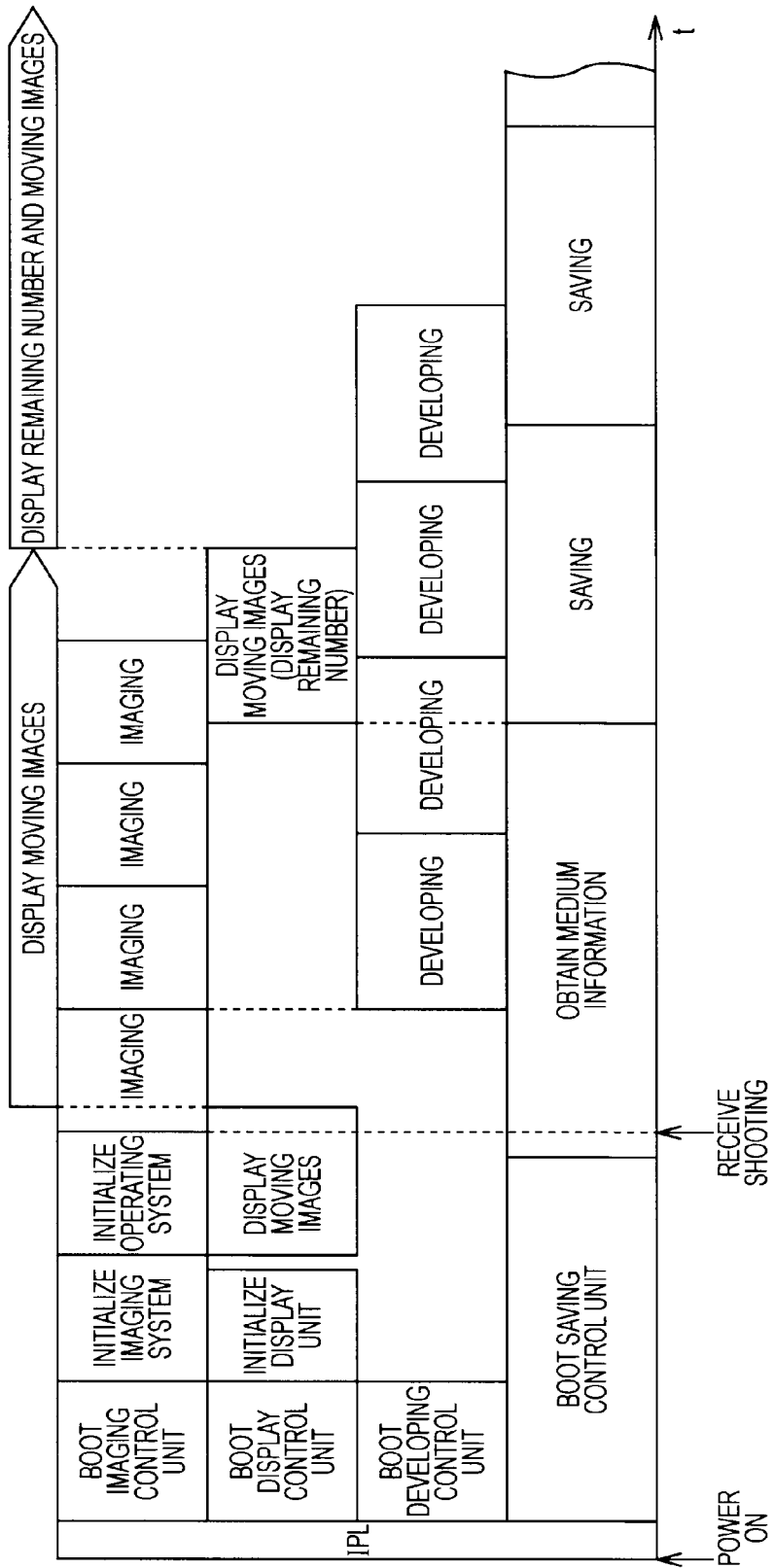
FIG. 2 is a schematic line drawing for describing start-up processing (1) of a digital still camera according to the first embodiment.

It should be noted that FIG. 2 illustrates, of the moving image display processing which the display control unit 6 sequentially executes, only the moving image display processing for generating the first unit image data and sending this to the display unit 21. However, as described above, the display control unit 6 continues to sequentially execute the moving image display processing even after sending the first unit image data to the display unit 21, though not shown in FIG. 2.

Also, upon the media information obtaining processing executed as saving start-up processing ending, for example, the saving control unit 8 starts notifying the display control unit 6 of the number of saving photograph image data which can still be stored in the storage medium 29 at the point in time of completion, as media information. Accordingly, upon notification of the remaining number from the saving control unit 8 starting, the display control unit 6 executes moving image display processing using the remaining number from that point. In this case, the display control unit 6 generates unit information data, and also sends the unit information data to the display unit 21 via the bus 16, in a manner composited with text data indicating the remaining number.

Accordingly, after notification of the remaining number from the saving control unit 8 starting, the display control unit 6 displays the moving image (i.e., each unit image) on the display unit 21 with remaining-number text indicating the remaining number superimposed thereupon. Thus, the display control unit 6 can cause the user to recognize the number of remaining saving photograph image data which still can be recorded in the storage medium 29 with text on the moving image, indicating the remaining number, after notification of the remaining number from the saving control unit 8 starting.

Note that subsequently, each time a saving photograph image data is stored in the storage medium 29 of the external media, the saving control unit 8 updates the remaining number by decrementing one at a time, and also notifies the display control unit 6 of the updated remaining number. Thus, each time the updated remaining number being notified from the saving control unit 8, the text data to be composited with the unit image data is also updated to that indicating the notified remaining number.

It should be noted that FIG. 2 illustrates, of the moving image display processing which the display control unit 6 sequentially executes after starting receiving notification of the remaining number from the saving control unit 8, only the moving image display processing for compositing text data to the unit image data initially. However, the display control unit 6 continues to sequentially execute the moving image display processing wherein text data indicating the remaining number is composited with the unit image data, even after the moving image display processing wherein text data is composited with the unit image data initially, though not shown in FIG. 2.

In addition to this configuration, upon the imaging start-up processing ending (i.e., the operating system initialization processing being completed), the imaging control unit 5 reads out an imaging control program from the ROM 15 via the bus 16 to the program buffer 17. The imaging control unit 5 then performs imaging control processing following the imaging control program loaded to the program buffer 17.

Accordingly, the imaging control unit 5 starts reception of input of a shooting command by operation of the release key. That is to say, the imaging control unit 5 can start shooting photographs of the subject from the point that the imaging start-up processing has ended. Thus, in the event that the release key is operated when the imaging start-up processing has ended, for example, so that a shooting command is input from the operating unit 23, the imaging control unit 5 controls the imaging processing block 20 in the same way as with the above-described input of a shooting command, so as to execute imaging processing for shooting photographs.

That is to say, the imaging control unit 5 drives the shutter 25B so as to image the subject for photograph shooting with the imaging device 25C. Also, the imaging control unit 5 causes the imaging processing block 20 to generate photography imaging data based on the photoelectric conversion signals obtained by imaging for photograph shooting, temporarily stores the photography imaging data in the imaging data buffer 30, and ends the imaging processing. Upon ending the temporarily storage of the photography imaging data in the imaging data buffer 30 (i.e., ending the imaging processing), the imaging control unit 5 receives input of shooting commands again.

Thus, upon a shooting command being input by the user pressing a release key after ending of the imaging start-up processing, the imaging control unit 5 accordingly causes the imaging processing block 20 to perform imaging processing. Thus, the imaging control unit 5 causes the imaging processing block 20 to image the subject for photography shooting and generates photography imaging data, which is temporarily stored in the imaging data buffer 30.

Upon the developing start-up processing ends, the developing control unit 7 reads out, from the ROM 15, a developing processing program stored therein beforehand, via the bus 16 to the program buffer 17. Also, the developing control unit 7 follows the developing processing program loaded to the program buffer 17 and awaits temporarily storage in the imaging data buffer 30 of photography imaging data which has not been subjected to developing processing (i.e., unprocessed). Upon detecting unprocessed photography imaging data temporarily stored in the imaging data buffer 30, the developing control unit 7 executes developing processing in the same way as described above, following the developing processing program loaded to the program buffer 17.

Accordingly, the developing control unit 7 reads out unprocessed photography imaging data from the imaging data buffer 30, and also generates compressed photograph image data based on the unprocessed photography imaging data that has been read out, and temporarily stores the compressed photograph image data in the photograph data buffer 31.

Also, upon ending temporary storage of the compressed photograph image data in the photograph data buffer 31 (i.e., upon developing processing for one photography imaging data being ended), the developing control unit 7 detects whether or not a new photography imaging data has been temporarily stored in the imaging data buffer 30. Consequently, upon detecting that new photography imaging data has been temporarily stored in the imaging data buffer 30, the developing control unit 7 executes developing processing again.

Thus, upon the developing start-up processing ending, the developing control unit 7 detects the photography imaging data that has been temporarily stored in the imaging data buffer 30, in order from old to new in the period of temporary storing, and also executes developing processing based on the detection results. That is to say, the developing control unit 7 uses the photography imaging data that has been temporarily stored in the imaging data buffer 30 in order from old to new in the period of temporary storing to generate compressed photograph image data, which is then temporarily stored in the photograph data buffer 31.

Upon the saving start-up processing ending, the saving control unit 8 reads out, from the ROM 15, a saving processing program stored therein beforehand, via the bus 16 to the program buffer 17. Also, the saving control unit 8 follows the saving processing program loaded to the program buffer 17 to detect whether or not there is temporarily stored in the image data buffer 31 any compressed photograph data which has not been subjected to saving processing (i.e., unprocessed). Upon detecting that there is unprocessed compressed photograph data temporarily stored in the image data buffer 31, the saving control unit 8 executes saving processing in the same way as described above, following the saving processing program loaded to the program buffer 17.

Accordingly, the saving control unit 8 reads out unprocessed compressed photograph data from the image data buffer 31. The saving control unit 8 then generates saving photograph image data based on the compressed photograph data, and stores the generated saving photograph image in the storage medium 29 of the external media.

Also, upon ending storing of the saving photograph image data in the storage medium 29 of the external media (i.e., upon saving processing of one compressed photograph image data ending), the saving control unit 8 detects whether or not there is new compressed photograph image data temporarily stored in the image data buffer 31. Consequently, upon detecting that there is new compressed photograph image data temporarily stored in the image data buffer 31, the saving control unit 8 starts saving processing again.

Thus, upon saving start-up processing ending, the saving control unit 8 detects the compressed photograph image data temporarily stored in the image data buffer 31, in order from old to new according to the temporarily stored period, and executes saving processing in accordance with the detected results thereof. That is to say, the saving control unit 8 generates saving photograph image data using the compressed photograph image data temporarily stored in the image data buffer 31, in order from old to new according to the temporarily stored period, and stores this in the storage medium 29 of the external media.

The digital still camera 1 thus executes the imaging start-up processing, display start-up processing, developing start-up processing, and saving start-up processing, with the imaging control unit 5, display control unit 6, developing control unit 7, and saving control unit 8, in parallel. This means that with the digital still camera 1, after the imaging control unit 5 ends the imaging start-up processing, imaging processing corresponding to input of a shooting command can be performed without being interrupted at all by execution of the other display start-up processing, developing start-up processing, and saving start-up processing. Thus, with the digital still camera 1, upon the imaging control unit 5 ending the imaging start-up processing, the photograph shooting of the subject can be performed, one after another.

Now, after the display start-up processing ending, the display control unit 6 displays a moving image obtained by moving image imaging of the subject. Accordingly, the display control unit 6 allows the user to confirm the imaging state of the subject by displaying the moving image thereof, and also allows the user to intuitively recognize that photograph shooting of the subject can be performed.

However, in the event that the imaging processing block 20 executes imaging processing in accordance with input of a shooting command while the display control unit 6 is executing moving image display processing, generating of new moving image imaging data and temporary saving to the imaging data buffer 30 is interrupted during that time. That is to say, upon imaging processing being executed in accordance with input of a shooting command, the display control unit 6 interrupts reading out of new moving image imaging data from the imaging data buffer 30.

Accordingly, while imaging processing is performed during moving image display processing, the display control unit 6 does not generate new unit image data, and accordingly sends the unit image data generated and sent to the display unit 21 immediately before, to the display unit 21 again, as moving image display processing, as one example. This means that while imaging processing is being executed, the display control unit 6 temporarily pauses display of the moving image at the display unit 21 with one unit image displayed.

Upon the imaging processing ending, and generating and temporary storage of the moving image imaging data being resumed, the display control unit 6 accordingly resumes generating of the unit image data and sending to the display unit 21, so the paused display of the moving image at the display unit 21 is released and the moving image is displayed again.

Thus, the display control unit 6 can notify the user that photograph shooting of the subject has been performed in accordance with the input of the shooting command, by changing the display state of the moving image to be displayed on the display unit 21. However, as can be clearly seen from FIG. 2, the imaging control unit 5 ends the imaging start-up processing before the display control unit 6 starts to display the moving image on the display unit 21, and is capable of shooting photographs of the subject from the point of the imaging start-up processing ending.

This is why the digital still camera 1 shown in FIG. 1 is provided with a light-emitting unit 32, for notifying that photograph shooting is available, on a predetermined location on the housing case. Upon the imaging start-up processing ending and photograph shooting becoming available, the imaging control unit 5 lights the light-emitting unit 32 with a predetermined color light. Thus, the imaging control unit 5 can notify the user that photograph shooting of the subject is available, even before display of the moving image on the display unit 21 is started by the display control unit 6. That is to say, in the event that photograph shooting of the subject as quick as possible from the point of the user inputting the power on command is desired, the imaging control unit 5 can notify the point at which photograph shooting of the subject has become available, in a sure manner.

Now, note that with the digital still camera 1, the saving start-up processing takes longer processing time than the processing time the imaging start-up processing takes, as described above, and unless the saving start-up processing ends, the saving control unit 8 has no way of generating the saving photograph image data and storing this in the storage medium 29. That is to say, with the digital still camera 1, even if an arrangement is made where the subject can be shot at the point that the imaging start-up processing ends, no generating of saving photograph image data corresponding to the photograph shooting, nor storage to the storage medium 29, can be performed until the saving start-up processing of the saving control unit 8 ends.

Accordingly, the digital still camera 1 is provided with the imaging data buffer 30 as described above. The storage capacity of the imaging data buffer 30 is appropriately set according to the maximum number regarding which imaging processing can be started from the point of ending the imaging start-up processing to the point of ending the saving start-up processing (i.e., the maximum number regarding which shooting commands can be input).

Note that the imaging data buffer 30 is also used for temporarily storing moving image imaging data. Accordingly, the storage capacity of the imaging data buffer 30 is set so as to temporarily store at least four or more pieces of photography imaging data besides the moving image imaging data. In actual figures, in the event that the resolution of the imaging device 25C is 2 million pixels, the storage capacity of the imaging data buffer 30 is a value obtained by adding 8 megabytes which is the data amount for at least four pieces of photography imaging data, and the storage capacity for temporarily storing moving image imaging data. Also, in the event that the resolution of the imaging device 25C is 3 million pixels, the storage capacity of the imaging data buffer 30 is a value obtained by adding 16 megabytes which is the data amount for at least four pieces of photography imaging data, and the storage capacity for temporarily storing moving image imaging data.

Upon a shooting command being input, the imaging control unit 5 detects an empty region in the imaging data buffer 30 fir temporarily storing the photography imaging data. Accordingly, the imaging control unit 5 temporarily stores the photography imaging data in the empty region of the imaging data buffer 30. More specifically, in the event that a storage region exists in the imaging data buffer 30 where no data has been recorded, the imaging control unit 5 detects the unrecorded storage region as an empty region and temporarily stores the photography imaging data in the detected empty region, but in the event that there are multiple pieces of photography imaging data temporarily stored in the imaging data buffer 30 with no unrecorded region therein, the imaging control unit 5 detects, from the storage regions where photography imaging data is temporarily stored, a storage region where photography imaging data has already been read out from, as an empty region.

In the event that the imaging control unit 5 detects a storage region in the imaging data buffer 30 as an empty region for photography imaging data, the new photography imaging data is temporarily stored in the imaging data buffer 30 at the detected empty region, by being overwritten on the photography imaging data which has been already read out. Thus, upon imaging processing being performed in accordance with input of a shooting command, the imaging control unit 5 generates photography imaging data, and can also temporarily store the photography imaging data in the imaging data buffer 30.

However, the developing control unit 7 starts sequential execution of the developing processing later than the imaging control unit 5 starts the imaging processing by way of the imaging processing block 20 sequentially, so the developing processing takes a longer processing time than the processing time of the developing processing. Accordingly, if the user consecutively inputs shooting commands for example, at first, the imaging control unit 5 can generate the photography imaging data by performing imaging processing, and further temporarily store the photography imaging data in the imaging data buffer 30.

However, if the number of consecutive inputs of shooting commands reaches a certain number, there may be cases wherein photography imaging data is generated by performing imaging processing, but the readout of the photography imaging data from the imaging data buffer 30 by the developing control unit 7 is not in time, and it becomes difficult to secure empty region. That is to say, upon the consecutive input of shooting commands reaching a certain number, even if the imaging control unit 5 generates photography imaging data in accordance with input of shooting commands, the imaging data buffer 30 may not be able to temporarily store the photography imaging data.

Accordingly, upon the user operating the release key and a shooting command being input, the imaging control unit 5 detects whether or not there is empty region in the imaging data buffer 30 before imaging the subject for photograph shooting. In the event that there is empty region in the imaging data buffer 30, the imaging control unit 5 receives the shooing command input by the user and executes the imaging processing, so as to generate photography imaging data and temporarily store in the imaging data buffer 30. On the other hand, in the event that there is no such empty region in the imaging data buffer 30, the imaging control unit 5 invalidates the shooting command input by the user, so that imaging processing is not performed.

If a shooting command is input but imaging processing is not executed, the display control unit 6 generates unit image data based on the moving image imaging data generated by the imaging processing block 20, and sends this to the display unit 21. Accordingly, in the event that a shooting command is input but imaging processing is not executed, the display control unit 6 continues to display the moving image on the display unit 21 with no change in state. Thus, the display control unit 6 allows the user to intuitively recognize that photograph shooting is currently unavailable even in the event that a shooting command is input, and thus prompt the user to input a shooting command at a later point.

The storage capacity of the image data buffer 31 is such that multiple pieces of compressed photograph image data can be temporarily stored at the same time. The developing control unit 7 detects an empty region in the image data buffer 31 for temporarily storing the compressed photograph image data. Accordingly, the display control unit 6 temporarily stores the compressed photograph image data in the empty region of the image data buffer 31.

In the event that there is an unstored region in the image data buffer 31, the developing control unit 7 detects the unstored region as an empty region, and temporarily stores the compressed photograph image data in the detected empty region. On the other hand, if there is no unstored region in the image data buffer 31 due to multiple pieces of compressed photograph image data being temporarily stored therein, the developing control unit 7 detects, of the storage regions where compressed photograph image data is temporarily stored, a region where compressed photograph image data which has already been read out is stored, as an empty region. In the event that the developing control unit 7 has detected a storage region of compressed photograph image data as an empty region in the image data buffer 31, the new compressed photograph image data is temporarily stored in the detected empty region by overwriting on the compressed photograph image data which has already been read out.

Now, the saving control unit 8 starts sequentially executing the saving processing later than the developing control unit 7 starts sequentially executing the developing processing, and also takes a longer processing time for the saving processing than the processing time of the developing processing. Accordingly, the storage capacity of the image data buffer 31 is set such that a situation can be avoided wherein readout of compressed photograph image data by the saving control unit 8 does not keep up with the developing control unit 7 generating compressed photograph image data, resulting in securing of empty regions becoming difficult. Accordingly, the developing control unit 7 sequentially generates compressed photograph image data based on the photograph imaging data temporarily stored in the imaging data buffer 30, and also can temporarily store the compressed photograph image data in the image data buffer 31 in a sure manner.

Now, the digital still camera 1 operates on power supplied from an internal power source block (i.e., a battery) as described above. The battery is of a nature wherein, in the event that the amount of power (electrical current) to be supplied at once increases, the same processing is sequentially executed in time series, and the remaining battery is depleted quicker than a case of little power (electrical current) being supplied at once. Accordingly, upon starting imaging control processing when the imaging start-up processing has ended, the imaging control unit 5 first detects the remaining battery by communicating with the power source block, and compares this with a predetermined threshold to determine whether or not the battery has been depleted to a certain level.

In the event that the remaining battery amount is at the predetermined threshold or higher, the imaging control unit 5 immediately receives input of shooting commands by operations of the release key, so that photography shooting of the subject can be performed. Accordingly, even in the vent that a shooting command is input at the point of ending the imaging start-up processing, as shown in FIG. 2, the imaging control unit 5 can execute imaging processing at the imaging processing block 20.

Figure 3:
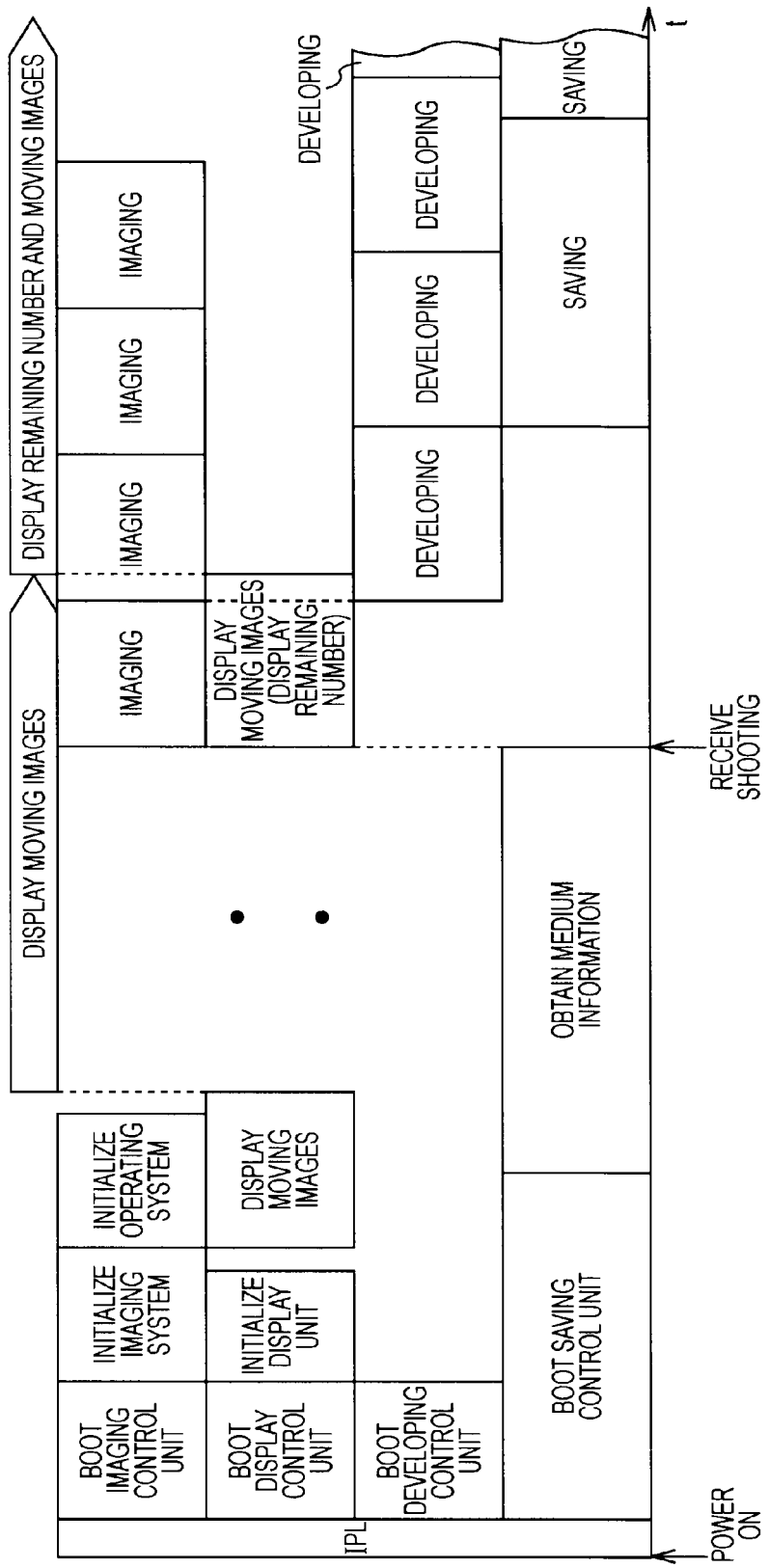
FIG. 3 is a schematic line drawing for describing start-up processing (2) of the digital still camera according to the first embodiment.

On the other hand, in the event that the remaining battery amount is below the predetermined threshold, as shown in FIG. 3, even if a shooting command is input by the release key having been operated, the imaging control unit 5 invalidates the input of the shooting command. That is to say, in the event that the remaining amount of the battery is below the threshold, starting of receiving of input of shooting commands is put on hold (e.g., even if a shooting command is input, the input thereof is ignored (invalidated)).

In this state, the imaging control unit 5 awaits the saving start-up processing executed at the saving control unit 8 to end. Upon the sating start-up processing ending, the imaging control unit 5 starts reception of input of shooting commands by operation of the release key, so that photograph shooting of the subject can be performed. Accordingly, upon a shooting command being input from the operating unit 23 due to the release key having been operated at the time of ending of the saving start-up processing by the saving control unit 8, the imaging control unit 5 controls the imaging processing block 20 so as to execute the imaging processing for photograph shooting.

Accordingly, the imaging control unit 5 generates photograph image data by causing the imaging processing block 20 to image the subject for photograph shooting, and also temporarily stores the photograph image data in the imaging data buffer 30 and ends the imaging processing. Once temporary storage of the photograph image data in the imaging data buffer 30 has ended (i.e., imaging processing has ended), the imaging control unit 5 receives input of shooting commands again.

Thus, in such cases wherein the remaining battery amount is low, the imaging control unit 5 causes the imaging processing block 20 to execute imaging processing in accordance with input of shooting commands, following ending of the saving start-up processing by the saving control unit 8. Thus, in the event that the remaining battery amount is low a the time of ending imaging start-up processing, the imaging control unit 5 does not perform imaging for photography shooting of the subject until the saving start-up processing, which takes the longest amount of time, ends.

Thus, the imaging control unit 5 reduces the processing to be performed in parallel with the saving start-up processing from the point of ending the imaging start-up processing to the point of ending the saving start-up processing, thus preventing speedy depletion of the remaining battery amount. That is to say, the imaging control unit 5 avoids a situation wherein depletion of the remaining battery amount is sped up from the point of ending the imaging start-up processing to the point of ending the saving start-up processing, leading to imaging processing being unexpectedly interrupted due to a low battery.

1-3. Digital Still Camera Start-Up Processing Procedures

Next, processing procedures to be executed by the imaging control unit 5, display control unit 6, developing control unit 7, and saving control unit 8, in accordance with input of a power on command, will be described with reference to FIGS. 4 through 7.

Figure 4:
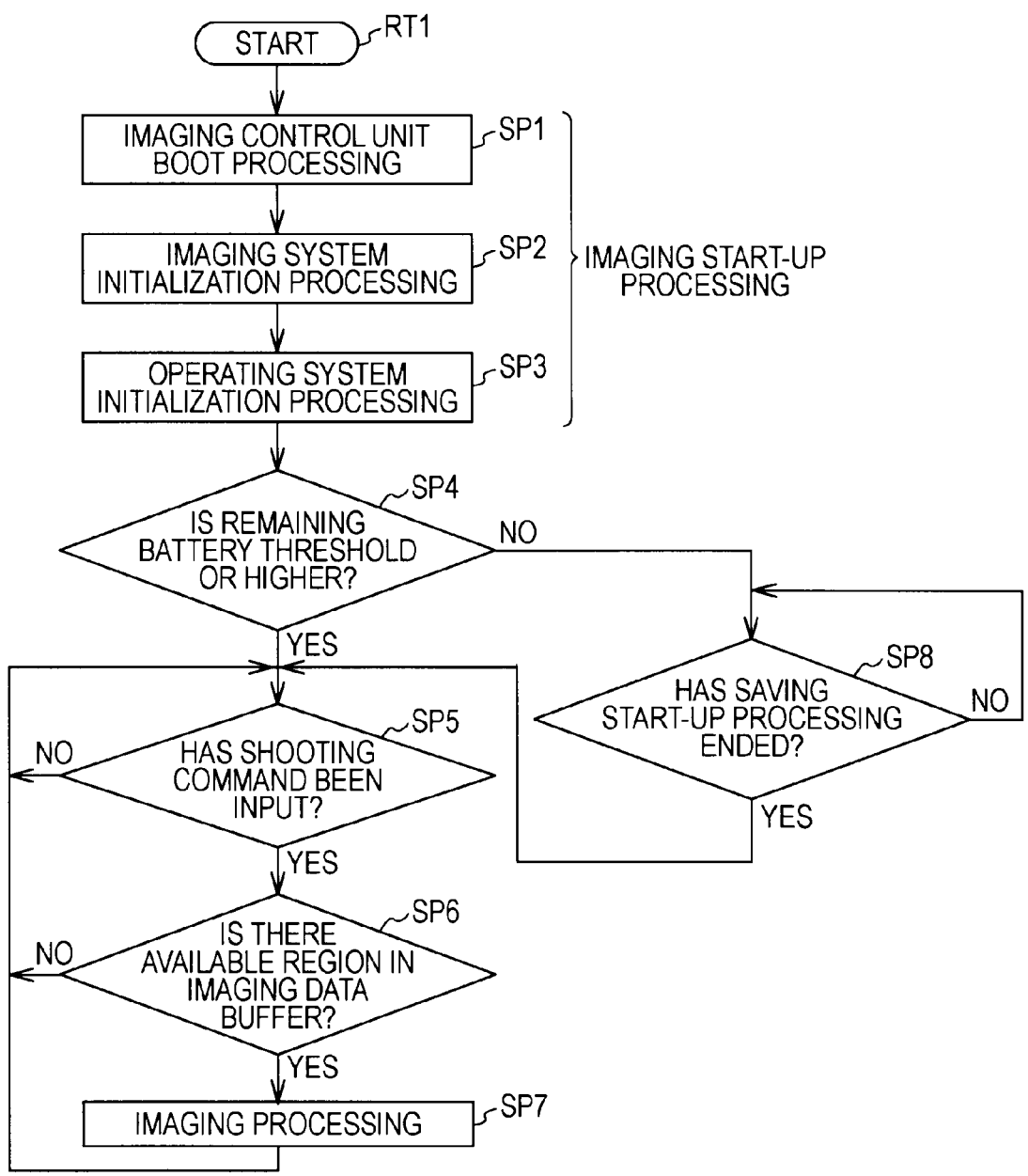
FIG. 4 is a flowchart illustrating start-up imaging processing procedures performed by an imaging control unit according to the first embodiment.

Upon reading a corresponding boot program from the ROM 15 to the program buffer 17 in accordance with input of a power on command, the imaging control unit 5 starts the start-up imaging processing procedure RT1 shown in FIG. 4.

Upon starting the start-up imaging processing procedure RT1, in step SP1 the imaging control unit 5 starts the imaging start-up processing following the corresponding boot program loaded to the program buffer 17. Thus, the imaging control unit 5 executes imaging control unit boot processing, and upon completion of the imaging control unit boot processing, the flow advances to the next step SP2.

In step SP2, the imaging control unit 5 executes imaging system initialization processing, and upon completion of the imaging system initialization processing, the flow advances to the next step SP3.

In step SP3, the imaging control unit 5 executes operating system initialization processing, and upon completion of the operating system initialization processing, the imaging control unit 5 ends the imaging start-up processing, and the flow advances to the next step SP4.

In step SP4, the imaging control unit 5 reads out an imaging control program from the ROM 15 to the program buffer 17 via the bus 16, and starts imaging control processing following the imaging control program loaded to the program buffer 17. The imaging control unit 5 then detects the remaining battery amount and compares this with a threshold, and based on the comparison result determines whether or not the remaining battery amount is at or above the threshold. In the event that a positive result is obtained in this step SP4 this means that the remaining battery amount is sufficient for operating the digital still camera 1 for the time being, so upon obtaining a positive result in step SP4, the imaging control unit 5 starts reception of input of shooting commands by operation of the release key. The imaging control unit 5 also lights the light-emitting unit 32, and the flow advances to step SP5.

In step SP5, the imaging control unit 5 stands by awaiting input of a shooting command from the operating unit 23 due to the user operating the release key, and upon input of a shooting command from the operating unit 23 by to the user, the flow advances to the next step SP6.

In step SP6, the imaging control unit 5 determines whether or not there is an empty region where the photography imaging data can be temporarily stored in the imaging data buffer 30. In the event that a positive result is obtained in step SP6, this means either that there is an empty region in the imaging data buffer 30 where no data is stored whatsoever, or there is an empty region due to the developing control unit 7 having read out photography imaging data. Accordingly, upon obtaining a positive result in step SP6, the imaging control unit 5 advances the flow to the next step SP7.

In step SP7, the imaging control unit 5 controls the imaging processing block 20 and executes imaging processing for photograph shooting. Thus, the imaging control unit 5 generates photography imaging data by imaging a subject for photograph shooting at the imaging processing block 20, and also temporarily stores the generated photography imaging data in the imaging data buffer 30, and the flow returns to step SP5.

Now, in the event that a negative result is obtained in step SP6 described above, this means that readout of photography imaging data by the developing control unit 7 at the imaging data buffer 30 has not caught up and there is no empty region. Accordingly, upon receiving such a negative result in step SP6, the imaging control unit 5 invalidates a shooting command input by the user at this time, and the flow returns to step SP5.

Also, in the event that a negative result is obtained in step SP4, this means that the remaining battery amount is relatively low, and if imaging processing is continued in accordance with input of shooting commands, in a worst-case scenario, image processing may be aborted due to insufficient battery amount. Accordingly, in the event of receiving such a negative result in step SP5, the imaging control unit 5 advances the flow to step SP8.

In step SP8, the imaging control unit 5 awaits ending of the saving start-up processing of the saving control unit 8 in a state of not receiving input of shooting commands. Once the saving start-up processing ends, the imaging control unit 5 starts reception of input of shooting commands due to operation of the release key, and also lights the light-emitting unit 32 and the flow advances to step SP5.

Thus, upon the flow going from step SP4 or step SP8 described above to step SP5, the imaging control unit 5 executes the processing of steps SP5 through SP7. Accordingly, in the event that the user inputs a shooting command by way of the release key, the imaging control unit 5 accordingly generates photography imaging data by imaging the subject for photograph shooting, and temporarily stores the generated photography imaging data in the imaging data buffer 30.

It should be noted that in the event that there is an interrupting input of a power off command from the user by way of the operating unit 23 while executing the start-up imaging processing procedure RT1, the imaging control unit 5 accordingly ends the start-up imaging processing procedure RT1. Also, in the event that there is an interrupting input of a mode switchover command for switching from the imaging mode to display mode by the user by way of the operating unit 23 while executing the start-up imaging processing procedure RT1, the imaging control unit 5 accordingly ends the start-up imaging processing procedure RT1 in this case as well.

Figure 5:
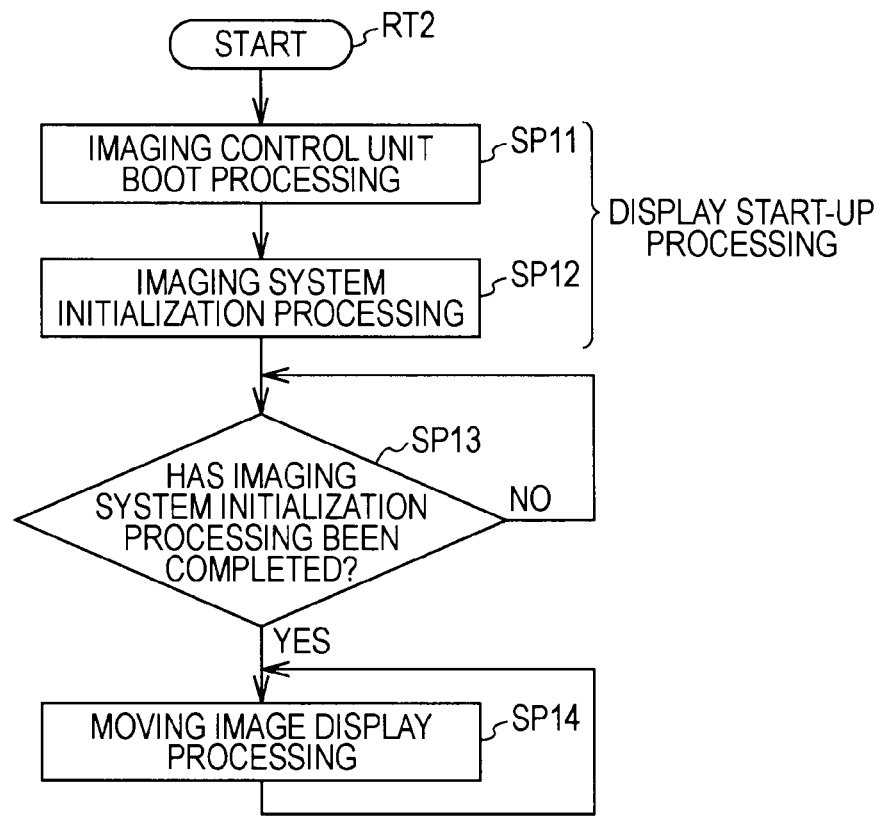
FIG. 5 is a flowchart illustrating start-up display processing procedures performed by a display control unit according to the first embodiment.

Upon reading a corresponding boot program from the ROM 15 to the program buffer 17 in accordance with input of a power on command, the display control unit 6 starts the start-up display processing procedure RT2 shown in FIG. 5.

Upon starting the start-up display processing procedure RT2, in step SP11 the display control unit 6 starts the display start-up processing following the corresponding boot program loaded to the program buffer 17. Thus, the display control unit 6 executes display control unit boot processing, and upon completion of the display control unit boot processing, the flow advances to the next step SP12.

In step SP12, the display control unit 6 executes display initialization processing, and upon the display initialization processing being completed, ends the display start-up processing, and the flow advances to the next step SP13.

In step SP13, the display control unit 6 reads out a display processing program from the ROM 15 via the bus 16 to the program buffer 17. The display control unit 6 awaits completion of the imaging system initialization processing at the imaging control unit 5, following the display processing program loaded to the program buffer 17. Upon the imaging system initialization processing being completed, the display control unit 6 advances the flow to the next step SP14.

In step SP14, the display control unit 6 executes moving image display processing following the display processing program loaded to the program buffer 17, thereby sequentially repeating the processing of step SP14. Thus, the display control unit 6 sequentially reads out moving image imaging data from the imaging data buffer 30, generates unit image data based on the moving image imaging data, and composites the moving image imaging data with text data indicating the remaining number, which is sent to the display unit 21.

Also, in accordance with execution of imaging processing by the imaging processing block 20, the display control unit 6 composites one unit image data with text data as appropriate and repeatedly sends to the display unit 21. Thus, the display control unit 6 displays a moving image obtained by performing moving image shooting of the subject on the display unit 21.

It should be noted that, in the same way as with the imaging control unit 5 executing the start-up imaging processing procedure RT1, in the event that there is an interrupting input of a power off command or mode switch-over command from the user by way of the operating unit 23 while executing the start-up display processing procedure RT2, display control unit 6 ends the start-up display processing procedure RT2.

Figure 6:
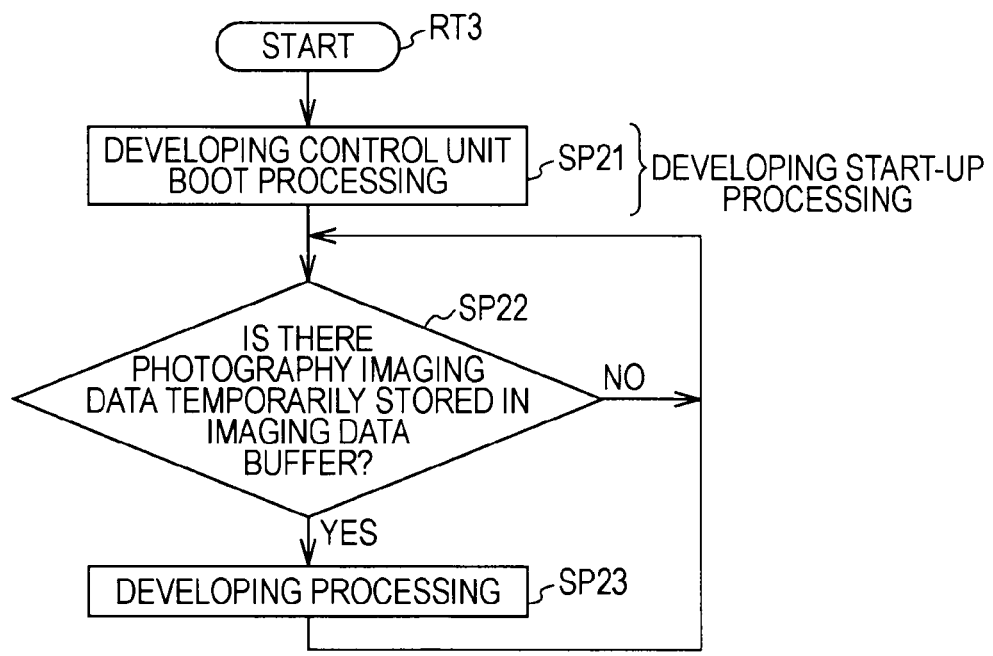
FIG. 6 is a flowchart illustrating start-up developing processing procedures performed by a developing control unit according to the first embodiment.

Upon reading a corresponding boot program from the ROM 15 to the program buffer 17 in accordance with input of a power on command, the developing control unit 7 starts the start-up developing processing procedure RT3 shown in FIG. 6.

Upon starting the start-up developing processing procedure RT3, in step SP21 the developing control unit 7 starts the developing start-up processing following the corresponding boot program loaded to the program buffer 17. Thus, the developing control unit 7 executes developing control unit boot processing, and upon completion of the developing control unit boot processing, the flow advances to the next step SP22.

In step SP22, the developing control unit 7 reads out a developing processing program from the ROM 15 via the bus 16 to the program buffer 17. The developing control unit 7 awaits temporary storage of the photography imaging data in the imaging data buffer 30 in accordance with the developing processing program loaded to the program buffer 17. Upon detecting unprocessed photography imaging data temporarily stored in the imaging data buffer 30 by the imaging processing block 20, developing control unit 7 advances the flow to the next step SP23.

In step SP23, the developing control unit 7 executes developing processing in accordance with the developing processing program loaded to the program buffer 17. Accordingly, the developing control unit 7 reads out unprocessed photography imaging data from the imaging data buffer 30, and also temporarily generates compressed photograph image data based on the photography imaging data and temporarily stores this in the image data buffer 31, following which the flow returns to step SP22.

Thus, the developing control unit 7 cyclically repeats the processing of steps SP22 and SP23 described above. Accordingly, the developing control unit 7 executes developing processing each time it detects unprocessed photography imaging data temporarily stored in the imaging data buffer 30, reads out the photography imaging data from the imaging data buffer 30, generates compressed photograph image data, and temporarily stores this in the image data buffer 31.

It should be noted that, in the same way as with the imaging control unit 5 executing the start-up imaging processing procedure RT1, in the event that there is an interrupting input of a power off command or mode switch-over command from the user by way of the operating unit 23 while executing the start-up developing processing procedure RT3, the developing control unit 7 ends the start-up developing processing procedure RT3.

Figure 7:
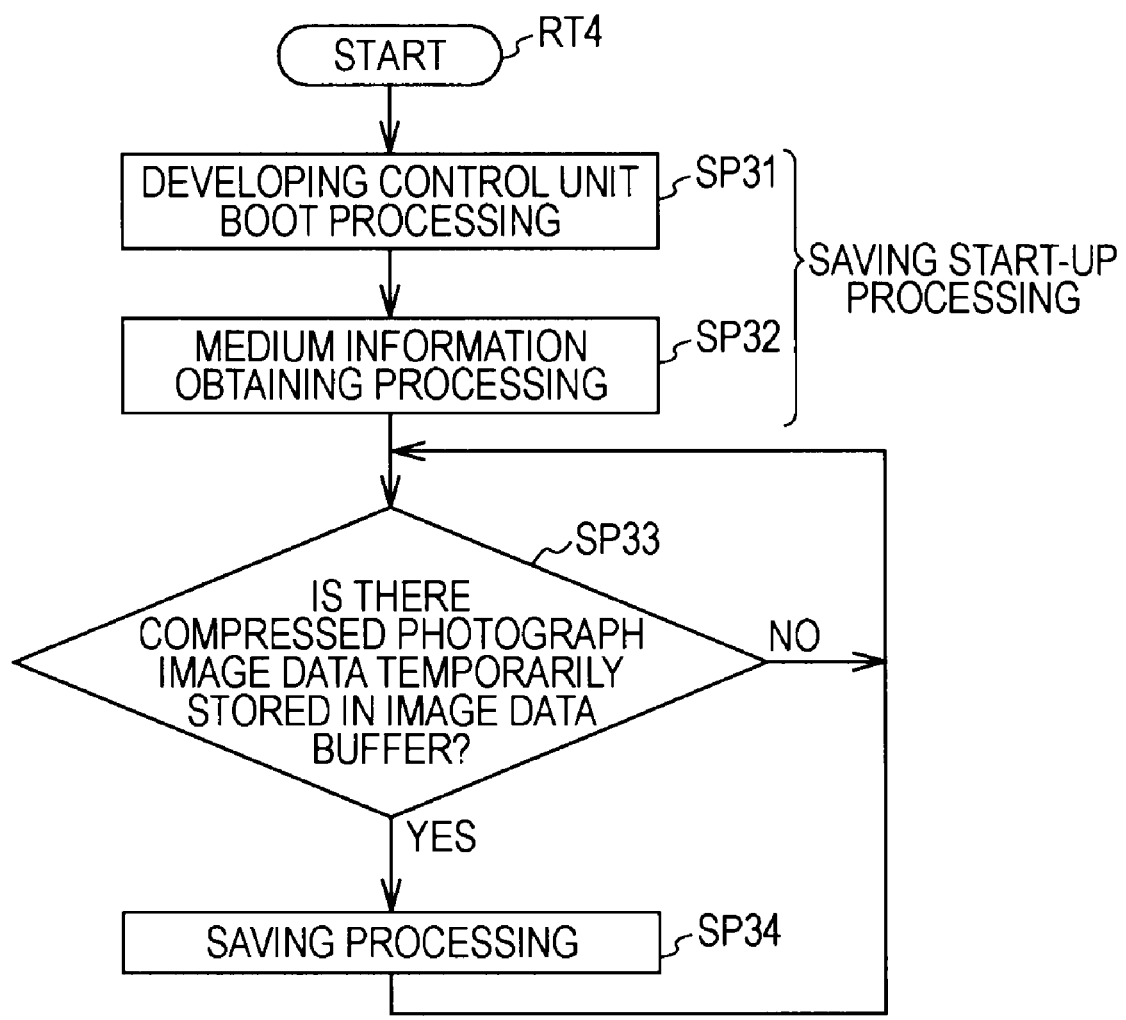
FIG. 7 is a flowchart illustrating start-up saving processing procedures performed by a saving control unit according to the first embodiment.

Upon reading a corresponding boot program from the ROM 15 to the program buffer 17 in accordance with input of a power on command, the saving control unit 8 starts the start-up saving processing procedure RT4 shown in FIG. 7.

Upon starting the start-up saving processing procedure RT4, in step SP31 the saving control unit 8 starts the saving start-up processing following the corresponding boot program loaded to the program buffer 17. Thus, the saving control unit 8 executes saving control unit boot processing, and upon completion of the saving control unit boot processing, the flow advances to the next step SP32.

In step SP32, the saving control unit 8 executes medium information obtaining processing, and upon the medium information obtaining processing being completed, ends the saving start-up processing, and the flow advances to the next step SP33.

In step SP33, the saving control unit 8 reads out a saving processing program from the ROM 15 via the bus 16 to the program buffer 17. The saving control unit 8 awaits temporary storage of the compressed photograph image data in the image data buffer 31 in accordance with the saving processing program loaded to the program buffer 17. Upon detecting unprocessed compressed photograph image data temporarily stored in the image data buffer 31 by the developing control unit 7, the saving control unit 8 advances the flow to the next step SP34.

In step SP34, the saving control unit 8 executes saving processing in accordance with the saving processing program loaded to the program buffer 17. Thus, the saving control unit 8 reads out unprocessed compressed photograph image data from the image data buffer 31, generates saving photograph image data based on the compressed photograph image data, stores this in the storage medium 29 of the external media, and the flow returns to step SP33.

Thus, the saving control unit 8 cyclically repeatedly executes the processing of steps SP33 and SP34 described above. Accordingly, the saving control unit 8 executes saving processing each time it detects unprocessed compressed photograph image data temporarily stored in the image data buffer 31, reads out the compressed photograph image data from the image data buffer 31, generates saving photograph data, and stores in the storage medium 29.

It should be noted that, in the same way as with the imaging control unit 5 executing the start-up imaging processing procedure RT1, in the event that there is an interrupting input of a power off command or mode switch-over command from the user by way of the operating unit 23 while executing the start-up saving processing procedure RT4, the saving control unit 8 ends the start-up saving processing procedure RT4.

Further, in the case of the first embodiment, in the event that there is an interrupting input of a power off command or mode switch-over command from the user by way of the operating unit 23, the imaging control unit 5, display control unit 6, developing control unit 7, and saving control unit 8 acquire the power off command or mode switch-over command at approximately the same timing.

Also, in the event of acquiring a power off command or mode switch-over command during the above-described start-up imaging processing procedure RT1 or the like, the imaging control unit 5, display control unit 6, developing control unit 7, and saving control unit 8 generate an input interruption at the timing of acquisition thereof.

In the event that there is an input interruption during execution of the start-up imaging processing procedure RT1 (i.e., generating an input interruption), the imaging control unit 5 determines whether or not the imaging processing block 20 is in the process of executing imaging processing for photograph shooting. In the event that the imaging processing block 20 is not performing any imaging processing for photograph shooting when the input interruption occurred, the imaging control unit 5 ends the start-up imaging processing procedure RT1.

On the other hand, in the event that the imaging processing block 20 is in the process of performing imaging processing for photograph shooting when the input interruption occurred, the imaging control unit 5 allows the imaging processing to continue. Accordingly, at this time, the imaging control unit 5 generates photography image data with the imaging processing block 20 which is temporarily stored in the imaging data buffer 30, and upon the imaging processing ending, the imaging control unit 5 ends the start-up imaging processing RT1. Upon the start-up imaging processing RT1 ending, the imaging control unit 5 notifies the developing control unit 7 to that end.

In the event that there is an input interruption during execution of the start-up developing processing procedure RT3 (i.e., generating an input interruption), the developing control unit 7 firstly determines whether or not the in the process of executing developing processing. If not in the process of executing developing processing, the developing control unit 7 secondly determines whether or not developing processing has ended for all photography imaging data temporarily stored in the imaging data buffer 30.

If developing processing has ended for all photography imaging data temporarily stored in the imaging data buffer 30, the developing control unit 7 thirdly determines whether or not the imaging control unit 5 is in the process of executing imaging processing at the point of the input interruption. That is to say, the developing control unit 7 determines whether or not the imaging control unit 5 will temporarily store new photography imaging data in the imaging data buffer 30 at a point later than the input interruption and end the start-up imaging processing procedure RT1. If the imaging control unit 5 is not in the process of executing imaging processing at the point of the input interruption, the developing control unit 7 ends the start-up developing processing RT3.

Now, if found to be in the process of executing developing processing at the point of the input interruption as the result of the first determination described above, the developing control unit 7 continues the developing processing as it is. Accordingly, the developing control unit 7 generates the compressed photograph image data based on the photography imaging data, temporarily stores this in the image data buffer 31 and ends the developing processing. Upon ending the developing processing being executed at the point of the input interruption in this way, the developing control unit 7 subsequently sequentially performs the second and third determination in the same way as above.

Also, if unprocessed photography imaging data is found to be remaining in the imaging data buffer 30 as a result of the second determination described above, the developing control unit 7 executes developing processing. Accordingly, the developing control unit 7 generates compressed photography image data based on the unprocessed photography imaging data remaining in the imaging data buffer 30, and temporarily stores in the image data buffer 31. Thus, upon ending developing processing of all unprocessed photography imaging data remaining in the imaging data buffer 30, the developing control unit 7 subsequently performs the third determination in the same way as above.

Further, if the imaging control unit 5 is found to be in the process of executing imaging processing at the point of the input interruption as a result of the third determination described above, the developing control unit 7 temporarily stores new photography imaging data in the imaging data buffer 30 and awaits for the start-up imaging processing procedure RT1 to end. Upon the new photography imaging data being stored in the imaging data buffer 30 and the start-up imaging processing procedure RT1 ending, the developing control unit 7 executes developing processing. Accordingly, the developing control unit 7 reads out photography imaging data newly temporarily stored (i.e., after the point of input interruption) from the image data buffer 30. Also, the developing control unit 7 generates compressed photograph image data based on the photography imaging data, temporarily stores in the image data buffer 31, and ends the start-up developing processing procedure RT3 along with ending the developing processing.

Upon the developing control unit 7 ending the start-up developing processing procedure RT3, the end thereof is notified to the saving control unit 8. In the event that there is an input interruption while executing the start-up saving processing procedure RT4 (i.e., in the event that an input interruption occurs), firstly, the saving control unit 8 determines whether or not saving processing was in the process of being performed at the point that there was the input interruption. If the saving control unit 8 is found not to be performing saving processing as a result, secondly, determination is made regarding whether or not saving of all compressed photograph image data temporarily stored in the image data buffer 31 has ended.

If the saving control unit 8 is found not have ended saving of all compressed photograph image data temporarily stored in the image data buffer 31, thirdly, determination is made regarding whether or not the developing control unit 7 will end the start-up developing processing procedure RT3 at the point of the input interruption. That is to say, the saving control unit 8 determines whether or not the developing control unit 7 will temporarily store new compressed photograph image data in the image data buffer 31 and end the start-up developing processing procedure RT3 after the point of the input interruption. In the event that the developing control unit 7 ends the start-up developing processing procedure RT3 at the point of the input interruption, the saving control unit 8 ends the start-up saving processing procedure RT4.

Now, in the event that, as the result of the first determination described above, the saving control unit 8 is found to be in the process of executing saving processing at the point of the input interruption, the saving processing is continued as it is. Accordingly, the saving control unit 8 generates saving photograph image data based on the compressed photograph image data and stores this in the storage medium 29 of the external media, and ends the saving processing. Upon ending the saving processing being performed at the point of input interruption, the saving control unit 8 subsequently sequentially performs the second and third determination in the same way as above.

Also, in the event that, as the result of the second determination described above, unprocessed compressed photograph image data is found to be remaining in the image data buffer 31, the saving control unit 8 performs saving processing. Accordingly, the saving control unit 8 generates saving photograph image data based on the unprocessed compressed photograph image data remaining in the image data buffer 31, and stores this in the storage medium 29 of the external media. Upon ending the saving processing of all of the unprocessed compressed photograph image data remaining in the image data buffer 31, the saving control unit 8 subsequently performs the third determination in the same way as above.

Further, in the event that, as the result of the third determination described above, the developing control unit 7 does not end the start-up developing processing procedure RT3 at the point of the input interruption, new compressed photograph image data is temporarily stored in the image data buffer 31, and the saving control unit 8 awaits ending of the start-up developing processing procedure RT3.

Upon the start-up developing processing procedure RT3 of the developing control unit 7 ending after the point of the input interruption, the saving control unit 8 executes saving processing. Thus, the saving control unit 8 reads out compressed image data newly temporarily stored in the image data buffer 31 (i.e., after the point of the input interruption). Also, the saving control unit 8 generates saving photograph image data based on the compressed photograph image data, stores this in the storage medium 29 of the external media, and ends the start-up saving processing procedure RT4 along with ending the saving processing.

1-4. Operations and Advantages of First Embodiment

In the above configuration, upon the user operating the power key in a power off state so as to input an power on command, the digital still camera 1 performs imaging start-up processing of the imaging control unit 5, developing start-up processing of the developing control unit 7, and saving start-up processing of the saving control unit 8, in parallel.

Upon the imaging start-up processing of the imaging control unit 5 ending, the digital still camera 1 receives input of shooting commands for photograph shooting, thereby enabling photography shooting of a subject. In the event that a shooting command is input in this state of the digital still camera 1, the imaging control unit 5 controls the imaging processing block 20 to image the subject for photograph shooting and generate photography imaging data, and also temporarily store the photography imaging data in the imaging data buffer 30.

Also, with the digital still camera 1, the developing control unit 7 generates compressed photograph image data by reading out photography imaging data from the imaging data buffer 30 and performing developing processing, and temporarily stores the compressed photograph image data in the image data buffer 31.

Further, with the digital still camera 1, the saving control unit 8 reads out the compressed photograph image data from the image data buffer 31 and performs saving processing, thereby generating saving photograph image data, and stores the saving photograph image data in the storage medium 29 of the external media.

Accordingly, with the digital still camera 1, upon the imaging start-up processing of the imaging control unit 5 ending, the imaging control unit 5 can control the imaging processing block 20 without being obstructed by the developing start-up processing of the developing control unit 7 or the saving start-up processing of the saving control unit 8. Thus, with the digital still camera 1, upon the imaging start-up processing of the imaging control unit 5 ending, the imaging control unit 5 can cause the imaging processing block 20 to continuously perform imaging of the subject for photograph shooting.

According to the above configuration, with the digital still camera 1, upon a power on command being input, imaging start-up processing of the imaging control unit 5, developing start-up processing of the developing control unit 7, and saving start-up processing of the saving control unit 8, are performed in parallel, and upon a shooting command being input after the imaging start-up processing of the imaging control unit 5 ending, the imaging control unit 5 controls the imaging processing block 20 to image the subject of photograph shooting and generate photography imaging data, and also temporarily store the photography imaging data in the imaging data buffer 30.

Thus, with the digital still camera 1, upon the imaging start-up processing of the imaging control unit 5 ending, the imaging control unit 5 can control the imaging processing block 20 without being obstructed by the developing start-up processing of the developing control unit 7 or the saving start-up processing of the saving control unit 8. Accordingly, the ease-of-use of the digital still camera 1 can be markedly improved as compared with digital still cameras according to the related art.

Also, with the digital still camera 1, upon a power on command being input, imaging start-up processing of the imaging control unit 5, developing start-up processing of the developing control unit 7, and saving start-up processing of the saving control unit 8, are started at approximately the same time. Thus, with the digital still camera 1, the amount of time taken from the point of input of the power on command the point of ending imaging start-up processing can be minimized, without interruption of other processing, so photograph shooting of the subject can be started at an earliest point from input of the power on command. Accordingly, with the digital still camera 1, cases where the user misses a photograph opportunity can be avoided maximally.

Further, the digital still camera 1 is provided with a display control unit 6 for displaying moving images obtained by imaging the subject for moving image shooting on the display unit 21. Upon a power on command being input, with the digital still camera 1, imaging start-up processing of the imaging control unit 5, developing start-up processing of the developing control unit 7, and saving start-up processing of the saving control unit 8, are started in parallel with the display start-up processing of the display control unit 6 as well.

Thus, with the digital still camera 1, upon the imaging start-up processing of the imaging control unit 5 ending, the imaging control unit 5 can control the imaging processing block 20 without being obstructed by not only the developing start-up processing of the developing control unit 7 or the saving start-up processing of the saving control unit 8, but also the display start-up processing of the display control unit 6 as well. Accordingly, the ease-of-use of the digital still camera 1 can be markedly improved as compared with digital still cameras according to the related art.

Further, with the digital still camera 1, while an arrangement has been made wherein photograph shooting of the subject can be performed after ending of the imaging start-up processing, in the event that there is no empty space in the imaging data buffer 30 for temporary storing of photography imaging data at the point that a shooting command has been input, the shooting command is invalidated. Accordingly, the digital still camera 1 can prevent a case wherein the user shoots a photograph of the subject and photography imaging data is generated, but is lost before being stored in the storage medium 29 of the external media as saving photograph image data.

Further, with the digital still camera 1, in the event that the remaining battery amount is below a threshold at the point of ending the imaging start-up processing, starting of photograph shooting is put on hold until saving start-up processing, which takes the longest processing time of the imaging start-up processing, display start-up processing, developing start-up processing, and saving start-up processing, ends. Accordingly, with the digital still camera 1, the processing to be performed in parallel form the point of ending the imaging start-up processing tot the point of ending the saving start-up processing is reduced, thus preventing the remaining battery amount from being depleted quickly.

Further, with the digital still camera 1, upon a power off command being input when in the photograph mode, the operations of the display control unit 6 are immediately stopped, but the operations of the imaging control unit 5 are stopped after imaging processing being performed is completed. Also, at this time, the digital still camera 1 stops operations of the developing control unit 7 after developing processing being executed is completed and also all photography imaging data remaining without being subjected to developing processing has been subjected to developing processing.

Further, the digital still camera 1 stops operations of the saving control unit 8 after saving processing performed is completed, and all compressed photograph image data remaining without being subjected to saving processing is subjected to saving processing. Thus, the digital still camera 1 stops the operations of the display control unit 6, imaging control unit 5, developing control unit 7, and saving control unit 8, in that order, in accordance with input of a power off command, so as to complete saving of all saving photograph image data obtained by photograph shooting.

Thus, with the digital still camera 1, a situation can be prevented wherein photography imaging data or compressed photograph image data which are the base for saving photograph image data is erased due to input of a power off command, and photographs shot so far are lost.

2. Second Embodiment

2-1. Circuit Configuration of Digital Still Camera

Figure 8:
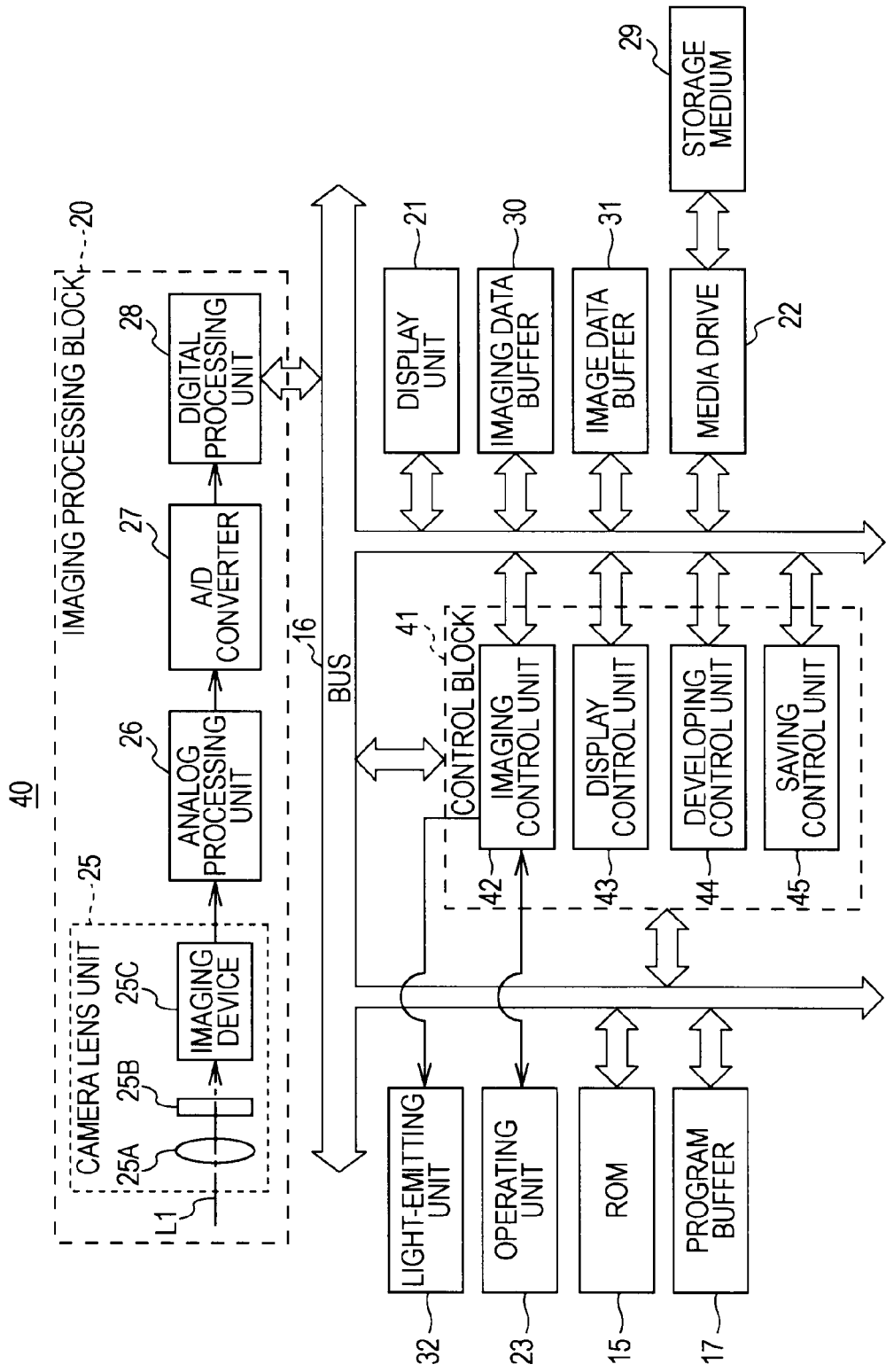
FIG. 8 is a block diagram illustrating the circuit configuration of a digital still camera according to a second embodiment.

FIG. 8 illustrates a digital still camera 40 according to a second embodiment, with portions corresponding to FIG. 1 denoted by the same reference numerals. The digital still camera 40 is configured the same way as with the digital still camera 1 according to the first embodiment except for the configurations of an imaging control unit 42, a display control unit 43, a developing control unit 44, and a saving control unit 45, of a control block 41. In this case, the digital still camera 40 executes the start-up processing in the imaging mode with a technique different from that of the start-up processing in the imaging mode which the digital still camera 1 according to the first embodiment executes.

2-2. Start-Up Processing of Digital Still Camera

Figure 9:
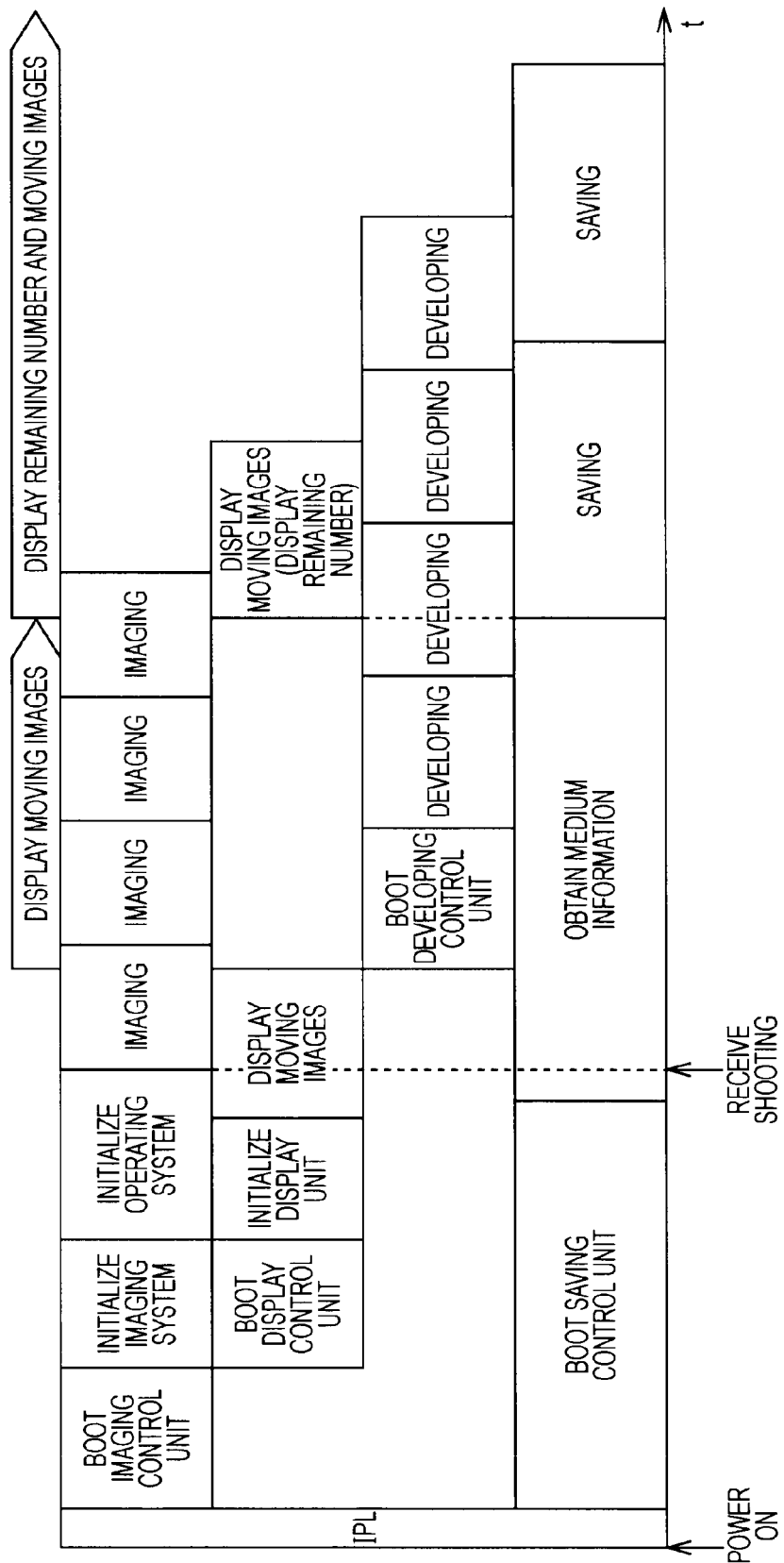
FIG. 9 is a schematic line drawing for describing start-up processing (1) of a digital still camera according to the second embodiment.
Figure 10:
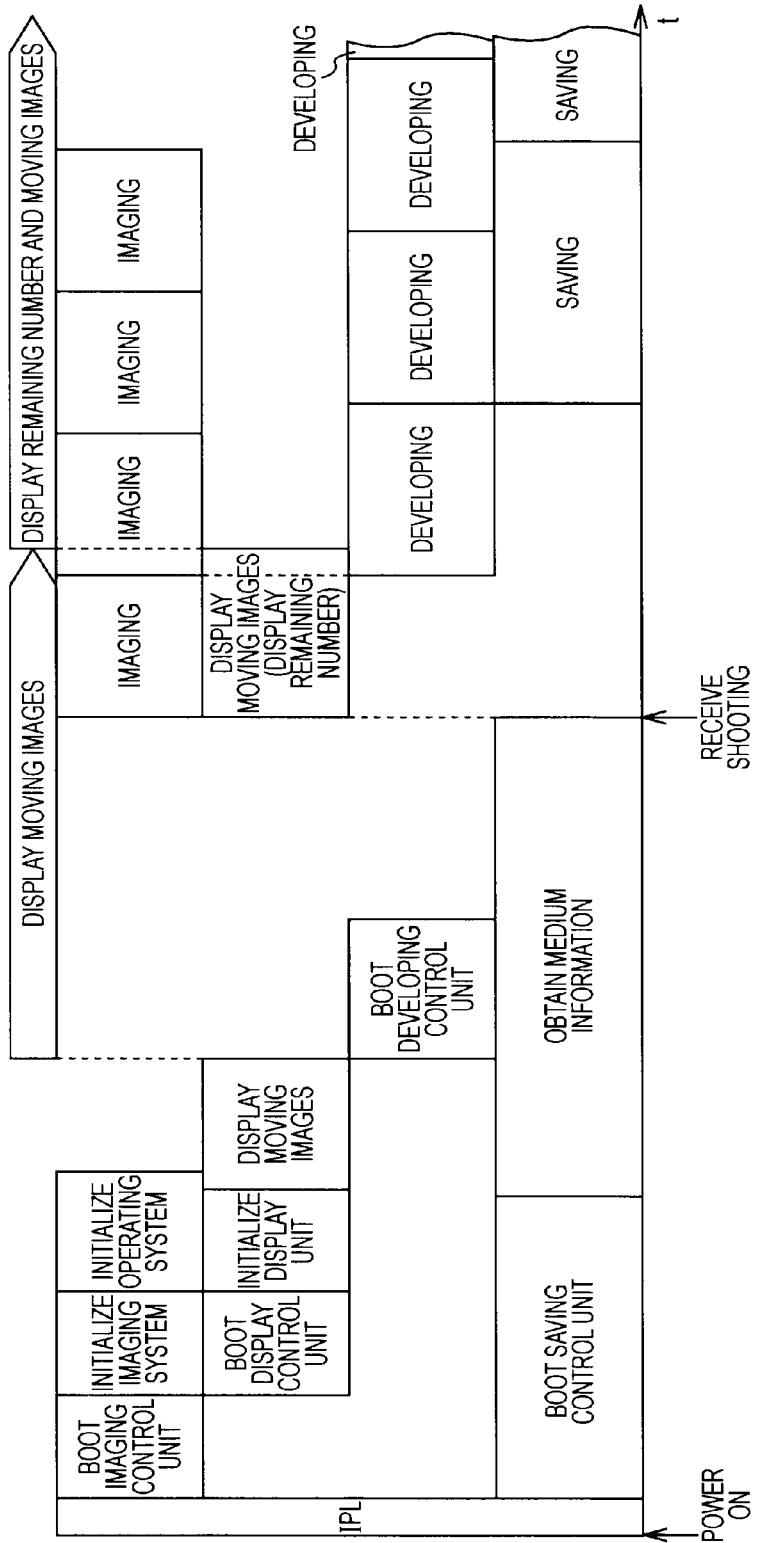
FIG. 10 is a schematic line drawing for describing start-up processing (2) of the digital still camera according to the second embodiment.

Next, the imaging start-up processing, display start-up processing, developing start-up processing, and saving start-up processing, which the imaging control unit 42, display control unit 43, developing control unit 44, and saving control unit 45 perform in accordance with input of a power on command, will be described in detail, with reference to FIGS. 9 and 10.

In this case as well, even when the power source of the digital still camera 40 is in an off state, the imaging control unit 42, display control unit 43, developing control unit 44, and saving control unit 45, each have a part continually operating so as to be able to detect input of a power on command, as with the first embodiment. In the event that the user has operated the power source key in a state of the digital still camera 40 being off, so as to input a power on command from the operating unit 23 to the control block 41, each of the imaging control unit 42, display control unit 43, developing control unit 44, and saving control unit 45 acquire a power on command. Upon acquiring the power on command, the imaging control unit 42, display control unit 43, developing control unit 44, and saving control unit 45 each input stipulated operating power from the power source block, and start their intended operations for realizing their respective functions.

Accordingly, the imaging control unit 42 reads an initial program from the ROM 15, to the program buffer 17 via the bus 16. In accordance with the initial program loaded to the program buffer 17, the imaging control unit 42 then reads out, from the ROM 15 via the bus 16 to the program buffer 17, a corresponding boot program (real-time OS).

Also, the display control unit 43 reads an initial program from the ROM 15, to the program buffer 17 via the bus 16. In accordance with the initial program loaded to the program buffer 17, the display control unit 43 then reads out, from the ROM 15 via the bus 16 to the program buffer 17, a corresponding boot program (real-time OS).

Further, the developing control unit 44 reads an initial program from the ROM 15, to the program buffer 17 via the bus 16. In accordance with the initial program loaded to the program buffer 17, the developing control unit 44 then reads out, from the ROM 15 via the bus 16 to the program buffer 17, a corresponding boot program (real-time OS).

Moreover, the saving control unit 45 reads an initial program from the ROM 15, to the program buffer 17 via the bus 16. In accordance with the initial program loaded to the program buffer 17, the saving control unit 45 then reads out, from the ROM 15 via the bus 16 to the program buffer 17, a corresponding boot program (real-time OS).

Upon reading the corresponding boot program from the ROM 15 to the program buffer 17 in accordance with the input of the power on command, the imaging control unit 42 starts imaging start-up processing following the corresponding boot program loaded to the program buffer 17. Thus, in the same way as with the case of the first embodiment described above, the imaging control unit 42 sequentially executes imaging control unit boot processing, imaging system initialization processing, and operating system initialization processing. Note however, that upon the imaging control unit boot processing in the imaging start-up processing being completed, the imaging control unit 42 notifies the display control unit 43 of the completion of the imaging control unit boot processing at that point.

Upon reading the corresponding boot program from the ROM 15 to the program buffer 17 in accordance with the input of the power on command, the display control unit 43 stands by to receive notification of the completion of the imaging control unit boot processing from the imaging control unit 42. Upon receiving notification of the completion of the imaging control unit boot processing from the imaging control unit 42, the display control unit 43 starts display start-up processing following the corresponding boot program loaded to the program buffer 17. Thus, the display control unit 43 sequentially executes the display control unit boot processing and display unit initialization processing, in the same way as with the case of the first embodiment described above.

Upon the display start-up processing ending in this way, the display control unit 43 reads out the display processing program from the ROM 15 to the program buffer 17. The display control unit 43 then executes moving image display processing following the display processing program loaded to the program buffer 17. Note however, that upon executing the moving image display processing and starting display of the moving image to the display unit 21, the display control unit 43 notifies the developing control unit 44 of starting of display of the moving image, at the point of starting.

Upon reading the corresponding boot program from the ROM 15 to the program buffer 17 in accordance with the input of the power on command, the developing control unit 44 stands by to receive notification of the starting of display of the moving image at the display unit 21 from the display control unit 43. Then, upon reception of notification of starting of display of the moving image at the display unit 21 from the display control unit 43, the developing control unit 44 starts the developing start-up processing following the corresponding boot program loaded to the program buffer 17. Accordingly, the developing control unit 44 executes the developing control unit boot processing in the same way as with the case of the first embodiment described above.

Now, upon reading the corresponding boot program from the ROM 15 to the program buffer 17 in accordance with the input of the power on command, the saving control unit 45 executes saving start-up processing following the boot program in the same way as with the case of the first embodiment described above.

Thus, with the digital still camera 40, the imaging control unit 42 starts imaging control unit boot processing before and with priority over the display start-up processing and developing start-up processing of the display control unit 43 and developing control unit 44. Accordingly, with the digital still camera 40, congestion of access to the bus 16 by the imaging control unit 42, display control unit 43, developing control unit 44, and saving control unit 45, at the point of starting the imaging control unit boot processing, can be avoided.

Accordingly, with the digital still camera 40 cases can be avoided with the digital still camera 40 such as taking time till starting the imaging control unit boot processing or the imaging control unit boot processing itself taking time (i.e., a longer processing time), due to congestion of access to the bus 16. That is to say, with the digital still camera 40, a case can be prevented wherein the amount of time from the point of input of a power on command to a state wherein photographs can be shot becomes unnecessarily long, and the user can perform photograph shooting at a maximally quick point from the input of the power on command.

Also, with the digital still camera 40, while the start of the display start-up processing and developing start-up processing are sequentially shifted from the start of the imaging start-up processing, the saving start-up processing, which takes the longest processing time, is started at approximately the same time as with the imaging start-up processing. Accordingly, with the digital still camera 40, saving start-up processing is ended as early as possible from the point of input of the power on command.

However, with the digital still camera 40, while an arrangement has been made wherein photograph shooting can be performed from the point of completion of the imaging start-up processing, saving processing is started at the point of ending the saving start-up processing, so that saving photograph image data can be stored in the storage medium 29 of the external media.

Thus, with the digital still camera 40, while an arrangement has been made wherein photograph shooting can be started at the maximally earliest point from input of the power on command, a case wherein the time from input of the power on command until ending of the saving start-up processing becomes long, calling for a correspondingly large imaging data buffer 30 and the like, can be avoided.

2-3. Digital Still Camera Start-Up Processing Procedures

Next, processing procedures to be executed by the imaging control unit 42, display control unit 43, and developing control unit 44, in accordance with input of a power on command, will be described with reference to FIGS. 11 through 13.

Figure 11:
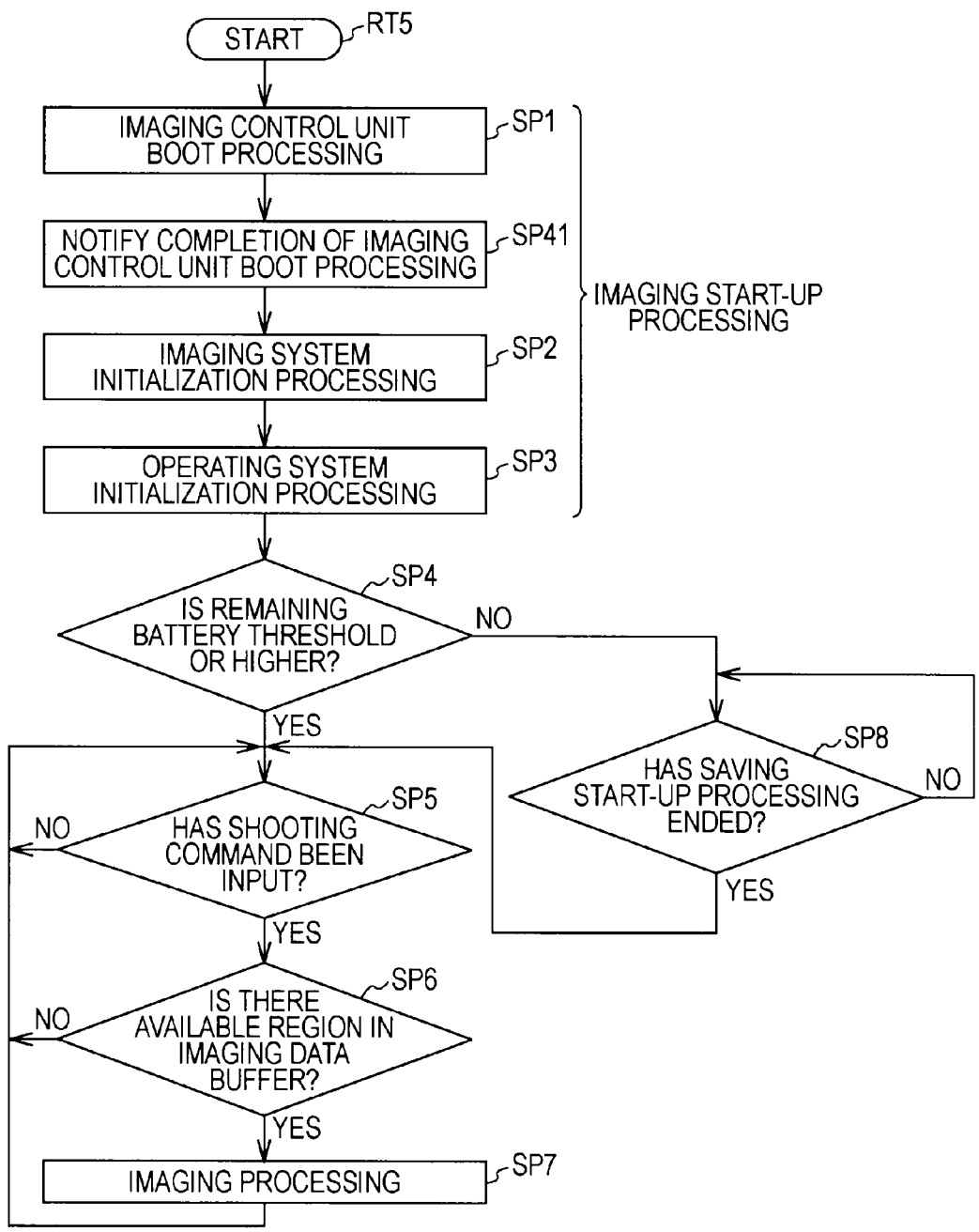
FIG. 11 is a flowchart illustrating start-up imaging processing procedures performed by an imaging control unit according to the second embodiment.

Upon reading a corresponding boot program from the ROM 15 to the program buffer 17 in accordance with input of a power on command, the imaging control unit 42 starts the start-up imaging processing procedure RT5 shown in FIG. 11, which illustrates the portions corresponding to FIG. 4 with the same reference symbols.

Upon starting the start-up imaging processing procedure RT5, in step SP1 the imaging control unit 42 starts the imaging start-up processing following the corresponding boot program loaded to the program buffer 17. Thus, the imaging control unit 42 executes imaging control unit boot processing, and upon completion of the imaging control unit boot processing, the flow advances to the next step SP41.

In step SP41, the imaging control unit 42 executes notifies the display control unit 43 of completion of the imaging control unit boot processing following the corresponding boot program loaded to the program buffer 17, and the flow advances to the next step SP2.

Upon going to step SP2 in this way, the imaging control unit 42 executes the processing of steps SP2 through SP8 as appropriate, in the same way as with the case of the first embodiment described above.

Note that, in the same way as with the case of the first embodiment described above, in the event of acquiring a power off command or mode switch-over command during the above-described start-up imaging processing procedure RT5, the imaging control unit 42 ends the start-up imaging processing procedure RT5.

Figure 12:
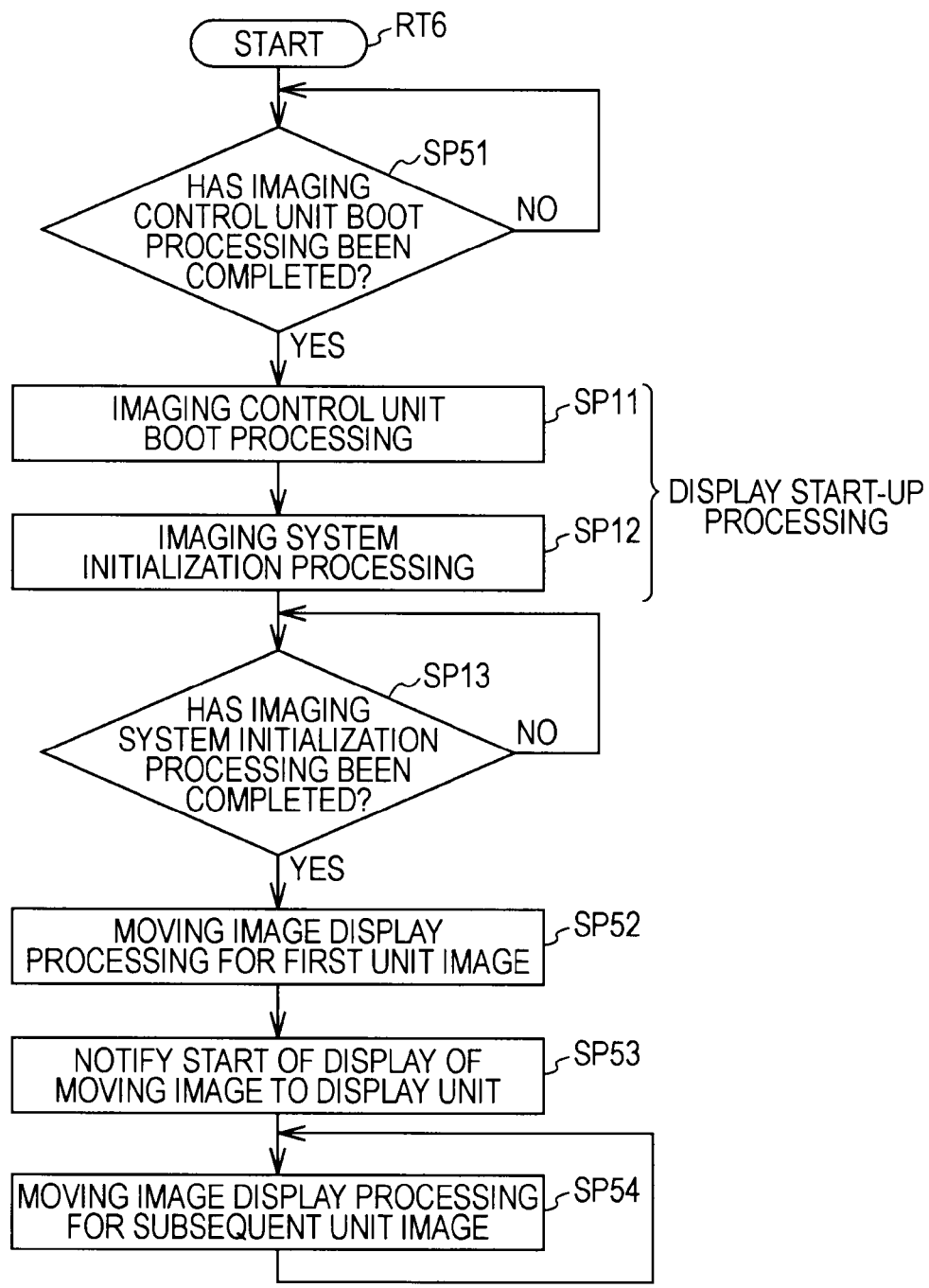
FIG. 12 is a flowchart illustrating start-up display processing procedures performed by a display control unit according to the second embodiment.

Upon reading a corresponding boot program from the ROM 15 to the program buffer 17 in accordance with input of a power on command, the display control unit 43 starts the start-up display processing procedure RT6 shown in FIG. 12, which illustrates the portions corresponding to FIG. 5 with the same reference symbols.

Upon starting the start-up display processing procedure RT6, in step S51 the display control unit 43 awaits notification of completion of the imaging control unit boot processing. Upon being notified of the completion of the imaging control unit boot processing by the imaging control unit 42, the display control unit 43 proceeds to the next step SP11.

Upon advancing to step SP11, the display control unit 43 sequentially executes the processing of steps SP11 through SP13 in the same way as with the case of the first embodiment described above, and then advances to the next step SP52.

In step SP52, the display control unit 43 performs moving image display processing following the display processing program loaded to the program buffer 17. Accordingly, the display control unit 43 reads out a first moving image imaging data from the imaging data buffer 30. The display control unit 43 then generates unit image data for the temporally first unit image of the multiple unit images making up the moving image, obtained by moving image shooting, which are temporally consecutive, and sends this to the display unit 21 based on the moving image imaging data. Accordingly, the display control unit 43 displays the first unit image based on the unit image data on the display unit 21, and the flow advances to the next step SP53.

In step SP53, the display control unit 43 notifies the developing control unit 44 that display of the moving image on the display unit 21 has been started, following the display processing program loaded to the program buffer 17, and the flow advances to the next step SP54.

In step SP54, the display control unit 43 follows the display processing program loaded to the program buffer 17 and continues to execute the moving image display processing, thereby sequentially repeating the processing of step SP54. Accordingly, the display control unit 43 sequentially reads out moving image imaging data from the imaging data buffer 30. The display control unit 43 also sequentially generates unit image data for the temporally subsequent unit image of the multiple unit images making up the moving image, obtained by moving image shooting, which are temporally consecutive based on the moving image imaging data. The display control unit 43 performs compositing of these unit image data with text data indicating the remaining number, as appropriate, and sends to the display unit 21.

Also, the display control unit 43 composites one unit image data with text data as appropriate and repeatedly sends this to the display unit 21, in accordance with imaging processing executed at the imaging processing block 20. Thus, the display control unit 43 displays a moving image obtained by performing moving image shooting of a subject on the display unit 21.

Note that, in the same way as with the case of the first embodiment described above, in the event that there is an input interruption of a power off command or mode switch-over command during the above-described start-up display processing procedure RT6, the display control unit 43 ends the start-up display processing procedure RT6.

Figure 13:
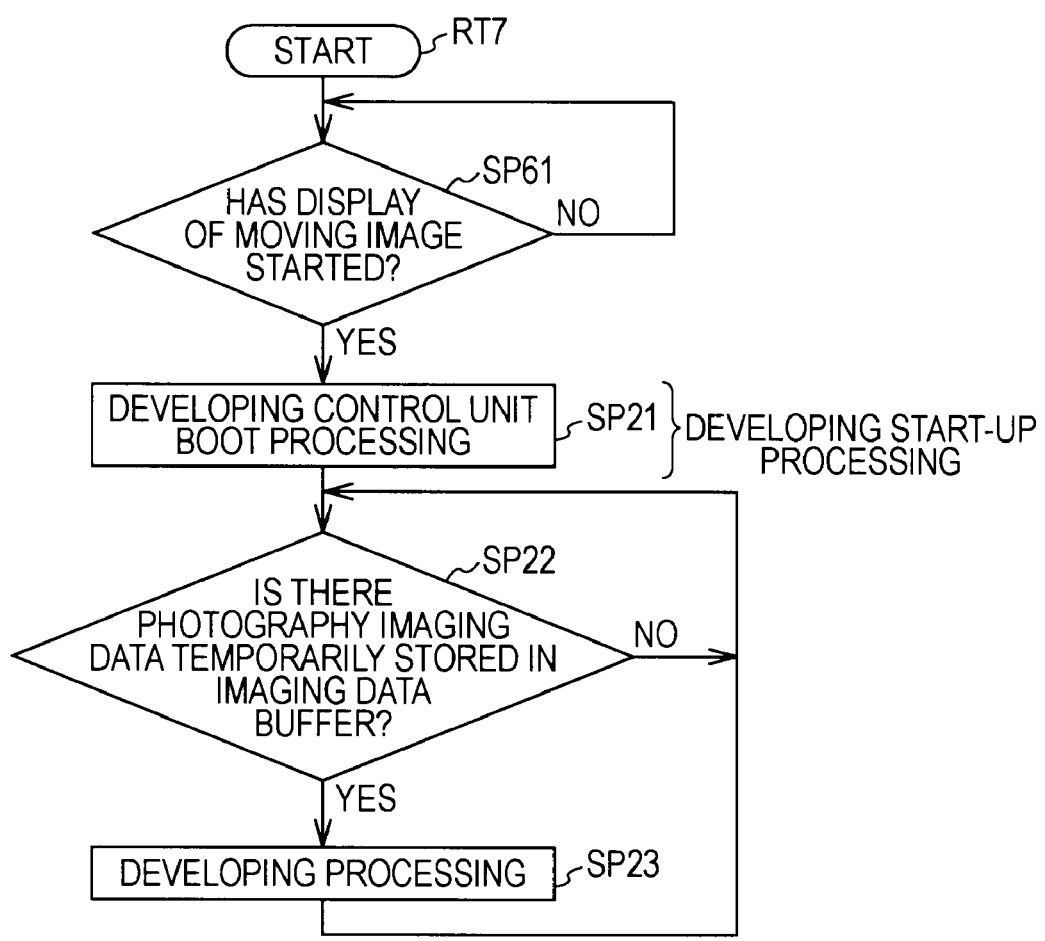
FIG. 13 is a flowchart illustrating start-up developing processing procedures performed by a developing control unit according to the second embodiment.

Upon reading a corresponding boot program from the ROM 15 to the program buffer 17 in accordance with input of a power on command, the developing control unit 44 starts the start-up developing processing procedure RT7 shown in FIG. 13, which illustrates the portions corresponding to FIG. 6 with the same reference symbols.

Upon starting the start-up developing processing procedure RT7, in step S61 the developing unit 44 awaits notification from the display control unit 43 that display of the moving image on the operating unit 21 has been started. Upon being notified from the display control unit 43 that display of the moving image on the operating unit 21 has been started, the developing control unit 44 proceeds to the next step SP21.

Upon advancing to step SP21, the developing control unit 44 sequentially executes the processing of steps SP21 through SP23 in the same way as with the case of the first embodiment described above.

Note that, in the same way as with the case of the first embodiment described above, in the event that there is an input interruption of a power off command or mode switchover command during the above-described start-up developing processing procedure RT7, the developing control unit 44 ends the start-up developing processing procedure RT7.

2-4. Operations and Advantages of Second Embodiment

In the above configuration, upon the user operating the power key in a power off state so as to input an power on command, the digital still camera 40 performs imaging start-up processing of the imaging control unit 42 and saving start-up processing of the saving control unit 45, in parallel.

At this time, upon the imaging control unit boot processing serving as imaging start-up processing being completed, with the digital still camera 40, display start-up processing of the display control unit 43 is started, and upon the display start-up processing ending, developing start-up processing of the developing control unit 44 is started. With the digital still camera 40, upon display start-up processing of the imaging control unit 42 ending, photograph shooting of the subject is enabled in the same way as with the case of the first embodiment described above, with the subject being imaged for photograph shooting in accordance with input of shooting, and saving photograph image data is saved.

Thus, with the digital still camera 40, congestion of access to the bus 16 by the imaging control unit 42, display control unit 43, developing control unit 44, and saving control unit 45, at the point of starting the imaging control unit boot processing, can be avoided, and accordingly taking time till starting the imaging control unit boot processing or the imaging control unit boot processing itself taking time, can be avoided.

Accordingly, with the digital still camera 40 a case can be prevented wherein the amount of time from the point of input of a power on command to a state wherein photographs can be shot becomes unnecessarily long, and the user can perform photograph shooting at a maximally quick point from the input of the power on command.

According to the above configuration, upon input of an power on command, the digital still camera 40 performs imaging start-up processing of the imaging control unit 42 and saving start-up processing of the saving control unit 45, in parallel, and also upon the imaging control unit boot processing serving as imaging start-up processing being completed, display start-up processing of the display control unit 43 is started, and upon the display start-up processing ending, developing start-up processing of the developing control unit 44 is started. Thus, with the digital still camera 40, in addition to obtaining the same advantages as with the case of the first embodiment described above, congestion of access to the bus 16 by the imaging control unit 42, display control unit 43, developing control unit 44, and saving control unit 45, at the point of starting the imaging control unit boot processing, can be avoided, and accordingly taking time till starting the imaging control unit boot processing or the imaging control unit boot processing itself taking time, can be avoided. Accordingly, the user can perform photograph shooting at a maximally quick point from the input of the power on command.

3. Third Embodiment

3-1. Circuit Configuration of Digital Still Camera

Figure 14:
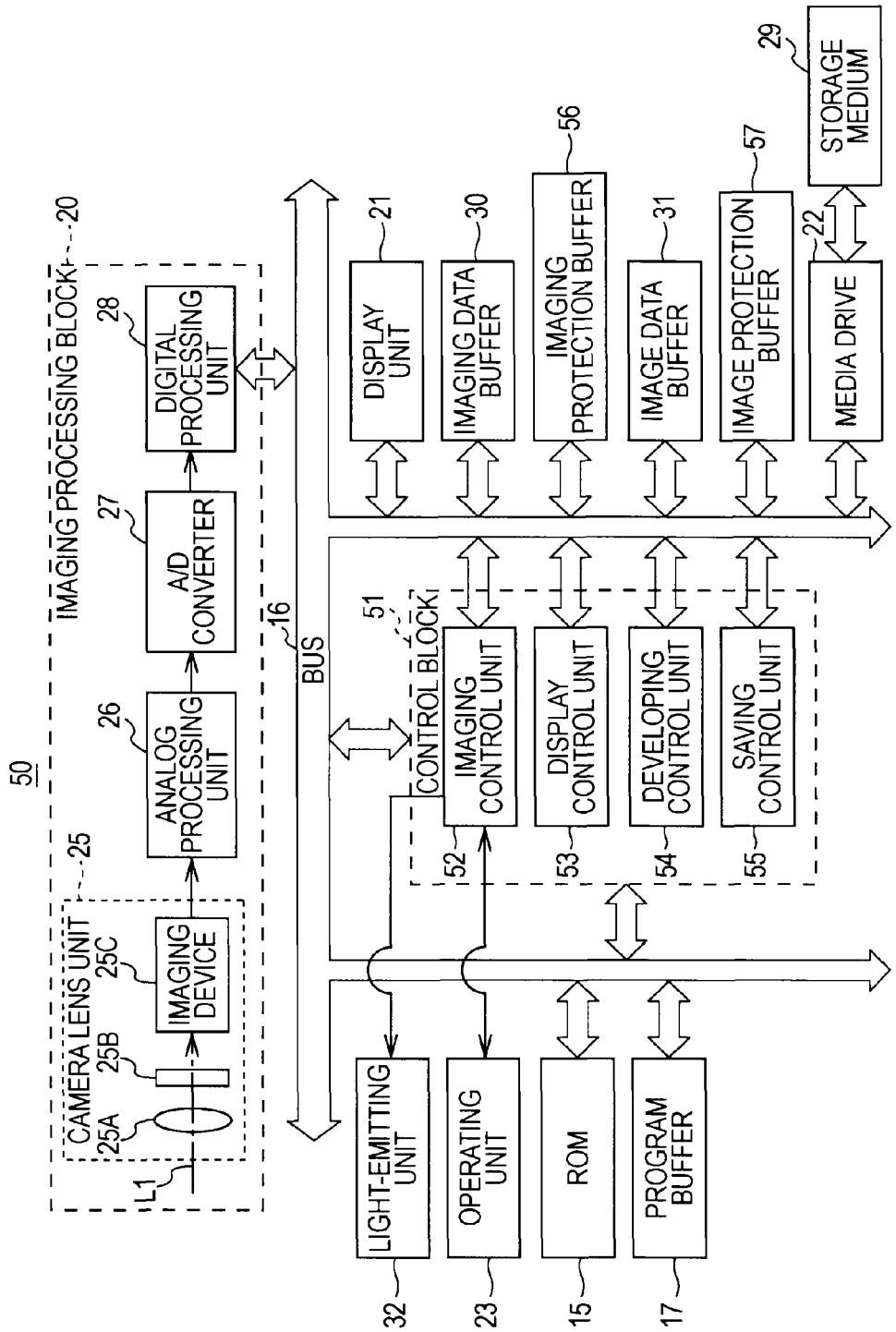
FIG. 14 is a block diagram illustrating the circuit configuration of a digital still camera according to a third embodiment.

FIG. 14 illustrates a digital still camera 50 according to a third embodiment, with portions corresponding to FIG. 1 denoted by the same reference numerals. The digital still camera 50 is configured the same way as with the digital still camera 1 according to the first embodiment except for the configurations of an imaging control unit 52, a display control unit 53, a developing control unit 54, and a saving control unit 55, of a control block 51.

In an actual arrangement, in the imaging mode, the imaging control unit 52 sequentially images a subject for moving image photography with the imaging processing block 20 and generates moving image imaging data, in the same way as with the case of the first embodiment described above. Also, the imaging control unit 52 sequentially sends the moving image imaging data from the imaging processing block 20 to the imaging data buffer 30 via the bus 16, for temporary storage. Accordingly, the display control unit 53 sequentially generates unit image data based on the moving image imaging data within the imaging data buffer 30, and also sends the unit image data to the operating unit 23 via the bus 16, in the same way as with the case of the first embodiment described above. Thus, the display control unit 53 can display the moving image obtained by moving image shooting of the subject on the display unit 21, and allow the user to confirm the imaging state of the subject.

In the event that the user operates the release key in this state and a shooting command is input from the operating unit 23, the imaging control unit 52 generates photography imaging data by way of the imaging processing block 20, in the same way as with the case of the first embodiment described above. The imaging control unit 52 then sends the photography imaging data from the imaging processing block 20 to the imaging data buffer 30 via the bus 16 for temporary storage.

Also, at this time, the imaging control unit 52 sends the photography imaging data from the imaging processing block 20 to non-volatile memory 56 as well, via the bus, for temporary storage. Note that the non-volatile memory 56 is configured of EEPROM (Electrically Erasable Programmable Read Only Memory), MRAM (Magnetoresistive Random Access Memory), or the like. In the following, the non-volatile memory 56 for temporary storage of the photography image data for data protection will also be referred to as an imaging protection buffer 56.

At this time, in the same way as with the case of the first embodiment described above, the developing control unit 54 generates compressed photograph image data based on the photography image data temporarily stored in the imaging data buffer 30. The developing control unit 54 then sends the compressed photograph image data to the image data buffer 31 via the bus 16 for temporary storage.

At this time, the developing control unit 54 also sends the compressed photograph image data via the bus 16 to non-volatile memory 57 for data protection. Note that the non-volatile memory 57 is configured of EEPROM, MRAM, or the like. In the following, the non-volatile memory 57 for temporary storage of the photography image data for data protection will also be referred to as an image protection buffer 57.

At this time, in the same way as with the case of the first embodiment described above, the saving control unit 55 generates saving photograph image data based on the compressed photograph image data temporarily stored in the image data buffer 31. The saving control unit 55 then transfers the saving photograph image data to the storage medium 29 via the bus 16 and media drive 22 for storage.

As described above, with the digital still camera 50, upon a shooting command being input, imaging processing, developing processing, and saving processing are executed in that order, thereby imaging the subject for photograph shooting, and finally the saving photograph image data being stored in the storage medium 29 of the external media.

Also, the digital still camera 50 is provided with the imaging data buffer 30 and image data buffer 31, whereby photograph shooting of the subject can be performed consecutively (i.e., the user can consecutively input shooting commands). However, with the digital still camera 50, the developing processing takes a longer processing time than the processing time for imaging processing, and the saving processing takes an even longer processing time than the processing time for developing processing.

Accordingly, with the digital camera 50, in the event that shooting commands are input consecutively, there may be cases wherein, even though photography imaging data is generated in accordance with input of the shooting commands, it takes a little time till starting to generate the compressed photograph image data based on the photography imaging data. Also, with the digital still camera 50, there may be cases wherein it takes a little time till starting to generate saving photograph image data based on the compressed photograph image data, as well. That is to say, with the digital still camera 50, there may be cases wherein, even though photography imaging data is generated when the user operates the release key and shooting commands are input, it takes time for developing processing and saving processing based on the photography imaging data to be started.

In other words, with the digital still camera 50, in such cases, the imaging data buffer 30 and image data buffer 31 temporarily store the photography imaging data and compressed photograph image data for a while. However, upon ending operation of the release key, the user of the digital still camera 50 may consider photograph shooting to have ended and operate the power key to input a power off command, regardless of the fact that developing processing or saving processing is still being performed.

In the event that a power off command is input, the digital still camera 50 leaves unprocessed photography imaging data and compressed photograph image data in the imaging data buffer 30 and image data buffer 31 and goes to a power off state when the power off command is input.

This means that when going to a power off state, the digital still camera 50 stops supplying power to the imaging data buffer 30 which is volatile memory. Accordingly, with the digital still camera 50, even in the event that there is unprocessed photography imaging data in the imaging data buffer 30 immediately prior to going to the power off state, that photography imaging data is lost due to stopping supply of power of the imaging data buffer 30.

Also, when going to a power off state, the digital still camera 50 stops supplying power to the image data buffer 31 which is volatile memory. Accordingly, with the digital still camera 50, even in the event that there is unprocessed compressed photograph image data in the image data buffer 31 immediately prior to going to the power off state, that compressed photograph image data is lost due to stopping supply of power of the image data buffer 31.

However, with the digital still camera 50, the photography imaging data and compressed photograph image data are also stored in the imaging protection buffer 56 and image protection buffer 57 formed of non-volatile memory as described above, in addition to the imaging data buffer 30 and image data buffer 31. That is to say, with the digital still camera 50, even if supply of power is stored due to going to a power off state, with the digital still camera 50 the photography imaging data and compressed photograph image data are stored in the imaging protection buffer 56 and image protection buffer 57. Thus, even if there is unprocessed photography imaging data and compressed photograph image data at the time of the digital still camera 50 going to a power off state, erasing all of this can be avoided.

In an actual arrangement, upon a shooting command being input, the imaging control unit 52 detects an empty region in the imaging data buffer 30 in the same way as with the case of the first embodiment described above, and then generates photography imaging data by way of the imaging processing block 20 and temporarily stores this in the imaging data buffer 30. Thus, the imaging control unit 52 prevents unprocessed photography imaging data within the imaging data buffer 30 from being overwritten by new photography imaging data before developing processing by the developing control unit 54 (i.e., from being erased).

Also, the storage capacity of the imaging protection buffer 56 is selected so as to be capable of temporarily storing photography imaging data of a number equal to the photography imaging data which can be temporarily stored in the imaging data buffer 30 at once, for example (e.g., four). Each time the imaging control unit 52 generates photography imaging data by way of the imaging processing block 20, this generated photography imaging data is temporarily stored in both the imaging data buffer 30 and imaging protection memory 56.

However, upon photography imaging data being read out from the imaging data buffer 30 by the developing control unit 54 for developing, the imaging control unit 52 deletes the photography imaging data from the imaging protection buffer 56 that is the same as the photography imaging data read out for developing. That is to say, while the imaging control unit 52 temporarily stores the photography imaging data in the imaging data buffer 30 and imaging protection buffer 56 each time photography imaging data is generated, the imaging protection buffer 56 retains only unprocessed photography imaging data.

Upon a power off command being input in such a state, the imaging control unit 52 determines whether or not imaging processing for photograph shooting is being performed at the imaging processing block 20 at that point. In the event that no imaging processing for photograph shooting is being performed at the imaging processing block 20 at the time when the power off command was input, the imaging control unit 52 stops acquisition of stipulated operating power from the power source block and stops its main operations.

On the other hand, in the event that imaging processing for photograph shooting is being performed at the imaging processing block 20 at the time when the power off command was input, the imaging control unit 52 allows the imaging processing being executed at that point to be continued. Accordingly, the imaging control unit 52 temporarily stores photography imaging data generated at the imaging processing block 20 in the imaging data buffer 30 and imaging protection buffer 56, and ends the imaging processing. The imaging control unit 52 then stops acquisition of stipulated operating power from the power source block and stops its main operations.

Also, each time compressed photograph image data is generated based on the photography imaging data, the developing control unit 54 temporarily stores the compressed photograph image data in an empty region of the image data buffer 31, in the same way as with the case of the first embodiment described above. Thus, the developing control unit 54 prevents unprocessed compressed photograph image data within the image data buffer 31 from being overwritten by new compressed photograph image data before saving processing by the saving control unit 55 (i.e., from being erased).

Also, the storage capacity of the image protection buffer 57 is selected so as to be capable of temporarily storing compressed photograph image data of a number equal to the photography imaging data which can be temporarily stored in the image data buffer 31 at once, for example. Each time the developing control unit 54 generates compressed photograph image data based on the photography imaging data, this generated photography imaging data is temporarily stored in both the image data buffer 31 and image protection memory 57.

However, upon compressed photograph image data being read out from the image data buffer 31 by the saving control unit 55 for saving, the developing control unit 54 deletes the compressed photograph image data from the image protection buffer 57 that is the same as the compressed photograph image data read out for saving. That is to say, while the developing control unit 54 temporarily stores the compressed photograph image data in the image data buffer 31 and image protection buffer 57 each time compressed photograph image data is generated, the image protection buffer 57 retains only unprocessed compressed photograph image data.

Upon a power off command being input in such a state, the developing control unit 54 determines whether or not developing processing is being performed at that point. In the event that no developing processing is being performed at the time when the power off command was input, the developing control unit 54 stops acquisition of stipulated operating power from the power source block and stops its main operations.

On the other hand, in the event that developing processing is being performed at the time when the power off command was input, the developing control unit 54 allows the developing processing being executed at that point to be continued. Accordingly, the developing control unit 54 generates compressed photograph image data based on the photography imaging data and temporarily stores the compressed photograph image data in the image data buffer 31 and image protection buffer 57 following the developing processing being executed, and ends the developing processing. At this time, even in the event that there is unprocessed photography imaging data remaining in the imaging data buffer 30, the developing control unit 54 does not start new developing processing but rather stops acquisition of stipulated operating power from the power source block and stops its main operations.

Further, upon a power off command being input, the saving control unit 55 determines whether or not saving processing is being performed at that point. In the event that no saving processing is being performed, the saving control unit 55 stops acquisition of stipulated operating power from the power source block and stops its main operations.

On the other hand, in the event that saving processing using one compressed photograph image data is being performed at the time when the power off command was input, the saving control unit 55 allows just the saving processing being executed to be continued. Accordingly, the saving control unit 55 generates saving photograph image data based on the compressed photograph image data and stores in the storage medium of the external media following the saving processing being executed, and ends the developing processing. At this time, even in the event that there is unprocessed compressed photograph image data remaining in the image data buffer 31, the developing control unit 54 does not start new saving processing but rather stops acquisition of stipulated operating power from the power source block and stops its main operations.

Thus, the digital still camera 50 goes from an on state to an off state in accordance with input of a power off command by speedily stopping supply of power to each circuit block, thereby maximally suppressing depletion of remaining battery amount.

3-2. Start-Up Processing of Digital Still Camera

Next, the start-up processing which each of the imaging control unit 52, display control unit 53, developing control unit 54, and saving control unit 55, perform in accordance with input of a power on command with the digital still camera 50, will be described in detail.

In an off state of the digital still camera 50, the imaging control unit 52, display control unit 53, developing control unit 54, and saving control unit 55, each have a part continually operating so as to be able to detect input of a power on command, as with the first embodiment. In the event that there is input of a power on command to control block 51 from the operating unit 23, each of the imaging control unit 52, display control unit 53, developing control unit 54, and saving control unit 55 acquire the power on command in a power off state of the digital still camera 50. Upon acquiring the power on command, the imaging control unit 52, display control unit 53, developing control unit 54, and saving control unit 55 each input stipulated operating power from the power source block, and start their intended operations for realizing their respective functions.

Accordingly, the imaging control unit 52 reads an initial program from the ROM 15, to the program buffer 17 via the bus 16. In accordance with the initial program loaded to the program buffer 17, the imaging control unit 52 then reads out, from the ROM 15 via the bus 16 to the program buffer 17, a corresponding boot program (real-time OS).

Also, the display control unit 53 reads an initial program from the ROM 15, to the program buffer 17 via the bus 16. In accordance with the initial program loaded to the program buffer 17, the display control unit 53 then reads out, from the ROM 15 via the bus 16 to the program buffer 17, a corresponding boot program (real-time OS).

Further, the developing control unit 54 reads an initial program from the ROM 15, to the program buffer 17 via the bus 16. In accordance with the initial program loaded to the program buffer 17, the developing control unit 54 then reads out, from the ROM 15 via the bus 16 to the program buffer 17, a corresponding boot program (real-time OS).

Moreover, the saving control unit 55 reads an initial program from the ROM 15, to the program buffer 17 via the bus 16. In accordance with the initial program loaded to the program buffer 17, the saving control unit 55 then reads out, from the ROM 15 via the bus 16 to the program buffer 17, a corresponding boot program (real-time OS).

Accordingly, the imaging control unit 52, display control unit 53, developing control unit 54, and saving control unit 55 perform the imaging start-up processing, display start-up processing, developing start-up processing, and saving start-up processing, the same as described above, following the respective corresponding boot programs loaded to the program buffer 17, at approximately the same time.

Upon imaging start-up processing the same as with the case of the first embodiment described above ending, the imaging control unit 52 reads out an imaging control program from the ROM 15 to the program buffer 17 via the bus 16, and starts imaging control processing following the imaging control program loaded to the program buffer 17. The imaging control unit 52 then communicates with the power block and detects the remaining battery amount and compares this with a threshold, the same as the case of the first embodiment described above, and based on the comparison result determines whether or not the remaining battery amount is at or above the threshold. In the event that the remaining battery amount is at or above the threshold, the imaging control unit 52 detects whether or not there is an empty region in the imaging protection buffer 56, and based on the detection results thereof, determines whether or not photography shooting can be performed.

On the other hand, in the event that the remaining battery amount is below the threshold, the imaging control unit 52 awaits for the saving start-up processing to end. Upon the saving start-up processing ending, the imaging control unit 52 detects whether or not there is an empty region in the imaging protection buffer 56, and based on the detection results thereof, determines whether or not photography shooting can be performed.

That is to say, the imaging control unit 52 sequentially temporarily stores the photography imaging data in the imaging protection buffer 56 temporarily stores the photography imaging data in the imaging protection buffer 56 as described above, but deletes the photography imaging data that has been subjected to developing processing each time, and accordingly only leaves unprocessed photography imaging data. In other words, the imaging control unit 52 does not temporarily store the photography imaging data in the imaging protection buffer 56 by overwriting photography imaging data that has already been subjected to developing processing, but temporarily stores in an empty region where not data is not stored whatsoever.

Accordingly, even in the event that the imaging data buffer 30 is empty at the power off state for example, the imaging control unit 52 does not temporarily store photography imaging data in the imaging protection buffer 56, even if photography imaging data is generated, while there is no empty region (region with not data stored) in the imaging protection buffer 56. Also, if we say that the imaging control unit 52 temporarily stores photography imaging data in the imaging data buffer 30, and then goes to a power off state immediately after due to input of a power off command being input, there is a possibility that the photography imaging data may not be protected (i.e., will be deleted).

Accordingly, an arrangement is made such that, with the imaging control unit 52 even if the imaging data buffer 30 is empty, but there is no empty region in the imaging protection buffer 56 both the imaging protection buffer 56 and imaging data buffer 30 are deemed to have no empty regions for temporarily storing the photography imaging data. On the other hand, if there is an empty region in the imaging protection buffer 56, there is also an empty region in the imaging data buffer 30, so the imaging control unit 52 enables temporarily storing the photography imaging data in both the imaging protection buffer 56 and imaging data buffer 30.

Accordingly, if there is an empty region in the imaging protection buffer 56 for temporarily storing the photography imaging data, the imaging control unit 52 starts receiving input of shooting commands by operation of the release key. That is to say, the imaging control unit 52 enables photograph shooting.

On the other hand, if there is no empty region in the imaging protection buffer 56 for temporarily storing the photography imaging data, even of the release key is operated and a shooting command is input, the imaging control unit 52 invalidates the input of the shooting command. That is to say, if there is no empty region in the imaging protection buffer 56, the imaging control unit 52 puts off reception of input of shooting commands. In the event that the imaging control unit 52 has put off starting of reception of input of shooting commands in this way, the imaging control unit 52 stands by for the photography imaging data to be read out from the imaging protection buffer 56 for developing, thereby generating an empty region in the imaging protection buffer 56.

Once the photography imaging data is read out from the imaging protection buffer 56 for developing, and there is created an empty region in the imaging protection buffer 56 by deleting the photography imaging data, the imaging control unit 52 starts receiving input of shooting commands. That is to say, the imaging control unit 52 enables photograph shooting.

Thus, in the event that a shooting command is input from the operating unit 23 due to the release key being operated by the user after reception of input of shooting commands has been started, the imaging control unit 52 controls the imaging processing block 20 so as to perform imaging processing for photograph shooting in the same way as described above.

However, even if photography imaging data is temporarily stored in the imaging data buffer 30 and imaging protection buffer 56 in accordance with input of shooting commands, in the event that there is no more empty region in the imaging protection buffer 56 due to deleting of photography imaging data therefrom not being in time, the imaging control unit 52 invalidates input of shooting commands. That is to say, if there is no more empty region within the imaging protection buffer 56, the imaging control unit 52 invalidates input of shooting commands until a new empty region is generated.

When photograph shooting of the subject is enabled (i.e., when reception of input of shooting commands is started), the imaging control unit 52 lights the light-emitting unit 32 with a predetermined color light. Thus, the imaging control unit 52 notifies the user that photograph shooting of the subject is available. Also, even after lighting the light-emitting unit 32 with a predetermined color light, if empty region within the imaging protection buffer 56 runs out and input of shooting commands is invalidated, the imaging control unit 52 turns off the light-emitting unit 32 while input of shooting commands is invalidated. Thus, the imaging control unit 52 notifies the user that photograph shooting of the subject is temporarily invalidated.

Also, upon developing start-up processing the same as with the case of the first embodiment described above ending, the developing control unit 54 reads out a developing control program from the ROM 15 to the program buffer 17 via the bus 16. The developing control unit 54 then detects whether or not there is any unprocessed photography imaging data remaining temporarily stored in the imaging protection buffer 56 from the point of the previous power off command having been input, following the developing processing program loaded to the program buffer 17.

If it is found as a result that there is no photography imaging data remaining in the imaging protection buffer 56, the developing control unit 54 awaits for new photography imaging data to be temporarily stored in the imaging data buffer 30 in accordance with input of a shooting command. Once the developing control unit 54 detects unprocessed photography imaging data temporarily stored in the imaging data buffer 30, the developing control unit 54 executes developing processing the same as described above, following the developing processing program loaded to the program buffer 17.

On the other hand, if it is found that there is photography imaging data remaining in the imaging protection buffer 56, the developing control unit 54 executes developing processing the same as described above, following the developing processing program loaded to the program buffer 17. That is to say, the developing control unit 54 reads out the photography imaging data from the imaging protection buffer 56, generates compressed photograph image data based on the photography imaging data, and temporarily stores this in both the image data buffer 31 and image protection buffer 57.

Thus, the developing control unit 54 performs developing processing on all photography imaging data remaining in the imaging protection buffer 56. Upon this developing processing ending, the developing control unit 54 detects whether or not new photography imaging data has been temporarily stored in the imaging data buffer 30 in accordance with input of a shooting command. Upon detecting unprocessed photography imaging data temporarily stored to the imaging data buffer 30, the developing control unit 54 performs the subsequent developing processing on the unprocessed photography imaging data within the imaging data buffer 30 in the same way as that described above.

Also, upon saving start-up processing the same as with the case of the first embodiment described above ending, the saving control unit 55 reads out a saving control program from the ROM 15 to the program buffer 17 via the bus 16. The saving control unit 55 then detects whether or not there is any unprocessed compressed photograph image data remaining temporarily stored in the image protection buffer 57 from the point of the previous operation of the digital still camera 50 which should be subjected to saving processing, following the developing processing program loaded to the program buffer 17.

That is to say, at this time, the saving control unit 55 detects unprocessed variable delay compressed photograph image data remaining temporarily stored in the image protection buffer 57 from the point of the previous power off command input, as compressed photograph image data remaining in the image protection buffer 57. Further, the saving control unit 55 also detects compressed photograph image data generated by the developing control unit 54 based on photography imaging data remaining in the imaging protection buffer 56 from the point of the previous power off command input, as compressed photograph image data remaining in the image protection buffer 57.

If it is found as a result that there is no compressed photograph image data remaining in the image protection buffer 57, the saving control unit 55 detects whether or not new compressed photograph image data has been temporarily stored in the image data buffer 31 in accordance with input of a shooting command. In the event that the saving control unit 55 detects new compressed photograph image data temporarily stored in the image data buffer 31 in accordance with input of a shooting command, the saving control unit 55 executes saving processing the same as described above, following the developing processing program loaded to the program buffer 17.

On the other hand, if it is found that there is compressed photograph image data remaining in the image protection buffer 57, the saving control unit 55 executes saving processing the same as described above, following the saving processing program loaded to the program buffer 17. That is to say, the saving control unit 55 reads out the remaining compressed photograph image data from the image protection buffer 57, generates saving photograph image data based on the compressed photograph image data, and stores this in the storage medium 29 of the external media.

Thus, the saving control unit 55 performs saving processing on all compressed photograph image data remaining in the image protection buffer 57. Upon this saving processing ending, the saving control unit 55 detects whether or not new compressed photograph image data has been temporarily stored in the image data buffer 31 in accordance with input of a shooting command. Upon detecting unprocessed compressed photograph image data temporarily stored to the image data buffer 31, the saving control unit 55 performs saving processing on the unprocessed compressed photograph image data within the image data buffer 31 in the same way as that described above.

Now, with the digital still camera 50, in the event that there is photography imaging data temporarily stored in the imaging protection 56 from the previous operations at the time of start-up processing, we can say that saving photograph image data potentially capable of being generated based on the photography imaging data is remaining without being saved. Also, with the digital still camera 50, in the event that there is compressed photograph image data temporarily stored in the imaging protection buffer 57 from the previous operations at the time of start-up processing, we can say that saving photograph image data potentially capable of being generated based on the compressed photograph image data is remaining without being saved.

Also, with the digital still camera 50, at the time of start-up processing as described above, in the event that there is photography imaging data remaining in the imaging protection buffer 56, saving photograph image data is generated based on the photography imaging data and stored in the storage medium 29 (i.e., saved). Also, with the digital still camera 50, at the time of start-up processing as described above, in the event that there is compressed photograph image data remaining in the image protection buffer 57, saving photograph image data is generated based on the compressed photograph image data and stored in the storage medium 29 (i.e., saved).

Now, with the digital still camera 50, at the time of start-up processing, in the event that there is such unsaved saving photograph image data, the user can be prompted at that point to decide whether or not to store the saving photograph image data in the storage medium 29 so as to be saved, or, the decision may be made beforehand.

That is to say, upon the user operating the operating unit 23 during operations to request display of a setting screen, the display control unit 53 reads out setting screen data stored beforehand in the ROM 15 and sends this to the display unit 21 via the bus 16. Accordingly, the display control unit 53 displays a predetermined setting screen on the display unit 21 based on the setting screen data. Thus, the display control unit 53 allows the user to optionally decide the contents of saving settings regarding saving of unsaved saving photograph image data, on a setting screen by way of the operating unit 23 for the user.

In an actual arrangement, one example of contents of saving settings made by the user on the setting screen via the operating unit 23 is to have the user to decide whether or not, in the event that there is unsaved saving photograph image data at the time of start-up processing, for the user to be queried at that point regarding whether or not to save the saving photograph image data. Another example of contents of saving settings made by the user on the setting screen via the operating unit 23 is to have the user to decide whether or not, in the event that there is unsaved saving photograph image data at the time of start-up processing, for the saving photograph image data to be automatically saved.

Upon the user optionally selecting the contents of saving settings on the settings screen by way of the operating unit 23, the display control unit 53 sends the saving settings information indicating the optionally selected contents of saving to the saving control unit 55 for example, so as to be saved. Thus, the display control unit 53 sets whether or not to save unsaved saving photograph image data.

Accordingly, upon the saving start-up processing ending, and detecting that there is compressed photograph image data remaining in the image protection buffer 57, the saving control unit 55 determines whether or not to query regarding whether or not to save unsaved saving photograph image data. If the settings are to query regarding whether or not to save unsaved saving photograph image data, the saving control unit 55 commissions the display control unit 53 to query user regarding whether or not to save the unsaved saving photograph image data.

At this time, upon the display start-up processing the same as that of the first embodiment described above ending, the display control unit 53 reads out the display processing program from the ROM 15 via the bus 16 to the program buffer 17. The display control unit 53 executes moving image display processing in the same way as with the case of the first embodiment described above, following the display processing program loaded to the program buffer 17.

In the event that the display control unit 53 is commissioned by the saving control unit 55 to query the user regarding whether or not to save unsaved saving photograph image data, the display control unit 53 reads out query screen data from the ROM 15, stored therein beforehand, via the bus 16 and sends this to the display unit 21. Thus, the display control unit 53 displays the query screen based on the query screen data on the display unit 21, and inquires of the user regarding whether or not to save the unsaved saving photograph image data by way of the query screen.

In the event that the user operates the operating unit 23 to optionally select on the query screen whether or not to save unsaved saving photograph image data, the display control unit 53 notifies the saving control unit 55 of the selected content.

In the event that the saving control unit 55 is notified by the display control unit 53 at this time that the user has selected to save the unsaved saving photograph image data, saving processing of the compressed photograph image data remaining within the image protection buffer 57 is performed in the same way as described above. Thus, the saving control unit 55 generates saving photograph image data based on the compressed photograph image data remaining within the image protection buffer 57, and stores this in the storage medium 29 of the external media. Accordingly, the saving control unit 55 saves photography imaging data and compressed photograph image data remaining from the previous operations in the storage medium 29 of the external media as saving photograph image data.

On the other hand, in the event that the saving control unit 55 is notified by the display control unit 53 at this time that the user has selected to not save the unsaved saving photograph image data, all compressed photograph image data remaining in the image protection buffer 57 is deleted. At this time, the saving control unit 55 deletes the compressed photograph image data remaining temporarily saved in the image protection buffer 57 from the point of the previous power off command input, as compressed photograph image data within the image protection buffer 57.

Also, the saving control unit 55 deletes the compressed photograph image data generated by the developing control unit 54 based on the photography imaging data remaining temporarily saved in the imaging protection buffer 56 from the point of the previous power off command input, as compressed photograph image data within the image protection buffer 57. Thus, in the event that the user selects to not save the unsaved saving photograph image data, the saving control unit 55 deletes all of the saving photograph image data where photograph shooting of a subject was performed in the previous operations but was not saved, in the form of the compressed photograph image data which is the base thereof.

Also, in the event of determining whether or not to query as described above, if the settings as to not inquire regarding whether or not to save the unsaved saving photograph image data, the saving control unit 55 determines whether or not to automatically saved the unsaved saving photograph image data, based on saving settings information.

If the settings are to automatically save the unsaved saving photograph image data, the saving control unit 55 performs saving processing of the compressed photograph image data remaining in the image protection buffer 57, the same way as described above. Thus, the saving control unit 55 saves the photography imaging data and compressed photograph image data remaining from the previous operation in the storage medium 29 of the external media as saving photograph image data. On the other hand, if the settings are to not save the unsaved saving photograph image data, the saving control unit 55 deletes the compressed photograph image data remaining in the image protection buffer 57, in the same way as described above.

Thus, with the digital still camera 50 even if there is photography imaging data or compressed photograph image data remaining unprocessed due to going to the power off state, these can be appropriately saved as saving photograph image data when going to the power on state the next time.

3-3. Digital Still Camera Start-Up Processing Procedures

Next, processing procedures to be executed by the imaging control unit 52, display control unit 53, developing control unit 54, and saving control unit 55, in accordance with input of a power on command, will be described with reference to FIGS. 15 through 18.

Figure 15:
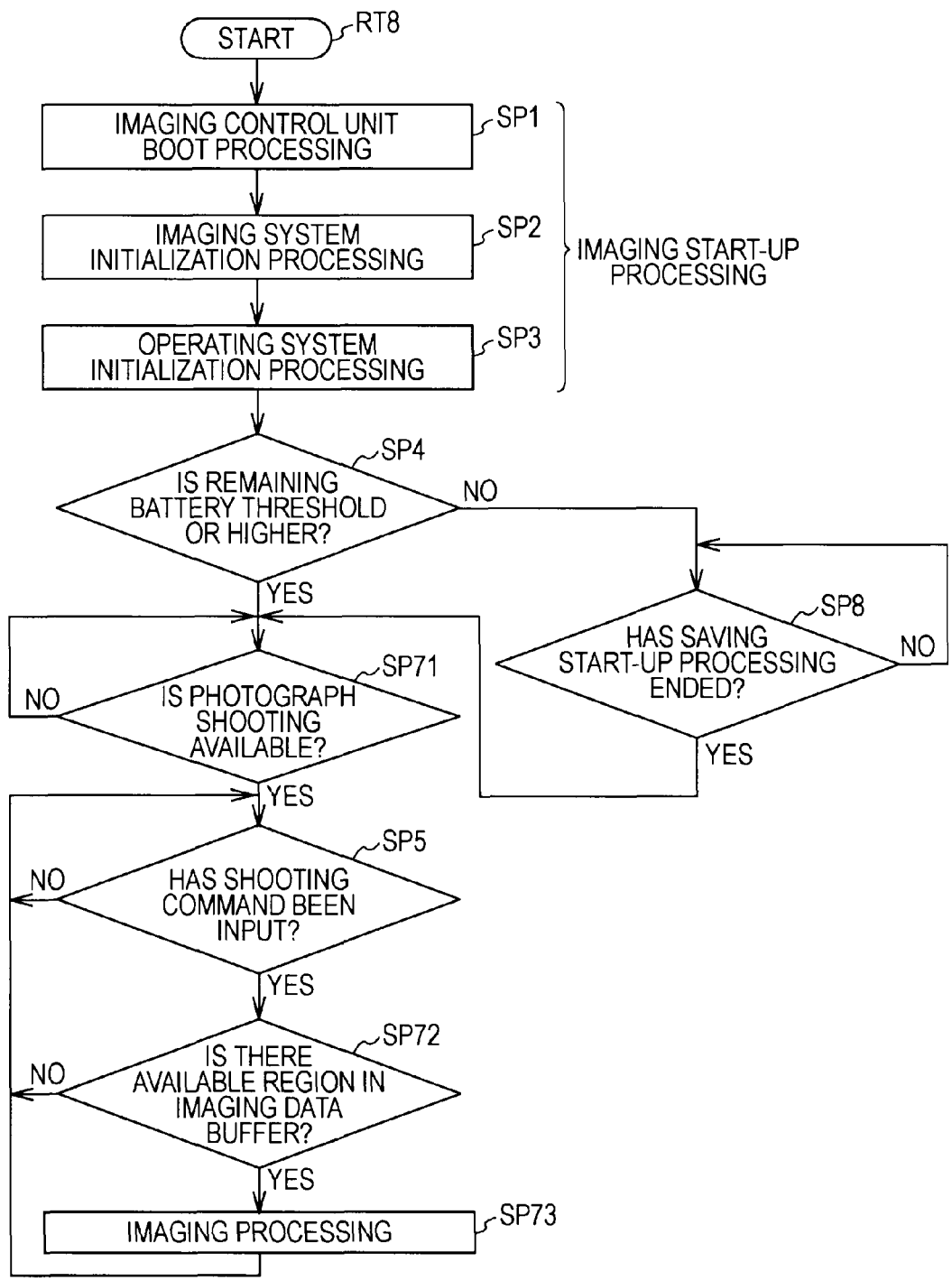
FIG. 15 is a flowchart illustrating start-up imaging processing procedures performed by an imaging control unit according to the third embodiment.

Upon reading a corresponding boot program from the ROM 15 to the program buffer 17 in accordance with input of a power on command, the imaging control unit 52 starts the start-up imaging processing procedure RT8 shown in FIG. 15, which illustrates the portions corresponding to FIG. 4 with the same reference symbols.

Upon starting the start-up imaging processing procedure RT8, the imaging control unit 52 sequentially executes the processing of steps SP1 through SP4 in the same way as with the case of the first embodiment described above, and upon obtaining a positive result in the step SP4, goes to the next step SP71.

In step SP71, the imaging control unit 52 determines whether or not photography shooting of the subject is available. In the event that a negative result is obtained in step SP71, this means that there is still photography imaging data of an amount equivalent to the storage capacity temporarily stored in the imaging protection buffer 56 from the previous operation, and that there is no empty region for temporarily storing new photography imaging data.

In the event of obtaining this negative result in step SP71, the imaging control unit 52 awaits for photography imaging data to be subsequently read out from the imaging protection buffer 56 by the developing control unit 54 so that there is an empty region in the imaging protection buffer 56.

Conversely, in the event that a positive result is obtained in step SP71, this means that absolutely no photography imaging data remains in the imaging protection buffer 56, and accordingly there is empty region for temporarily storing new photography imaging data. Also, in the event that a positive result is obtained in step SP71, this also means that only a slight amount of photography imaging data temporarily stored in the previous operation remains in the imaging protection buffer 56, and accordingly there is empty region for temporarily storing new photography imaging data. Accordingly, upon receiving this positive result in step SP71, the imaging control unit 52 advances to the next step SP5.

In step SP5, upon the user operating the release key and a shooting command being input from the operating unit 23, the flow proceeds to the next step SP72.

In step SP72, the imaging control unit 52 determines whether or not there is empty region for temporarily storing photography imaging data in the imaging data buffer 30. In the event that a negative result is obtained in step SP72, this means that readout of photography imaging data from the imaging data buffer 30 by the developing control unit 54 was not in time, and there is no empty region in the imaging protection buffer 56 as well as the imaging data buffer 30. Accordingly, in the event of obtaining this negative result, the imaging control unit 52 invalidates the shooting command input at this time by the user, and returns to step SP5.

On the other hand, in the event that a positive result is obtained in step SP72, this means that there is region with no data stored in the imaging protection buffer 56 as well as the imaging buffer 30, as empty region. Also, in the event that this positive result is obtained in step SP72, this also means that empty region has been created in the imaging data buffer 30 as well as the imaging protection buffer 56 by the developing control unit 54 reading out photography imaging data from the imaging data buffer 30. Accordingly, in the event of obtaining this positive result in step SP72, the imaging control unit 52 advances to the next step SP73.

In step SP73, the imaging control unit 52 controls the imaging processing block 20 so as to perform imaging processing for photograph shooting. Accordingly, the imaging control unit 52 generates photography imaging data imaging a subject for photograph shooting with the imaging processing block 20, and also temporarily stores the generated photography imaging data in both the imaging data buffer 30 and imaging protection buffer 56, and the flow returns to step SP5.

Also, in the event of obtaining a negative result in step SP4, the imaging control unit 52 executes the processing in step SP8, and then advances to step SP71, and sequentially executes the processing of the steps SP71 through SP73. Accordingly, the imaging control unit 52 images the subject for photograph shooting in accordance with a shooting command and generates photography imaging data, and also temporarily stores the generated photography imaging data in both the imaging data buffer 30 and imaging protection buffer.

Note that, in the event that there is an input interruption of a power off command or mode switch-over command during the above-described start-up imaging processing procedure RT8, the imaging control unit 52 ends the imaging processing being executed, and then ends the start-up imaging processing procedure RT8.

Figure 16:
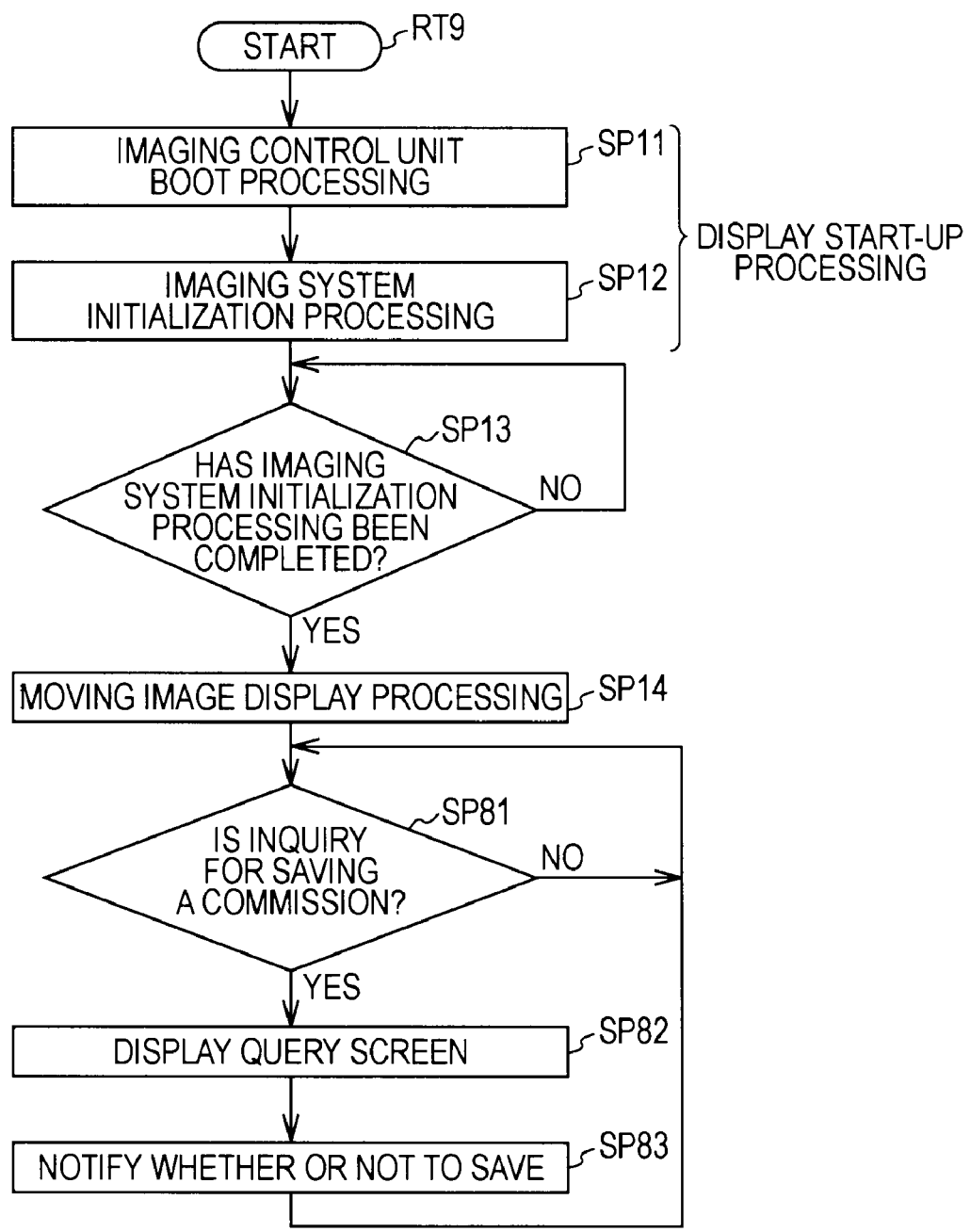
FIG. 16 is a flowchart illustrating start-up display processing procedures performed by a display control unit according to the third embodiment.

Upon reading a corresponding boot program from the ROM 15 to the program buffer 17 in accordance with input of a power on command, the display control unit 53 starts the start-up display processing procedure RT9 shown in FIG. 16, which illustrates the portions corresponding to FIG. 5 with the same reference symbols.

Upon starting the start-up display processing procedure RT9, the display control unit 53 sequentially executes the processing of steps SP11 through SP14 in the same way as with the case of the first embodiment described above, and advances to the next step SP81.

In step SP81, the display control unit 53 determines whether or not it has been commissioned by the saving control unit 55 to inquire whether or not to save unsaved saving photograph image data. In the event that a negative result is obtained in step SP81 here, this means that the settings are such that whether or not to save unsaved saving photograph image data is not to be inquired.

Also, in the event that a positive result is obtained in step SP81, this means that the settings are such that whether or not to save unsaved saving photograph image data is to be inquired, but the saving start-up processing of the saving control unit 55 has not ended yet. In step SP81, upon obtaining this negative result, the display control unit 53 returns to step SP14.

Accordingly, the display control unit 53 thereafter repeatedly cyclically performs the processing of step SP14 and step SP81, until a positive result is obtained in step SP81. Accordingly, the display control unit 53 displays a moving image obtained by moving image shooting of the subject, on the display unit 21, the same as described above.

Now, upon a positive result being obtained in step SP81, this indicates that the settings are such that whether or not to save unsaved saving photograph image data is to be inquired, and that the inquiry has been commissioned due to the saving control unit 55 ending the saving start-up processing. Upon obtaining this positive result in step SP81, the display control unit 53 advances to the next step SP82.

In step SP82, the display control unit 53 sends query screen data to the display unit 21. Thus, the display control unit 53 displays the query screen on the display unit 21 for inquiring whether or not to save unsaved saving photograph image data, based on the query screen data, and advances to the next step SP83.

In step SP83, upon whether or not to save unsaved saving photograph image data is optionally selected by the user on the query screen by way of the operating unit 23, the display control unit 53 notifies the saving control unit 55 of the content of selection, and the flow returns to step SP14. Thus, the display control unit 53 repeatedly cyclically executes the processing of step SP14 and SP81 again. Accordingly, the display control unit 53 displays a moving image obtained by moving image shooting of the subject, on the display unit 21, the same as described above.

Note that, in the event that there is an input interruption of a power off command or mode switch-over command during the above-described start-up display processing procedure RT9, the display control unit 53 correspondingly ends the start-up display processing procedure RT9.

Further, upon reading a corresponding boot program from the ROM 15 to the program buffer 17 in accordance with input of a power on command, the developing control unit 54 starts the start-up developing processing procedure RT10 shown in FIG. 17, which illustrates the portions corresponding to FIG. 6 with the same reference symbols.

Upon starting the start-up developing processing procedure RT10, the developing control unit 54 executes the processing of step SP21, and then advances to the next step SP91. In step SP91, the developing control unit 54 reads out a developing control program from the ROM 15 to the program buffer 17 via the bus 16. The developing control unit 54 then determines whether or not there is still unprocessed photography imaging data temporarily stored in the imaging protection buffer 56 at the time of the previous operation, following the developing processing program loaded to the program buffer 17.

Upon a positive result being obtained in this step SP91, this means that at the time of the previous operation, the power on state went to the power off state, with unprocessed photography imaging data remaining in the imaging data buffer 30 as well as the imaging protection buffer 56. Accordingly, upon obtaining this positive result in step SP91, the developing control unit 54 advances to the next step SP92.

In step SP92, the developing control unit 54 executes developing processing on the photography imaging data remaining in the imaging protection buffer 56 following the developing processing program loaded to the program buffer 17, the same as described above. Accordingly, the developing control unit 54 reads out the photography imaging data from the imaging protection buffer 56, generates compressed photograph image data based on the photography imaging data, and temporarily saves in both the image data buffer 31 and image protection buffer 57, and advances to the next step SP93.

In step SP93, the developing control unit 54 determines whether or not all photography imaging data remaining in the imaging protection buffer 56 has been subjected to developing processing. If it is found as a result that there is photography imaging data remaining in the imaging protection buffer 56, the developing control unit 54 returns to step SP92. Also, if there is no photography imaging data remaining in the imaging protection buffer 56, the developing control unit 54 advances to the next step SP22.

Thus, the developing control unit 54 repeatedly executes the processing of steps SP92 and SP93, as appropriate. Accordingly, after the developing control unit 54 perform developing processing of all photography imaging data remaining within the imaging protection buffer 56, the processing of the next step SP22 is executed, and the flow advances to the next step SP94.

On the other hand, in the event that a negative result is obtained in step SP91, this means that at the time of the previous operation, the power on state went to the power off state, without leaving unprocessed photography imaging data in the imaging data buffer 30 as well as the imaging protection buffer 56. Accordingly, upon obtaining this positive result in step SP91, the developing control unit 54 executes the processing of step SP22, and then advances to the next step SP94.

In step SP94, the developing control unit 54 executes developing processing the same as described above on the new photography imaging data in the imaging data buffer 30, following the developing processing program loaded to the program buffer 17. Accordingly, the developing control unit 54 reads out the photography imaging data from the imaging data buffer 30, generates compressed photograph image data based on the photography imaging data, temporarily stores this in both the image data buffer 31 and image protection buffer 57, and the flow returns to step SP22.

Thus, the developing control unit 54 cyclically repeatedly executes the processing of the above-described steps SP22 and SP94. Accordingly, the developing control unit 54 executes developing processing each time photography imaging data newly temporarily stored in the imaging data buffer 30 is detected. Accordingly, the developing control unit 54 reads out photography imaging data from the imaging data buffer 30 and generates compressed photograph image data, and temporarily stores in both the image data buffer 31 and image protection buffer 57.

Note that, in the event that there is an input interruption of a power off command during the above-described start-up developing processing procedure RT10, the developing control unit 54 correspondingly completes the developing processing being executed as described above, and ends the start-up developing processing procedure RT10.

Also, in the event that there is an input interruption of a mode switch-over command during the above-described start-up developing processing procedure RT10, the developing control unit 54 performs developing processing on all photography imaging data temporarily stored in the imaging data buffer 30 for example, and then ends the start-up developing processing procedure RT10.

Moreover, upon reading a corresponding boot program from the ROM 15 to the program buffer 17 in accordance with input of a power on command, the saving control unit 55 starts the start-up saving processing procedure RT10 shown in FIG. 18, which illustrates the portions corresponding to FIG. 7 with the same reference symbols.

Upon starting the start-up developing processing procedure RT11, the saving control unit 55 executes the processing of step SP31 and SP32, and then advances to the next step SP101. In step SP101, the saving control unit 55 reads out a saving control program from the ROM 15 to the program buffer 17 via the bus 16. The saving control unit 55 then determines whether or not there is still compressed photograph image data in the image protection buffer 57 which was not subjected to saving processing at the time of the previous operations, following the developing processing program loaded to the program buffer 17.

Upon a positive result being obtained in step SP101, this means that at the time of the previous operation, the power on state went to the power off state, with unprocessed compressed photograph image data remaining in the image data buffer 31 as well as the image protection buffer 57.

Also, upon a positive result being obtained in step SP101, this means that at the time of the previous operation, the power on state went to the power off state, with unprocessed photography imaging data remaining in the imaging data buffer 30 as well as the imaging protection buffer 56. Upon obtaining this positive result in step SP102, the saving control unit 55 advances to the next step SP106.

In step SP102, the saving control unit 55 determines whether or not to query the user regarding whether or not to save the unsaved saving photograph image data. In the event that a positive result is obtained in step SP102, this means that settings have been made such that in a case where there is unsaved saving photograph image data at the time of start-up, a query is made regarding whether or not to save the saving photograph image data. Accordingly, upon obtaining this positive result in step SP102, the saving control unit 55 commissions the display control unit 53 to inquire whether or not to save the unsaved saving photograph image data, and the flow advances to the next step SP103.

In step SP103, the saving control unit 55 determines whether or not to save the unsaved saving photograph image data. Upon obtaining a positive result in step SP103, this means that the user has been queried regarding whether or not to save the unsaved saving photograph image data, and as a result thereof, a selection has been made to save the unsaved saving photograph image data. Accordingly, upon obtaining this positive result, in step SP103 the saving control unit 55 advances to the next step SP104.

In step SP104, the saving control unit 55 executes saving processing the same as described above on the compressed photograph image data remaining in the image protection buffer 57, following the saving processing program loaded to the program buffer 17. Accordingly, the saving control unit 55 reads out compressed photograph image data from the image protection buffer 57, generates saving photograph image data based on the compressed photograph image data, stores this in the storage medium 29 of the external media, and advances to the next step SP105.

In step SP105, the saving control unit 55 determines whether or not all compressed photograph image data remaining in the image protection buffer 57 has been subjected to saving processing. If it is found as a result that there is unprocessed compressed photograph image data remaining in the image protection buffer 57, the saving control unit 55 returns to step SP104. Also, if there is no compressed photograph image data remaining in the image protection buffer 57, the saving control unit 55 advances to the next step SP33.

Thus, the developing control unit 54 repeatedly executes the processing of steps SP104 and SP105, as appropriate. Accordingly, after the saving control unit 55 performs developing processing of all compressed photograph image data remaining within the image protection buffer 57, the flow advances to the next step SP33.

On the other hand, in the event that a negative result is obtained in step SP101, this means that at the time of the previous operation, the power on state went to the power off state, without leaving unprocessed compressed photograph image data in the image protection buffer 57 and image data buffer 31. Also, in the event that a negative result is obtained in step SP101, this means that at the time of the previous operation, the power on state went to the power off state, without leaving unprocessed photography imaging data in the imaging protection buffer 56 and imaging data buffer 30. Accordingly, upon obtaining this positive result in step SP101, the saving control unit 55 advances to the next step SP33.

On the other hand, in the event that a negative result is obtained in step SP102, this means that settings have been made such that in a case where there is unsaved saving photograph image data at the time of start-up, no query is made regarding whether or not to save the saving photograph image data. Accordingly, upon obtaining this negative result in step SP102, the saving control unit 55 advances to step SP106.

In step SP106, the saving control unit 55 determines whether or not to automatically save the unsaved saving photograph image data. In the event that a positive result is obtained in this step SP106, this means that in a case where there is unsaved saving photograph image data at the time of start-up, the saving photograph image data is to be automatically saved. Accordingly, upon obtaining this positive result in step SP106, the saving control unit 55 goes to step SP104.

Also, in the event that a negative result is obtained in step SP103, this means that the user has been queried via the query screen regarding whether or not to save the unsaved saving photograph image data, and as a result thereof, a selection has been made to not save that saving photograph image data. Accordingly, upon obtaining this negative result in step SP103, the saving control unit 55 goes to step SP107.

In step SP107, the saving control unit 55 deletes the saving photograph image data regarding which photograph shooting of the subject was performed in the previous operation but was not saved, by deleting all of the base compressed photograph image data thereof (the compressed photograph image data within the image protection buffer 57), and then goes to step SP33.

Also, in the event that a negative result is obtained in step SP106, this means that settings have been made such that in a case where there is unsaved saving photograph image data at the time of start-up, the saving photograph image data is not saved. Accordingly, upon obtaining this negative result in step SP106, the saving control unit 55 executes the processing of step SP107, and advances to step SP33.

Upon going to step SP33, the saving control unit 55 follows the saving processing program already loaded to the program buffer 17 in step SP101 to execute the processing of step SP33.

Note that, in the event that there is an input interruption of a power off command during the above-described start-up saving processing procedure RT11, the saving control unit 55 correspondingly completes the saving processing being executed as described above, and ends the start-up saving processing procedure RT11.

Also, in the event that there is an input interruption of a mode switch-over command during the above-described start-up saving processing procedure RT11, the saving control unit 55 performs saving processing for all compressed photograph image data temporarily stored in the image data buffer 31 for example, and then ends the start-up saving processing procedure RT11.

3-4. Operations and Advantages of Third Embodiment

In the above configuration, with the digital still camera 50, the imaging control unit 52 images a subject for photograph shooting by way of the imaging processing block 20 in accordance with input of shooting commands, generates photography imaging data, and temporarily stores the photography imaging data in the imaging data buffer 30 and imaging protection buffer 56.

Also, with the digital still camera 50, the developing control unit 54 reads out the photography imaging data from the imaging data buffer 30 and performs developing processing, thereby generating compressed photograph image data, which is temporarily stored in the image data buffer 31 and image protection buffer 57.

Further, with the digital still camera 50, the saving control unit 55 reads out compressed photograph image data from the image data buffer 31 and perform saving processing, thereby generating saving photograph image data, which is stored in the storage medium 29 of the external media.

With the digital still camera 50, upon a power off command being input, the imaging control unit 52, developing control unit 54, and saving control unit 55 complete the processing being executed at that point and stop operations. Also, with the digital still camera 50, upon a power on command being input, imaging start-up processing by the imaging control unit 52, developing start-up processing by the developing control unit 54, and saving start-up processing by the saving control unit 55, are executed in parallel. Upon the imaging start-up processing by the imaging control unit 52 ending, the digital still camera 50 receives shooting commands for photograph shooting, thereby enabling photograph shooting of the subject.

However, with the digital still camera 50, in the event that there is photography imaging data remaining in the imaging protection buffer 56, the developing control unit 54 performs developing processing of the remaining photography imaging data before new photography imaging data obtained by photograph shooting of the subject. Accordingly, with the digital still camera 50, the developing control unit 54 generates compressed photograph image data based on the remaining photography imaging data and temporarily stores this in the image data buffer 31 and image protection buffer 57.

Also, with the digital still camera 50, in the event that there is compressed photograph image data remaining in the image protection buffer 57, the saving control unit 55 performs saving processing of the remaining compressed photograph image data before new compressed photograph image data obtained by photograph shooting of the subject. Accordingly, with the digital still camera 50, the saving control unit 55 generates saving photograph image data based on the remaining compressed photograph image data and stores in the storage medium 29 of the external media.

Accordingly, with the digital still camera 50, an arrangement is made wherein, while stopping operations speedily in response to input of a power off command to suppress depletion of the remaining battery amount as much as possible, loss of photography imaging data and compressed photograph image data generated by imaging a subject for photograph shooting can be prevented.

Also, with the digital still camera 50, upon a power on command being input, saving photograph image data is generated based on photography imaging data and compressed photograph image data remaining from the previous operation, and is stored in the storage medium 29 of the external media. Accordingly, the digital still camera 50 can also prevent photograph shooting from the of the previous operation going to waste.

According to the above configuration, with the digital still camera 50, upon a power on command being input, the imaging start-up processing by the imaging control unit 52, developing start-up processing by the developing control unit 54, and saving start-up processing by the saving control unit 55, are executed in parallel, and upon the imaging start-up processing by the imaging control unit 52 ending, shooting commands for photograph shooting are received, and upon input of a shooting command, photography imaging data is generated and temporarily stored in the imaging data buffer 30 and the imaging protection buffer 56, and also compressed photograph image data is generated based on the photography imaging data and temporarily stored in the image data buffer 31 and image protection buffer 57.

Accordingly, with the digital still camera 50, advantages the same as those obtained with the first embodiment described above can be obtained, and also, even with the arrangement wherein operations are stopped speedily in response to input of a power off command to reduce depletion of the remaining battery amount as much as possible, loss of photography imaging data and compressed photograph image data generated by imaging a subject for photograph shooting can be prevented.

Also, with the digital still camera 50, when in the imaging mode, if the remaining battery amount decreases to where changing is necessary in a state wherein unprocessed photography imaging data and compressed photograph image data exist, a power off command can be input to stop operations without any worry about loosing the photography imaging data and compressed photograph image data.

Further, with the digital still camera 50, when in the imaging mode, if the empty region for storing saving photograph image data in the storage medium 29 of the external media runs out and there is no spare external media in a state wherein unprocessed photography imaging data and compressed photograph image data exist, a power off command can be input to stop operations without any worry about loosing the photography imaging data and compressed photograph image data.

4. Modifications

4-1. Modification 1

Note that with the above-described first through third embodiments, description has been made regarding a case wherein the imaging control units 5, 42, and 52, the display control units 6, 43, and 53, the developing control units 7, 44, and 54, and the saving control units 8, 45, and 55, read out corresponding boot programs in an autonomous manner. However, the present invention is not restricted to this, and an arrangement may be made wherein one of the imaging control units 5, 42, and 52, the display control units 6, 43, and 53, the developing control units 7, 44, and 54, and the saving control units 8, 45, and 55 acquires a power on command in a representative manner. The one of the imaging control units 5, 42, and 52, the display control units 6, 43, and 53, the developing control units 7, 44, and 54, and the saving control units 8, 45, and 55 which has acquired the power on command may then read out the boot programs in batch fashion from the ROM 15.

Also, with an embodiment of the present invention, a detecting circuit is provided to the digital still cameras 1, 40, and 50, which detects input of a power on command. further, with an embodiment of the present invention, upon the detecting circuit detecting input of the power on command, notification is made of the input detection to one of the imaging control units 5, 42, and 52, the display control units 6, 43, and 53, the developing control units 7, 44, and 54, and the saving control units 8, 45, and 55. The one of the imaging control units 5, 42, and 52, the display control units 6, 43, and 53, the developing control units 7, 44, and 54, and the saving control units 8, 45, and 55 which has received the input detection notification may then read out the boot programs in batch fashion from the ROM 15.

Also, with an embodiment of the present invention, a main control unit is provided to the digital still cameras 1, 40, and 50, separately from the imaging control units 5, 42, and 52, the display control units 6, 43, and 53, the developing control units 7, 44, and 54, and the saving control units 8, 45, and 55, to centrally control these. Also, with an embodiment of the present invention, the main control unit acquires a power on command in a representative manner. The main control unit may then read out the booth programs for the imaging control units 5, 42, and 52, the display control units 6, 43, and 53, the developing control units 7, 44, and 54, and the saving control units 8, 45, and 55, in batch fashion from the ROM 15, in response to input of the power on command.

With an embodiment of the present invention, in the event of reading boot programs from the ROM in batch fashion, the imaging control units 5, 42, and 52 may be arranged to operated with a faster operating clock than the operating clock of the display control units 6, 43, and 53, the developing control units 7, 44, and 54, and the saving control units 8, 45, and 55. With an embodiment of the present invention, in this case, the priority of access to the bus 16, or the priority of access to the program buffer 17, may be set highest for the imaging control units 5, 42, and 52. Accordingly, with an embodiment of the present invention, in this case, the imaging start-up processing of the imaging control units 5, 42, and 52 can be started first, thereby reducing the amount of time from the point of input of a power on command until photograph shooting is available, as much as possible.

4-2. Modification 2

Note that with the above-described first through third embodiments, description has been made regarding a case wherein the imaging control units 5, 42, and 52, the display control units 6, 43, and 53, the developing control units 7, 44, and 54, and the saving control units 8, 45, and 55, read out corresponding boot programs at approximately the same time. However, the present invention is not restricted to this, and an arrangement may be made wherein, for example, the imaging control units 5, 42, and 52, and the saving control units 8, 45, and 55, read out the boot programs with priority. With an embodiment of the present invention, the boot programs for the display control units 6, 43, and 53, and the developing control units 7 may be read out at the same time or sequentially at various timings, such as at the point of completion of the imaging control unit boot processing or the point of ending imaging start-up processing, or the like. That is to say, with an embodiment of the present invention, the readout of the boot programs for the imaging control units 5, 42, and 52, the display control units 6, 43, and 53, the developing control units 7, 44, and 54, and the saving control units 8, 45, and 55, may be shifted as appropriate.

4-3. Modification 3

Further, with the above-described first through third embodiments, description has been made regarding a case wherein boot programs are stored in ROM 15 of the digital still cameras 1, 40, and 50. However, the present invention is not restricted to this, and an arrangement may be made wherein non-volatile memory which can be accessed at high speeds, such as MRAM, is provided to the digital still cameras 1, 40, and 50, and the boot programs are stored in the non-volatile memory beforehand. Accordingly, with an embodiment of the present invention, the imaging control units 5, 42, and 52, the display control units 6, 43, and 53, the developing control units 7, 44, and 54, and the saving control units 8, 45, and 55, can execute start-up processing following the corresponding boot programs within the non-volatile memory, in response to the input of the power on command.

Accordingly, with this configuration, the amount of time from the point of input of the power on command to the end of all start-up processing can be reduced, and photograph shooting can be enabled even quicker. Also, with this configuration, the configuration of the digital still cameras 1, 40, and 50 can be simplified, and also the processing for the time of start-up processing can be simplified.

4-4. Modification 4

Further, with the above-described first through third embodiments, description has been made regarding a case wherein the digital still cameras 1, 40, and 50 are provided with the developing control units 7, 44, and 54, and saving control units 8, 45, and 55. However, the present invention is not restricted to this, and an arrangement may be made wherein a single storage control unit having the functions of both the developing control units 7, 44, and 54, and saving control units 8, 45, and 55, is provided to the digital still cameras 1, 40, and 50. With an embodiment of the present invention, when in the imaging mode, the storage control unit may sequentially perform developing processing and saving processing on the photography imaging data so as to generate saving photograph image data and store this in the storage medium 29 of the external media.

Additionally, with an embodiment of the present invention, an arrangement may be made wherein a single storage control unit having the functions of both the developing control units 7, 44, and 54, and saving control units 8, 45, and 55, is provided to the digital still cameras 1, 40, and 50. With an embodiment of the present invention, when in the imaging mode, the storage control unit performs developing processing of photography imaging data and generate compressed photograph image data, and store the generated compressed photograph image data in the storage medium 29 of the external media.

Also, with an embodiment of the present invention, an arrangement may be made wherein, when in the imaging mode, the storage control unit saves the photography imaging data in the storage medium 29 of the external media as it is, and performs developing processing of the photography imaging data when in the display mode.

With embodiments of the present invention, any one of these various configurations can simplify the configuration of the digital still cameras 1, 40, and 50.

4-5. Modification 5

Further, with the above-described first through third embodiments, description has been made regarding a case wherein the digital still cameras 1, 40, and 50 are provided with the display control units 6, 43, and 53, and the display unit 21. However, the present invention is not restricted to this, an arrangement may be made wherein, in addition to the display control units 6, 43, and 53, and the display unit 21, or instead of the display control units 6, 43, and 53, and the display unit 21, the digital still cameras 1, 40, and 50 are provided with a viewfinder.

4-6. Modification 6

Further, with the above-described first through third embodiments, description has been made regarding a case wherein, at the time of start-up processing, reception of input of shooting commands is started at one of the point of ending the imaging start-up processing and the point of ending the saving start-up processing, in accordance with the remaining battery amount. However, the present invention is not restricted to this, and an arrangement may be made wherein the timing at which reception of input of shooting commands at the time of start-up processing is optionally set to one of the point of ending the imaging start-up processing and the point of ending the saving start-up processing. Further, with an embodiment of the present invention, the timing at which reception of input of shooting commands at the time of start-up processing may be fixedly set to one of the point of ending the imaging start-up processing and the point of ending the saving start-up processing.

4-7. Modification 7

Further, with the above-described first through third embodiments, description has been made regarding a case wherein start-up processing is executed at the digital still cameras 1, 40, and 50 in response to input of a power on command. However, the present invention is not restricted to this, and an arrangement may be made wherein start-up processing is executed at the digital still cameras 1, 40, and 50 in response to input of various commands corresponding to various other operation key operations, such as input of a shooting command from operating the release key.

4-8. Modification 8

Further, with the above-described first through third embodiments, description has been made regarding a case wherein the digital still cameras 1, 40, and 50 are provided with the imaging control units 5, 42, and 52, the display control units 6, 43, and 53, the developing control units 7, 44, and 54, and the saving control units 8, 45, and 55. However, the present invention is not restricted to this, and an arrangement may be made wherein the digital still cameras 1, 40, and 50 are further provided with various other control units, such as a control unit for realizing connection functions to a network such as the Internet or the like. With an embodiment of the present invention, in this case, at the time of start-up processing, at least the imaging start-up processing of the imaging control units 5, 42, and 52, and saving start-up processing of the saving control units 8, 45, and 55, are executed in parallel. Thus, with an embodiment of the present invention, in this case, advantages the same as those of the above-described first through third embodiments can be obtained.

4-9. Modification 9

Further, with the above-described first through third embodiments, description has been made regarding a case wherein, upon generating photography imaging data, the generated photography imaging data is temporarily stored in the imaging data buffer 30 and imaging protection buffer 56 at almost the same time. Also, with the above-described third embodiment, description has been made regarding a case wherein, upon generating compressed photograph image data, the compressed photograph image data is temporarily stored in the image data buffer 31 and the image protection buffer 57 at almost the same time.

However, the present invention is not restricted to this, and an arrangement may be made wherein, upon the photography imaging data being generated, the photography imaging data is temporarily stored in the imaging data buffer 30, and upon generating compressed photograph image data, the compressed photograph image data is temporarily stored in the image data buffer 31. With an embodiment of the present invention, upon a power off command being input, the unprocessed photography imaging data is read out from the imaging data buffer 30 and temporarily saved in the imaging protection buffer 56. Also, with an embodiment of the present invention, at this time, the unprocessed compressed photograph image data is read out from the image data buffer 31 and temporarily stored in the image protection buffer 57, and upon this temporary storage being completed, the operations may be stopped.

4-10. Modification 10

Further, with the above-described third embodiment, description has been made regarding a case wherein, upon a power off command being input, the developing control unit 54 completes the developing processing being executed, and the saving control unit 55 also completes the saving processing being executed, upon which the operations are stopped. However, the present invention is not restricted to this, and an arrangement may be made wherein, upon a power off command being input, the developing processing which the developing control unit 54 is executing is cut off, and also the saving processing which the saving control unit 55 is executing is cut off, and the operations are stopped.

With an embodiment of the present invention, even such a configuration can allow the photography imaging data and compressed photograph image data being used in the developing processing and saving processing that were cut off to be protected in the imaging protection buffer 56 and the image protection buffer 57 (i.e., loss can be prevented). Also, with an embodiment of the present invention, in this case, transition can be made from the power on state to the power off state even more speedily than with the case of the above-described third embodiment, further suppressing depletion of the remaining battery amount.

4-11. Modification 11

Further, with the above-described first through third embodiments, description has been made regarding a case wherein the imaging apparatus according to embodiments of the present invention is applied to the digital still cameras 1, 40, and 50, described above with reference to FIGS. 1 through 18. However, the present invention is not restricted to this, and can be applied to information processing devices such as personal computers, cell phones, PDAs (Personal Digital Assistants), portable game devices, and the like, having imaging functions for photographs and moving images. Also, with embodiments of the present invention, the imaging apparatus can be applied to imaging apparatuses of various other configurations, such as digital video cameras having imaging functions for photographs and moving images, portable player devices, and so on.

Moreover, with an embodiment of the present invention, the start-up method of the imaging apparatus is not restricted to application to start-up processing in the imaging mode for imaging subjects for photograph shooting as described above, rather, this may be applied to start-up processing for imaging subjects for moving image shooting (moving image shooting for storing moving images).

4-12. Modification 12

Further, with the above-described first through third embodiments, description has been made regarding a case wherein the imaging processing block 20 described above with reference to FIGS. 1 through 18 is applied as the imaging processing unit for imaging subjects and outputting imaging data. However, the present invention is not restricted to this, and may be applied to an imaging processing block which sequentially generates temporally consecutive data by imaging subjects for recoding moving image shooting. With an embodiment of the present invention, an electronic shutter function may be provided instead of a mechanical shutter part, and applied to various other configurations, such as an imaging processing unit capable of imaging subjects for photograph shooting.

4-13. Modification 13

Further, with the above-described first through third embodiments, description has been made regarding a case wherein the imaging data buffer 30 made up of volatile memory described above with reference to FIGS. 1 through 18 is applied as the temporary storage medium for temporarily storing image data output from the imaging processing unit. However, the present invention is not restricted to this, and a temporary storage medium made up of non-volatile memory may be applied. Also, with an embodiment of the present invention, a wide variety of temporary storage mediums of other various configurations, such as an imaging data buffer having a single memory divided into an image data buffer storage region and another storage region prepared beforehand, and so forth, may be applied.

4-14. Modification 14

Further, with the above-described first through third embodiments, description has been made regarding a case wherein the imaging control units 5, 42, and 52, made up of a CPU, described above with reference to FIGS. 1 through 18, are applied as the imaging control unit for controlling the imaging processing unit. However, the present invention is not restricted to this, and a wide variety of imaging control units of other various configurations, such as imaging control units made up of microprocessors or DSPs (Digital Signal Processor), may be applied.

4-15. Modification 15

Further, with the above-described first through third embodiments, description has been made regarding a case wherein the storage medium 29 made up of non-volatile memory, of the external media described with reference to FIGS. 1 through 18, is applied as the storage medium detachably mounted to the device main unit. However, the present invention is not restricted to this, and a wide variety of recording mediums of other various configurations, such as optical discs, magnetic disks, and so forth, may be applied.

4-16. Modification 16

Further, with the above-described first through third embodiments, description has been made regarding a case wherein the developing control units 7, 44, and 54 made up of a CPU, described above with reference to FIGS. 1 through 18, are applied as the storage control device which causes storage of the imaging data temporarily stored in the storage medium detachably mounted to the device main unit. However, the present invention is not restricted to this, and storage control units made up of microprocessors, DSPs, and the like may be applied. Also, a wide variety of storage control units of other various configurations, such as a developing control unit which performs developing processing of imaging data and stores the obtained compressed photograph image data in a storage medium, or a control unit which stores the imaging data in a storage medium without change, and so forth, may be applied.

4-17. Modification 17

Further, with the above-described first through third embodiments, description has been made regarding a case wherein the power key, described above with reference to FIGS. 1 through 18, is applied as a requesting unit for requesting execution of start-up processing of the device main unit. However, the present invention is not restricted to this, and execution request units of other various configurations, such as an operating key other than a power key, like a release key, may be applied.

4-18. Modification 18

Further, with the above-described first through third embodiments, description has been made regarding a case wherein the display control units 6, 43, and 53, made up of a CPU, described above with reference to FIGS. 1 through 18, are applied as the display control device which controls the display unit. However, the present invention is not restricted to this, and a wide variety of display control units of other various configurations, such as display control units made up of microprocessors, DSPs, and the like, may be applied.

4-19. Modification 19

Further, with the above-described first through third embodiments, description has been made regarding a case wherein the image data buffer 31 made up of volatile memory described above with reference to FIGS. 1 through 18 is applied as the temporary storage medium for temporarily storing image data generated by developing processing based on imaging data. However, the present invention is not restricted to this, and a temporary storage medium made up of non-volatile memory may be applied. Also, with an embodiment of the present invention, a wide variety of temporary storage mediums of other various configurations, such as an imaging data buffer having a single memory divided into an image data buffer storage region and another storage region prepared beforehand, and so forth, may be applied.

4-20. Modification 20

Further, with the above-described first through third embodiments, description has been made regarding a case wherein the developing control units 7, 44, and 54, made up of a CPU, described above with reference to FIGS. 1 through 18, are applied as the developing control unit which performs developing processing based on image data output from the imaging processing unit to generate image data, and temporarily store the image data in another temporary storage medium. However, the present invention is not restricted to this, and a wide variety of developing control units of other various configurations, such as developing control units made up of microprocessors, DSPs, and the like, may be applied.

4-21. Modification 21

Further, with the above-described first through third embodiments, description has been made regarding a case wherein the saving control units 8 45, and 55, made up of a CPU, described above with reference to FIGS. 1 through 18, are applied as the saving control unit which performs saving processing on the image data temporarily stored in another temporary storage medium, and stored in the storage medium. However, the present invention is not restricted to this, and a wide variety of saving control units of other various configurations, such as saving control units made up of microprocessors, DSPs, and the like, may be applied.

4-22. Modification 22

Further, with the above-described first through third embodiments, description has been made regarding a case wherein the release key described above with reference to FIGS. 1 through 18 is applied as the imaging requesting unit for requesting imaging of the subject. However, the present invention is not restricted to this, and a wide variety of imaging requesting units of other various configurations, such as a generating circuit which automatically generates signals for imaging a subject for photograph shooting or moving image shooting at the time of start-up processing of the imaging control unit ending, and the like, may be applied.

The present application contains subject matter related to that disclosed in Japanese Priority Patent Application JP 2009-104358 filed in the Japan Patent Office on Apr. 22, 2009, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An imaging apparatus comprising:
    an imaging processing unit configured to image a subject and output imaging data;
    a temporary storage medium configured to temporarily store said imaging data output from said imaging processing unit;
    an imaging control unit configured to control said imaging processing unit;
    a storage control unit configured to store, in a storage medium detachably mounted to a device main unit, said imaging data temporarily stored in said temporary storage medium; and
    a request unit configured to request said device main unit for execution of start-up processing;
    a display unit configured to display an image; and
    a display control unit configured to control said display unit;
    another temporary storage medium configured to temporarily store image data generated by performing developing processing based on said imaging data;
    wherein said storage control unit includes
        a developing control unit configured to perform developing processing based on said imaging data, and also temporarily store said imaging data in said other temporary storage medium, and
        a saving control unit configured to perform saving processing of said image data temporarily stored in said other temporary storage medium, and store in said storage medium;
    wherein, upon said start-up processing being requested from said request unit, start-up processing of said imaging control unit, said storage control unit, said developing control unit, said saving control unit, and said display control unit are executed in parallel.

2. The imaging apparatus according to claim 1, further comprising:
    an imaging request unit configured to input image requests of said subject; and
    a battery configured to supply power for operations;
    wherein said imaging control unit operates such that,
        in the event that the remaining battery amount of said battery is equal to or above a predetermined threshold at the point of ending start-up processing of said imaging control unit, said imaging control unit starts reception of input for said imaging requests from said imaging request unit at the point of ending start-up processing of said imaging control unit, and
        in the event that the remaining battery amount of said battery is lower than said threshold at the point of ending start-up processing of said imaging control unit, said imaging control unit starts reception of input for said imaging requests from said imaging request unit at said point of ending start-up processing of said saving control unit which ends after the start-up processing of said imaging control unit.

3. The imaging apparatus according to claim 2, further comprising:
    imaging data protection non-volatile memory configured to temporarily store said imaging data for data protection; and
    image data protection non-volatile memory configured to temporarily store said image data for data protection.

4. The imaging apparatus according to claim 3, wherein said temporary storage medium is configured of said imaging data protection non-volatile memory;
    and wherein said other temporary storage medium is configured of said image data protection non-volatile memory.

5. An image capture processing method, comprising:
    imaging a subject and outputting image data to an image processing unit;
    storing, temporarily, in a temporary storage medium, said imaging data of the image processing unit;
    controlling said image processing unit via an image control unit;
    storing in a storage medium of a device main unit, said imaging data temporarily stored in said temporary storage medium;
    requesting said device main unit for execution of start-up processing at a request unit;
    displaying, at a display unit and image;
    controlling the display unit via a display control unit;
    storing, temporarily, in another temporary storage medium, image data generated by performing developing processing based on said imaging data;
    wherein said storing of the storing control unit includes,
    performing developing processing a developing control unit based on said imaging data, and also a temporarily storing said imaging data in said another temporary storage medium; and
    performing saving processing at a saving control unit of said image data temporarily stored in said another temporary storage medium, in storing said image data in said storage medium;
    wherein, upon said start-up processing being requested from said request unit, start-up processing of said imaging control unit, said storage control unit, said developing control unit, said saving control unit, and said display control unit are executed in parallel.

6. A non-transitory computer readable storage medium encoded with computer program instructions, which when executed by a processor cause the processor to implement a method of image processing, comprising:
    imaging a subject and outputting image data to an image processing unit;
    storing, temporarily, in a temporary storage medium, said imaging data of the image processing unit;
    controlling said image processing unit via an image control unit;
    storing in a storage of a device main unit, said imaging data temporarily stored in said temporary storage medium;
    requesting said device main unit for execution of start-up processing at a request unit;
    displaying, at a display unit and image;
    controlling the display unit via a display control unit;
    storing, temporarily, in another temporary storage medium, image data generated by performing developing processing based on said imaging data;
    wherein said storing of the storing control unit includes, performing developing processing a developing control unit based on said imaging data, and also a temporarily storing said imaging data in said another temporary storage medium; and performing saving processing at a saving control unit of said image data temporarily stored in said another temporary storage medium, in storing said image data in said storage medium;

wherein, upon said start-up processing being requested from said request unit, start-up processing of said imaging control unit, said storage control unit, said developing control unit, said saving control unit, and said display control unit are executed in parallel.

* * * * *